(12) United States Patent
Obana

(10) Patent No.: US 12,545,488 B2
(45) Date of Patent: Feb. 10, 2026

(54) METHOD OF MANUFACTURING POUCH CONTAINER, POUCH CONTAINER, POUCH CONTAINER WITH CAP, AND DOUBLE CONTAINER WITH DISCHARGE MECHANISM

(71) Applicant: SHISEIDO COMPANY, LTD., Tokyo (JP)

(72) Inventor: Takakazu Obana, Tokyo (JP)

(73) Assignee: SHISEIDO COMPANY, LTD., Tokyo (JP)

( * ) Notice: Subject to any disclaimer, the term of this patent is extended or adjusted under 35 U.S.C. 154(b) by 391 days.

(21) Appl. No.: 17/998,186

(22) PCT Filed: Jun. 7, 2021

(86) PCT No.: PCT/JP2021/021597
§ 371 (c)(1),
(2) Date: Nov. 8, 2022

(87) PCT Pub. No.: WO2021/251343
PCT Pub. Date: Dec. 16, 2021

(65) Prior Publication Data
US 2023/0211935 A1     Jul. 6, 2023

(30) Foreign Application Priority Data
Jun. 9, 2020   (JP) ................. 2020-100448

(51) Int. Cl.
*B65D 75/58*   (2006.01)
*B05B 11/00*   (2023.01)
(Continued)

(52) U.S. Cl.
CPC .......... *B65D 75/5883* (2013.01); *B05B 11/00* (2013.01); *B31B 70/84* (2017.08); *B65D 51/225* (2013.01); *B65D 75/5877* (2013.01)

(58) Field of Classification Search
None
See application file for complete search history.

(56) References Cited

U.S. PATENT DOCUMENTS

| 3,930,286 A | * | 1/1976 | McGowen | ............... B67B 7/26 220/62.12 |
|---|---|---|---|---|
| 2005/0053314 A1 | | 3/2005 | Ikeda et al. | |

(Continued)

FOREIGN PATENT DOCUMENTS

| CA | 2176921 | 6/1995 |
|---|---|---|
| DE | 4340553 | 6/1995 |

(Continued)

OTHER PUBLICATIONS

Japanese Office Action for 2022-530556 mailed on Sep. 24, 2024.
(Continued)

*Primary Examiner* — Tanzim Imam
(74) *Attorney, Agent, or Firm* — IPUSA, PLLC

(57) ABSTRACT

A method of manufacturing a pouch container, includes: forming a pouch bag having one open end, by fusion-bonding a resin layer on an inner side of an end of a first film, with a resin layer on an inner side of an end of one or more second films; molding a mouth part member made of a resin, including a brim portion and a standing portion; attaching a lower surface of the brim portion of the mouth part member made of the resin to an outer resin layer of the first film of the pouch bag, by integrating the resins, using one of ultrasonic, heat, or high-frequency welding; filling the pouch bag with contents from the one open end of the pouch bag; and sealing an inside by fusion-bonding the one open end of the pouch bag to seal the pouch bag.

13 Claims, 40 Drawing Sheets

(51) Int. Cl.
   *B31B 70/84* (2017.01)
   *B65D 51/22* (2006.01)

(56) References Cited

U.S. PATENT DOCUMENTS

| | | | | |
|---|---|---|---|---|
| 2013/0058595 | A1* | 3/2013 | Ekenhorst | B65D 5/748 383/80 |
| 2017/0101243 | A1* | 4/2017 | Kuge | B65D 31/10 |
| 2021/0245913 | A1 | 8/2021 | Obana | |

FOREIGN PATENT DOCUMENTS

| | | |
|---|---|---|
| EP | 0769369 | 4/1997 |
| EP | 1167211 | 1/2002 |
| JP | S62-081090 U | 5/1987 |
| JP | 862-194563 U | 12/1987 |
| JP | H03-066850 U | 6/1991 |
| JP | 3001989 U | 9/1994 |
| JP | H09-085145 | 3/1997 |
| JP | 2001-335081 | 12/2001 |
| JP | 2002-321292 | 11/2002 |
| JP | 2003-160182 | 6/2003 |
| JP | 2004-161287 | 6/2004 |
| JP | 3624132 | 3/2005 |
| JP | 2006-044768 | 2/2006 |
| JP | 2007-269406 | 10/2007 |
| JP | 2011-140208 | 7/2011 |
| JP | 2011-240932 | 12/2011 |
| JP | 2012-153435 | 8/2012 |
| JP | 2012-158343 | 8/2012 |
| JP | 2014-198412 | 10/2014 |
| JP | 2016-003055 | 1/2016 |
| JP | 2019-043007 | 3/2019 |
| JP | 2019-202789 | 11/2019 |
| JP | 2019-214411 | 12/2019 |
| WO | 2007/126044 | 11/2007 |
| WO | WO-2019198809 A1 * 10/2019 ............. B65D 81/26 |

OTHER PUBLICATIONS

Extended European Search Report issued in European Patent Application No. 21822924.3, mailed on Feb. 4, 2025.
International Search Report for PCT/JP2021/021597 mailed on Aug. 24, 2021.

* cited by examiner

METHOD OF MANUFACTURING POUCH CONTAINER, POUCH CONTAINER, POUCH CONTAINER WITH CAP, AND DOUBLE CONTAINER WITH DISCHARGE MECHANISM

TECHNICAL FIELD

The present disclosure relates to a method of manufacturing a pouch container with a mouth part, a pouch container, a pouch container with a cap, and a double container with a discharge mechanism including a pouch container.

BACKGROUND ART

As a common aluminum pouch that blocks light and oxygen, a structure in which a mouth part (also called a spout) is inserted has been known (see, e.g., Patent Document 1). However, in an aluminum pouch into which the mouth part is inserted, as a portion corresponding to the mouth part is made of resin, there is a likelihood that light and oxygen permeate through the mouth part, and the contents start deteriorating from a portion corresponding to the mouth part during the distribution stage.

Therefore, as a container that can ensure oxygen barrier properties during the distribution stage, Patent Document 2 discloses an aluminum tube (laminated tube) having a film in the mouth part.

Meanwhile, as a configuration that is capable of maintaining a sealed state immediately before being put into use, Patent Document 3 discloses a configuration in which the upper surface of a pouch container is formed by a thick circular plate, and the mouth part sticks firmly to the circular plate.

Further, as another configuration that is capable of maintaining a sealed state immediately before being put into use, Patent Document 4 discloses a pouch container that has a configuration in which the mouth part is attached to the upper surface by an adhesive layer.

RELATED ART DOCUMENTS

Patent Documents

[Patent Document 1] WO No. 2007/126044
[Patent Document 2] Japanese Laid-Open Patent Application No. 2006-044768
[Patent Document 3] Japanese Patent No. 3624132
[Patent Document 4] Japanese Laid-Open Patent Application No. 2001-335081

SUMMARY OF THE INVENTION

Problem to be Solved by the Invention

However, a general aluminum tube (laminate tube) as in Patent Document 2 has a configuration in which the upper surface around the mouth part is thick, and if a pouch has a configuration in which a portion corresponding to the upper surface is thick as in Patent Document 3, the upper surface does not easily deform; therefore, particularly when the remaining amount of the contents becomes small, a large force is required in the case of using up the remaining amount to the end.

Meanwhile, in the case where the mouth part is fixed with an adhesive as in Patent Document 4, for example, when the pouch container is left in high-temperature and high-humidity circumstances such as a bathroom or a washroom, or when the pouch container is washed with water, there is a likelihood that the adhesive of the mouth part melts, and the mouth part comes off.

Therefore, in view of the circumstances described above, the present invention provides a method of manufacturing a pouch container in which contents do not deteriorate from a portion corresponding to the mouth part during the distribution stage; a large force is not required when the contents are completely being used up; and the mouth part does not come off even when the container is used in high-temperature and high-humidity circumstances.

Means for Solving Problem

In order to solve the problems described above, according to one aspect of the present invention, a method of manufacturing a pouch container is provided that includes:
a step of forming a pouch bag having one open end, by fusion-bonding a resin layer on an inner side of an end of a first film, with a resin layer on an inner side of an end of one or more second films;
a step of molding a mouth part member made of a resin, including a brim portion and a standing portion;
a step of attaching a lower surface of the brim portion of the mouth part member made of the resin to an outer resin layer of the first film of the pouch bag, by integrating the resins, using one of ultrasonic, heat, or high-frequency welding;
a step of filling the pouch bag with contents from the one open end of the pouch bag; and
a step of sealing an inside by fusion-bonding the one open end of the pouch bag to seal the pouch bag.

Advantageous Effects of the Invention

According to one aspect, a method of manufacturing a pouch container is provided, with which contents do not deteriorate from a portion corresponding to the mouth part during the distribution stage; a large force is not required when the contents are completely being used up; and the mouth part does not come off even when the container is used in high-temperature and high-humidity circumstances.

EMBODIMENTS FOR CARRYING OUT THE INVENTION

Figure 1:
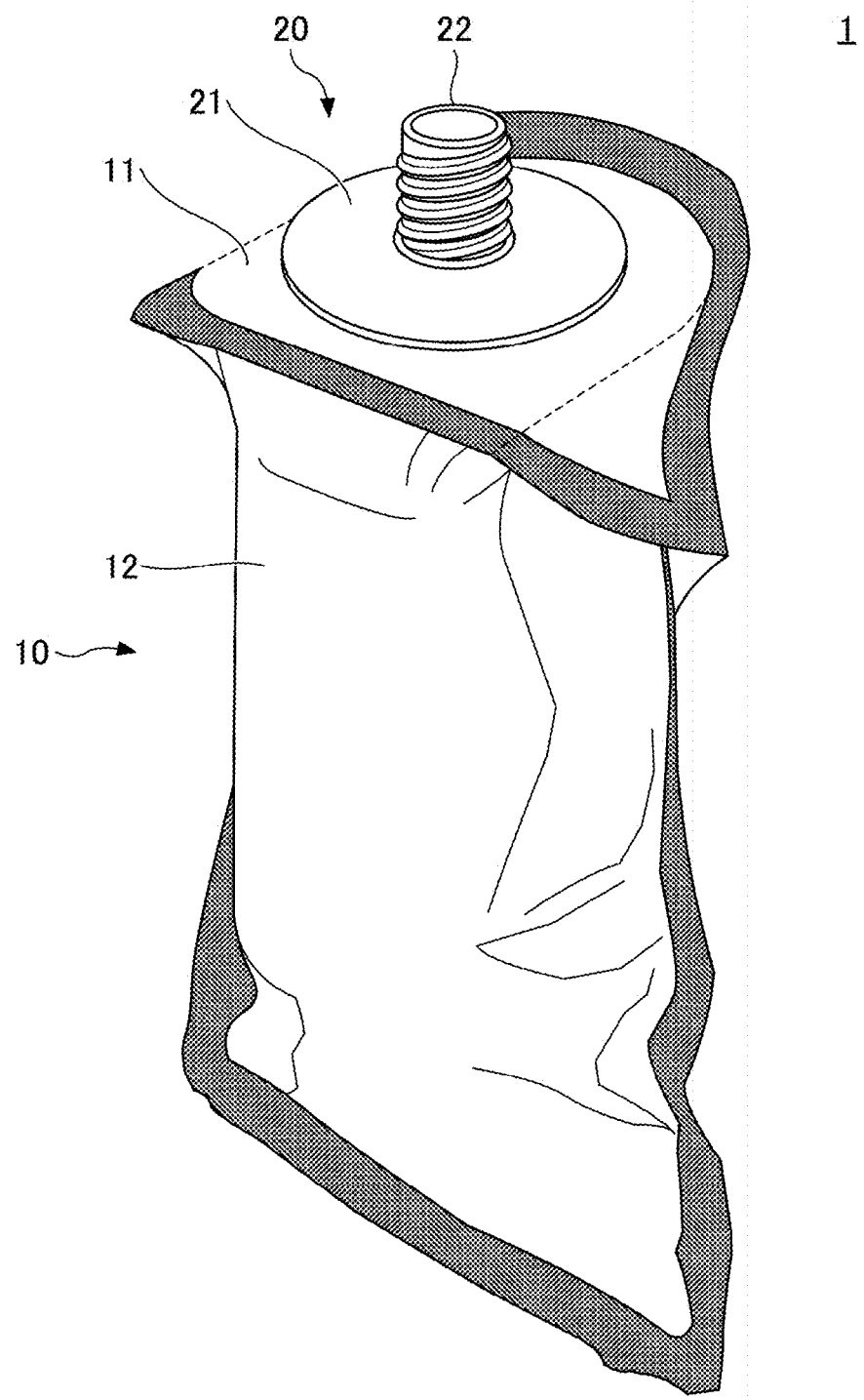
FIG. 1 is an external view illustrating a pouch container according to a first configuration example of the present invention.

In the following, embodiments for carrying out the present invention will be described with reference to drawings.

In the drawings, the same elements are assigned the same reference codes, and duplicated descriptions may be omitted.

In the present specification, directions such as orthogonal and vertical directions are allowed to have a certain degree of deviation as long as the deviation does not impair operations and effects of the embodiments. The shape of a corner is not limited to a right angle, and may be rounded as in the shape of a bow. Being orthogonal or vertical may include being substantially orthogonality or substantially vertical.

Also, shapes such as circles, ovals, rectangles, rectangles, trapezoids, hexagons, octagons, polygons, cuboids, prisms, cylinders, cylinders, and tubes may include shapes close to circles, shapes close to ovals, shapes close to rectangles, shapes close to rectangles, shapes close to trapezoids, shapes close to hexagons, shapes close to octagons, shapes close to polygons, shapes close to cuboids, shapes close to prisms, shapes close to cylinders, shapes close to cylinders, and shapes close to tubes.

The present disclosure relates to a method of manufacturing a pouch container with a mouth part, a pouch container with a cap, and a double container with a discharge mechanism including a pouch container. Here, although contents contained in a pouch container of the present invention are not limited in particular, those including a substance susceptible to change by oxygen and/or light are suitable. As such contents, for example, cosmetics including vitamins (vitamin A, vitamin C, etc.) and derivatives of these, and pharmaceuticals, foods, and the like that are easily deteriorated by oxidation, may be enumerated.

FIG. 1 is an external view illustrating a pouch container according to a first configuration example of the present invention.

A pouch container 1 includes a pouch bag 10 and a mouth part 20.

Figure 5:
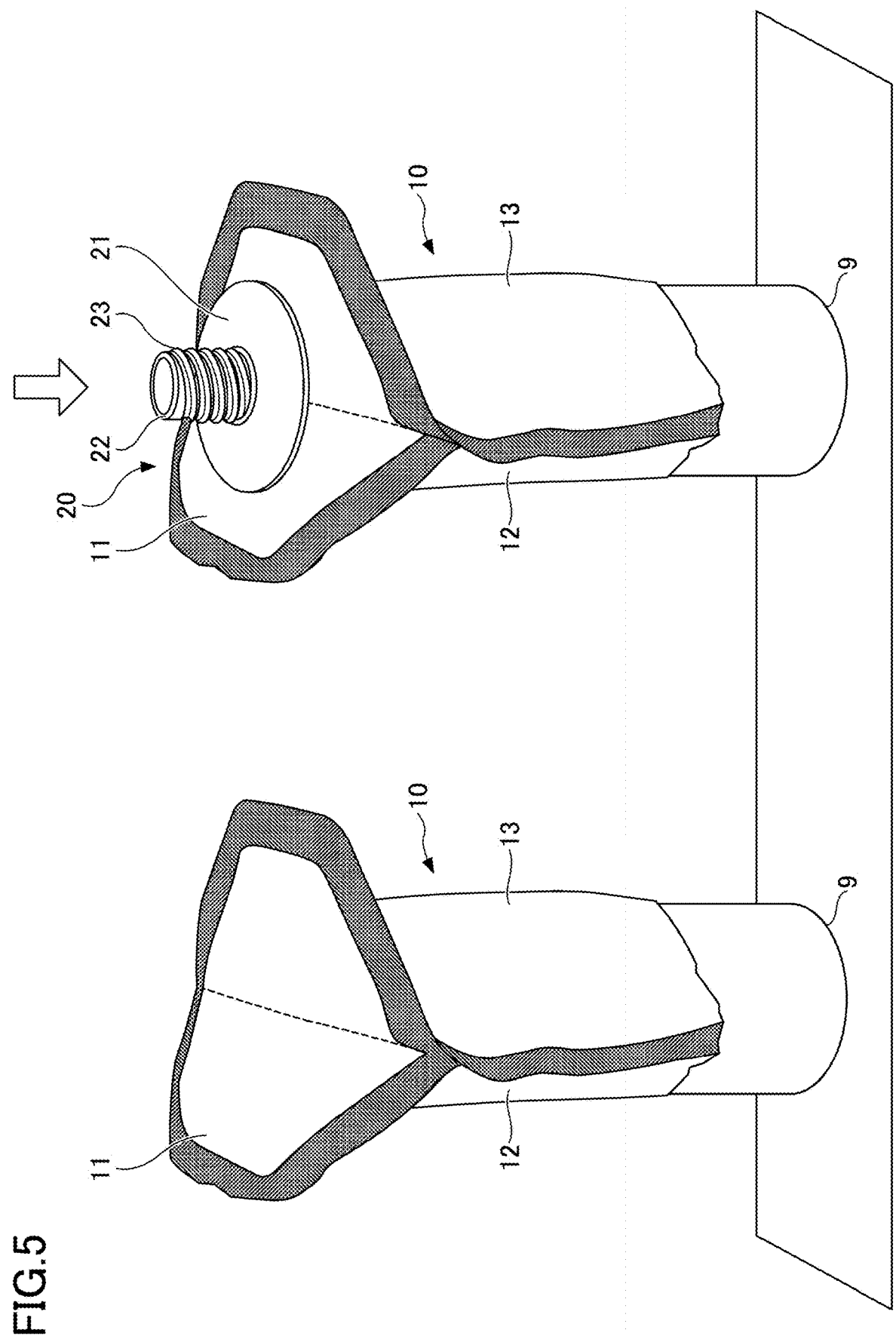
FIG. 5 is a general explanatory diagram illustrating how a mouth part is attached to an upper surface film in the first manufacturing method.

The pouch bag 10 is composed of two side surface films 12 and 13 and one upper surface film 11 (see FIG. 1 and FIG. 5).

The mouth part (also referred to as the mouth part member or the spout) 20 includes a flat disk-shaped brim portion 21 and a cylindrical standing portion 22, and the standing portion 22 has a spiral projection (screw projection) 23 formed on its outer circumference (see FIG. 5).

Further, the mouth part 20 is attached to the upper surface film 11 by welding resins together without using an adhesive. As a method of manufacturing this pouch container 1, first to fourth manufacturing methods will be described as follows.

<First Manufacturing Method>

Using FIG. 2 to FIG. 13, a first manufacturing method of a pouch container 1 according to the first configuration example of the present invention will be described.

Figure 2:
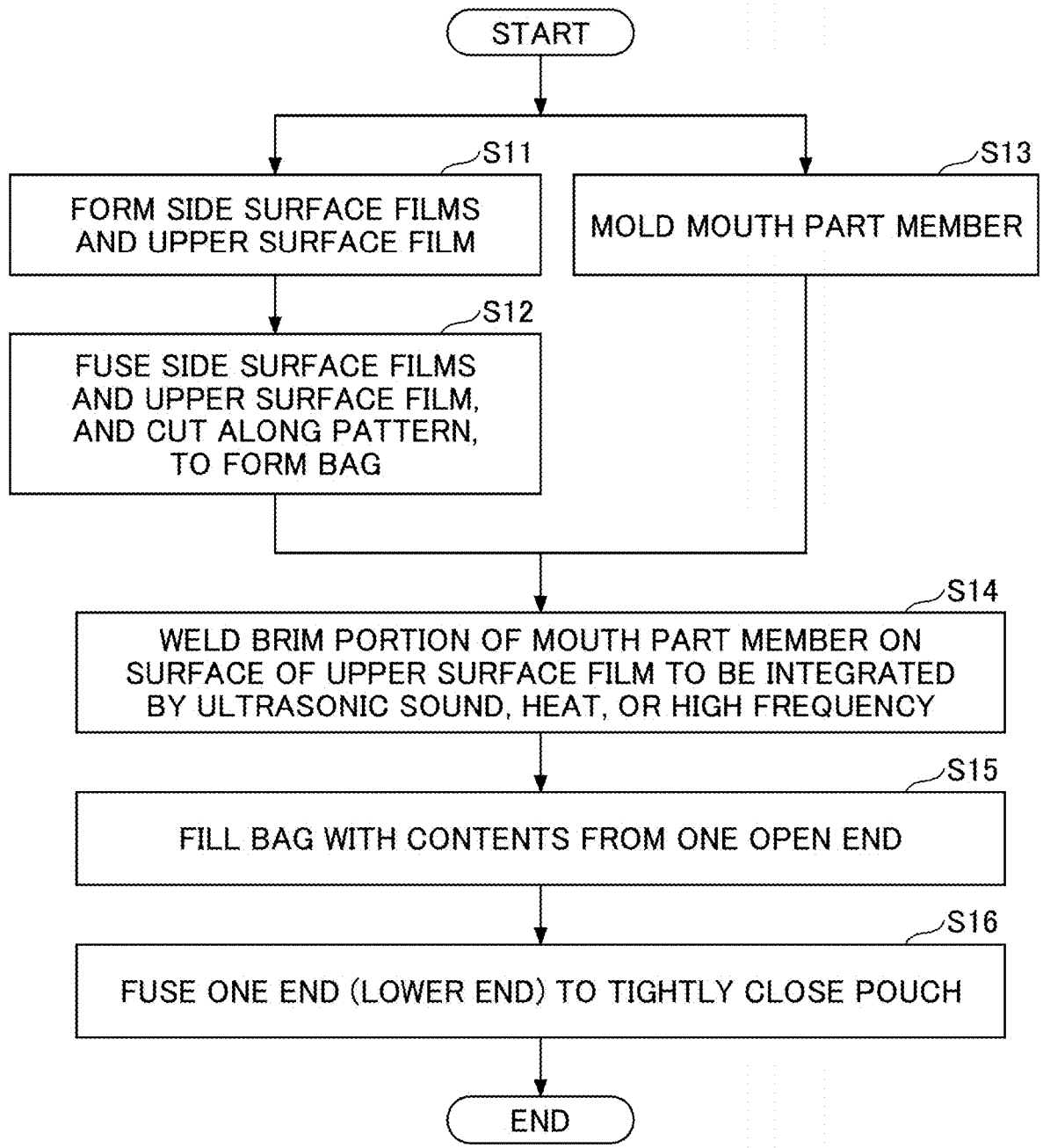
FIG. 2 is a flow chart of a first manufacturing method of a pouch container of the first configuration example of the present invention.

FIG. 2 is a flow chart of the first manufacturing method of the pouch container 1 according to the first configuration example of the present invention.

First, at Step S11, a film material F11 of the upper surface film 11 and film materials F12 and F13 of the side surface films 12 and 13 are formed. Alternatively, the film materials may be ordered from an external vendor in advance. Here, the upper surface film 11 has a thermoplastic outer resin layer 111 (121, 131) on the surface, a metal layer 112 (122, 132) inside, and a thermoplastic inner resin layer 113 (123, 133) as the innermost layer.

Further, at Step S12, ends of the upper surface film material F11 and ends of the side surface film materials F12 and 13 are fusion-bonded, and then, the film materials are cut off (cut) along a pattern of the film to form a bag having one open end.

Meanwhile, in parallel with Steps S11 and S12, a mouth part (spout) 20 made of a resin is molded at Step S13. Alternatively, the mouth part member may be ordered from an external vendor in advance.

Then, at Step S14, onto the thermoplastic resin layer 111 on the surface of the upper surface film 11, which serves as the upper surface of the pouch bag, the lower surface 211 of the thermoplastic resin brim portion 21 of the mouth part 20 is attached (fusion-bonded) by integrating the resins, by any one of ultrasonic, heat, and high-frequency welding methods.

At Step S15, the pouch bag is filled with contents (not illustrated) from the open end.

At Step S16, ends (lower ends) of the pouch bag are fusion-bonded together to seal the inside of the pouch.

These steps will be described in detail in the following.

First Configuration Example

Figure 3:
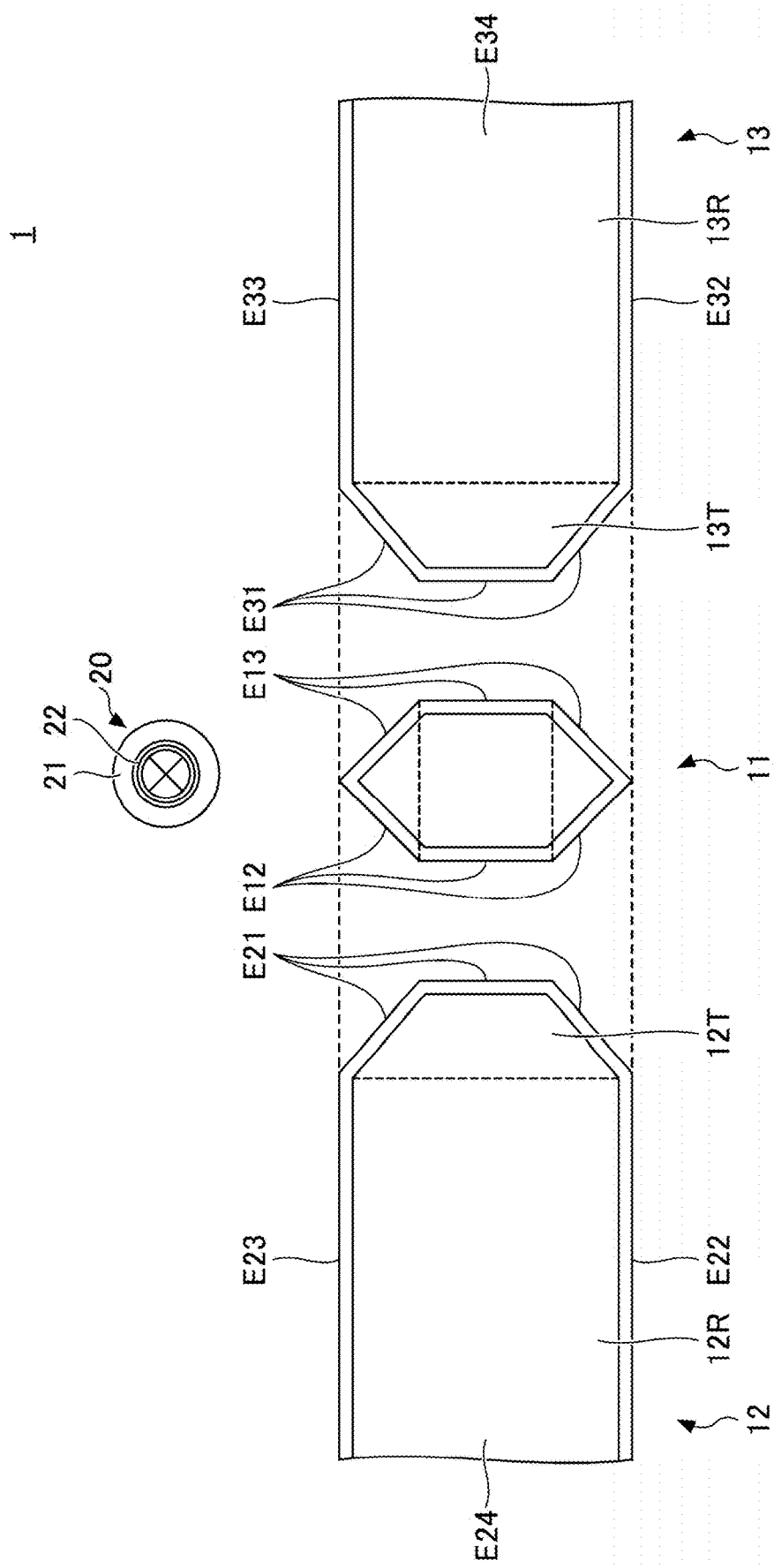
FIG. 3 is an exploded view of the pouch container according to the first configuration example of the present invention, exploded into side surfaces, an upper surface, and a mouth part.

FIG. 3 is an exploded view of the pouch container 1 according to the first configuration example of the present invention, exploded into the two side surfaces, the upper surface, and the mouth part.

In the present configuration example, the upper surface film 11 as a first film is hexagonal.

Each of the two side surface films 12 (13) as second films has a shape combining a rectangle 12R and a trapezoid 12T, and a short side as the upper side of the rectangle 12R (13R) and the lower base of the trapezoid 12T (13T) are formed continuously.

Figure 4:
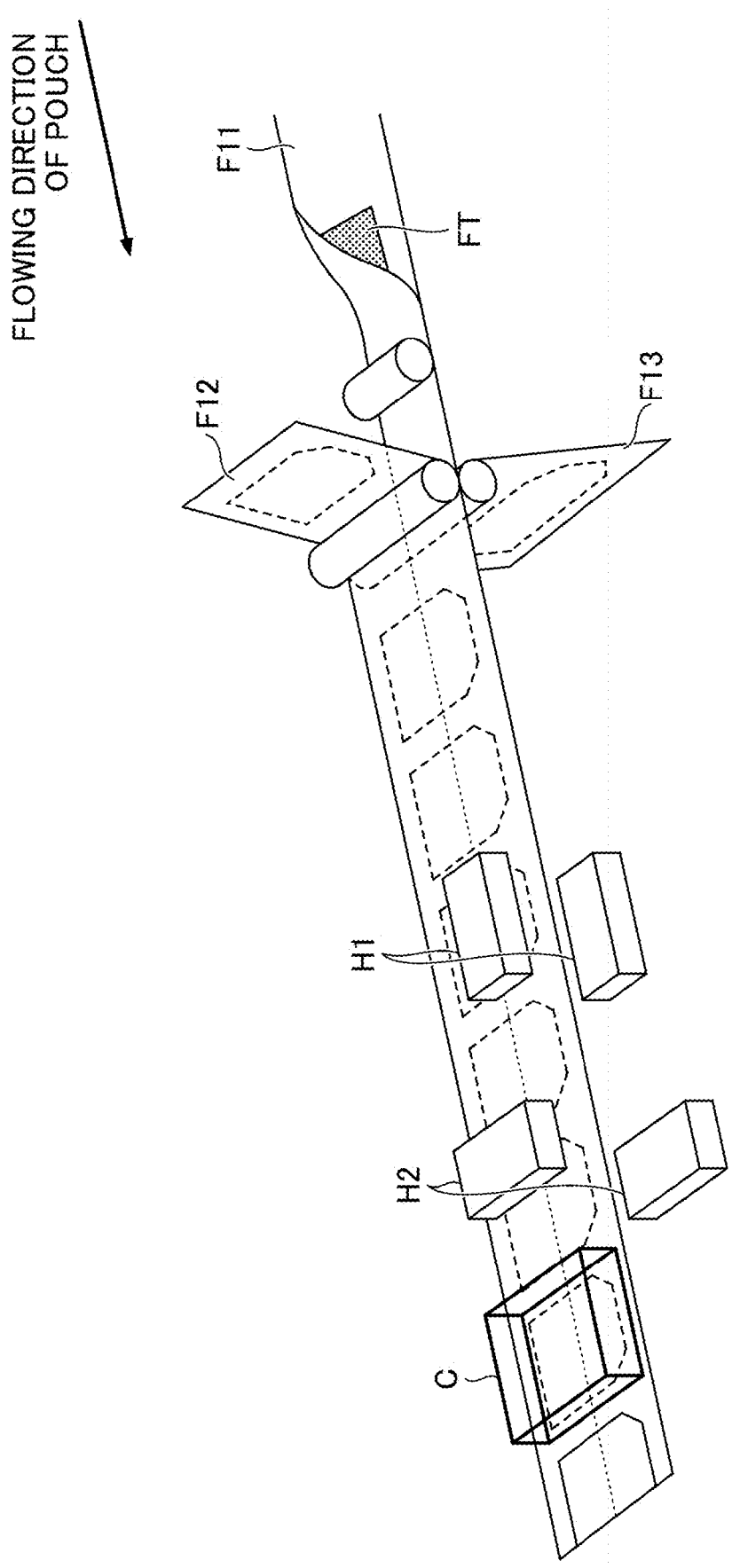
FIG. 4 is an explanatory diagram in which films are welded together to form a pouch bag of the first configuration example in the first manufacturing method.

FIG. 4 is an explanatory diagram of an example of a step in which films are stacked and welded to form a pouch bag (Step S12) in the first manufacturing method.

Using FIG. 3 and FIG. 4, Step S11 in FIG. 2 as a step of forming a pouch bag by joining the films 11, 12, and 13 together, will be described.

As illustrated in FIG. 4, a belt-shaped upper surface film material F11 to become the upper surface film, is supplied in a lateral direction, and conveyed while being folded in half by a center folding plate FT. Also, a belt-shaped side surface film material F12 to become the side surface film 12, is supplied from above, and a belt-shaped side surface film material F13 to become the side surface film 13, is supplied from below. Accordingly, after joining, the half-folded upper surface film material F11 in a state of being sandwiched from the top and bottom by the side surface film materials F12 and F13, is conveyed.

Further, by using a pair of seal bars H1 as heating members, the ends of the respective films in the upper surface film material F11 and the side surface film material F12, and the upper surface film material F11 and the side surface film material F13 (a seal portion E12 and a seal portion E21, and a seal portion E13 and a seal portion E31 in FIG. 3) are welded. Note that in FIG. 4, although the pair of seal bars H1 each having a rectangular parallelepiped shape is illustrated, the heating portion in the pair of seal bars H1 has a trapezoidal shape along the end (seal portion E) of the shape of the film after cut.

Note that in the step of fusion-bonding described above and a step of welding the mouth part 20 that will be described later, a surface treatment such as Teflon (registered trademark) or the like is applied to the heating member so as to avoid the inner resin layer or the outer resin layer of the film from adhering to the heating member.

Thereafter, by using a pair of seal bars H2 as heating members, the side ends of the side surface film material F12 and the side surface film material F13 (the seal portion E22 and the seal portion E32, and the seal portion E23 and the seal portion E33 in FIG. 3) are welded. As illustrated in FIG. 4, by continuously forming patterns of the film on the belt-shaped film material, the side ends on the downstream side of the pattern of the side surface films 12 and 13 on the upstream side, and the side ends on the upstream side of the pattern of the side surface films 12 and 13 on the downstream side can be welded at the same time by heating the seal bars H2 once.

After the ends are welded, by cutting the film materials along the pattern of the film by a cutting means C, a film bag having only one open end is formed. On the lower surface of a cutting means C, for example, a Thomson blade corresponding to the shape of the side surface film 12 is provided, and bags are cut out one by one by the Thomson blade having the shape of the pattern. The cutting completes Step S12.

Note that in FIG. 3 and FIG. 4, although the step of cutting is executed after the step of welding the film ends is completed for the film materials in a state before being cut individually, the welding of the film ends may be executed after the films are cut.

Thereafter, after the mouth part 20 is attached and contents are filled, at Step S16, the lower end E24 of the side surface film 12 on one side and the rectangular lower end E34 of the side surface film 13 on the other side are fusion-bonded to close the open end, so as to close the pouch bag, and seal the inside.

In this way, as being formed in a bag shape, the mouth part 20 does not come into contact with the contents. Therefore, once completed as a product, all the contents are surrounded by the pouch material.

Here, materials of the pouch film forming the side surface films 12 and 13 and the upper surface film 11, will be described.

Each of the upper surface film 11 and the side surface films 12 and 13 includes an air blocking layer that is capable of blocking air.

More specifically, the upper surface film 11 to which the mouth part member 20 is attached is configured to have a structure of three or more layers having resin layers 113 and 111 on the inner surface and the outer surface so as to sandwich the air blocking layer 112. The inner resin layer 113 is used for welding the ends, and the outer resin layer 111 is used for welding the mouth part 20 (see FIG. 6 to FIG. 8).

Also, each of the side surface films 12 and 13 is configured to have a structure of two or more layers including at least an air blocking layer 122 or 132 and a resin layer 123 or 133 on an inner surface side for welding an end. Note that each of the side surface films 12 and 13 may also be provided with a resin layer 121 or 131 on the outer surface side, outside the air blocking layer 122 or 132.

One example of the air blocking layer is a metal layer. It is favorable that the metal of the metal layer is any one of aluminum, iron, gold, silver, titanium, tin, zinc, platinum, ruthenium, palladium, iridium and the like, an alloy (tin-plate), or a metal oxide (aluminum oxide (alumina) or the like). Here, "including a metal layer" means being entirely formed of a metal film, or forming a metal film by vapor-depositing a metal on a surface or an inner surface of another material (e.g., resin or the like). Note that the metal of the metal layer is favorably an aluminum layer. Note that the metal layer is an air blocking material, and as well, is a light blocking material.

Alternatively, the air blocking layer may be an inorganic layer. The inorganic layer is a layer configured to contain an inorganic substance such as silica (silicon dioxide). The inorganic layer can be colored to have light-blocking properties, or can be configured to be transparent to have no light-blocking properties.

Such an inorganic layer may be an inorganic deposition layer formed by depositing an inorganic substance on a resin sheet. By forming the inorganic vapor deposition layer, the flexibility of the film can be improved. The inorganic substance to be deposited is, for example, silica or the like.

Meanwhile, the resin of the resin layers forming the inner surface and the outer surface is made of, for example, an olefin-based resin. The olefin-based resin is a general term for a chain hydrocarbon having one double bond, and is a thermoplastic resin whose physical properties change depending on the degree of crystallinity as being formed of a crystalline polymer. As the olefin-based resin, polypropylene (PP), low-density polyethylene (LDPE), ethylene-vinyl acetate copolymer (EVA), polymethylpentene (TPX), ultra-high molecular weight polyethylene, and the like may be enumerated. The olefin-based resin is chemically stable, and resistant to acids and alkalis.

Alternatively, the outermost resin layer of the upper surface film may be made of an ester-based resin that is a thermoplastic resin. As the ester-based resin, polyethylene terephthalate (PET) and the like may be exemplified. The ester-based resin exhibits excellent corrosion resistance to acids.

Further, when attaching the mouth part 20 to the upper surface film, by making the lower surface of the brim portion 21 of the mouth part 20 also as a resin layer, the resins can be integrated for the attachment; therefore, the lower surface of the brim portion 21 of the mouth part 20 is also made of the olefin-based resin or ester-based resin described above.

The mouth part 20 requires strength to withstand screwing of a cap 30 or a spiral cylinder 65 of a pump head F or G, which will be described later, and hence, is configured to include resin, for example, a plastic such as polyethylene (PE), polypropylene (PP), polybutylene terephthalate (PET), polyethylene terephthalate (PET), or the like (see FIG. 44 to FIG. 47).

Also, in the first configuration example, in the case of being manufactured by the first manufacturing method or the third manufacturing method, the lower surface of the brim portion of the mouth part 20 is made of an olefin-based resin or an ester-based resin.

In this case, it is favorable that the resin layer forming the lower surface of the brim portion 21 of the mouth part 20 and the resin layer forming the outer surface of the upper surface film are made of resins having similar or identical melting temperatures.

FIG. 5 is a general explanatory diagram illustrating how the mouth part 20 is attached to the upper surface film 11 in the first manufacturing method.

In the first manufacturing method, as illustrated in FIG. 2, the upper surface film and the side surface films are composed into a bag shape at Step S12, and then, the mouth part 20 is welded to the upper surface film 11 at Step S14.

Figure 6:
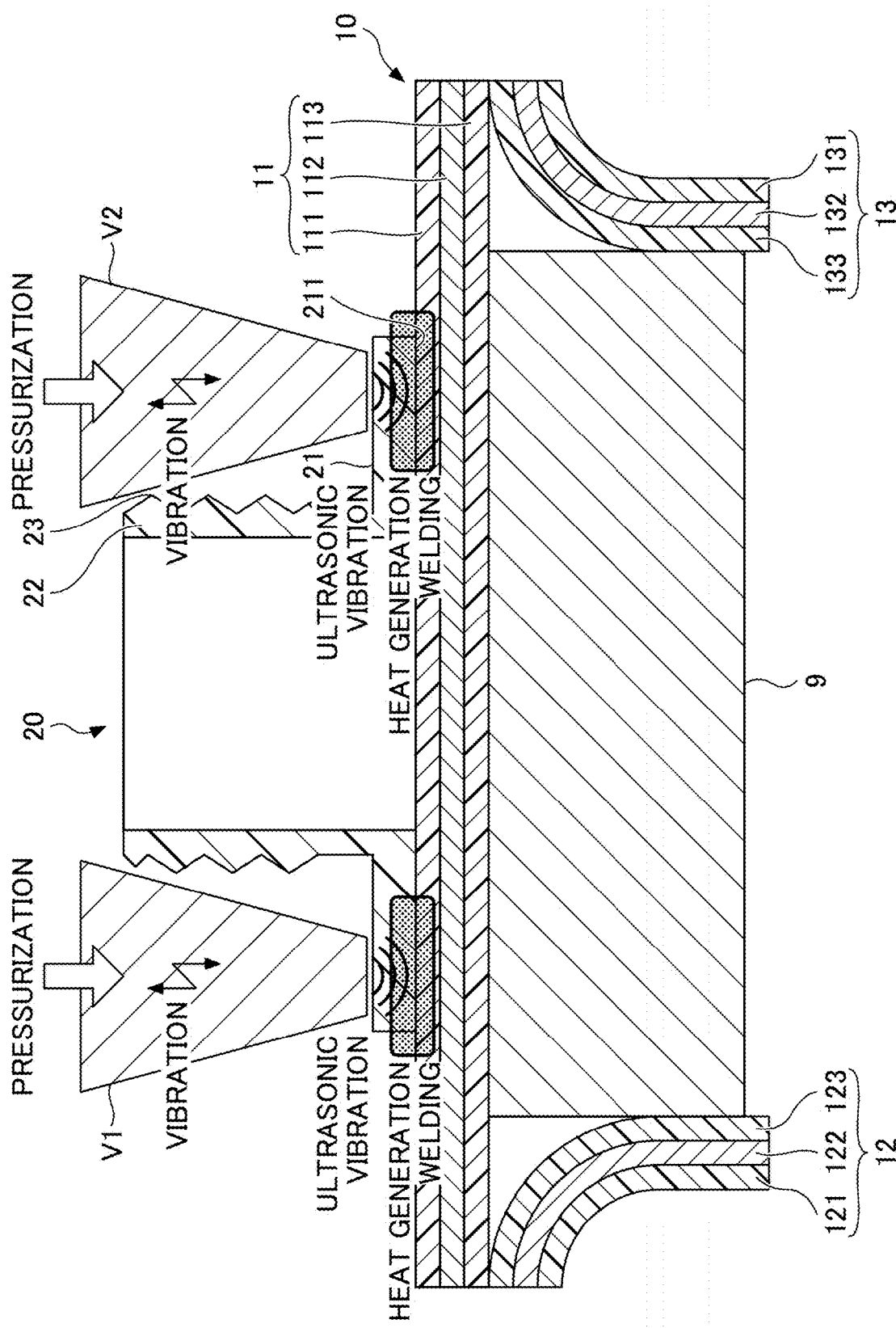
FIG. 6 is an explanatory diagram in which a mouth part is welded to an upper surface film by ultrasonic sound in the first manufacturing method.

Therefore, in order to have the mouth part 20 well welded to the outside of the upper surface film 11, at step S14, a bag that couples the upper surface film 11 with the side surface films 12 and 13 is put on a cylindrical pedestal (jig) 9, to set the upper surface film 11 in a stretched state, and weld the mouth part 20 from above (see FIG. 5 and FIG. 6).

Specific welding methods at Step S14 will be described in the following with reference to FIG. 5 to FIG. 8.

(Ultrasonic Welding)

FIG. 6 is an explanatory diagram in which the mouth part 20 is welded to the upper surface film 11 by ultrasonic sound in the first manufacturing method.

As described above, each of the upper surface film 11 and the side surface films 12 and 13 is configured to have a structure of three or more layers including the outer resin layer 111 and the inner resin layer 113 that are resin layers on the outer surface and the inner surface, respectively, so as to have the metal layer 112 sandwiched in-between.

Ultrasonic welding is a processing technique by which thermoplastic resin is instantaneously melted and bonded by fine ultrasonic vibration and pressure.

A device that executes ultrasonic welding is structured to have a shape that has horns V1 and V2 as resonators attached to an ultrasonic vibrator. By concentrating the ultrasonic vibration at the tips of the horns V1 and V2, strong impact is applied to the brim portion 21 of the mouth part 20 to be welded.

More specifically, (1) when vibration energy is generated by the ultrasonic vibrator, the energy is transmitted to the brim portion 21 of the mouth part 20 as a part, through the horns V1 and V2.

(2) Heat generation on the surface of the part due to the impact of vibration from the horn V1 and V2 is very small, and most of the impact is transmitted to the boundary surface between the brim portion 21 and the upper surface film 11 as parts to be welded.

(3) Strong frictional heat is generated at the boundary surface by the transmitted vibration energy, and the temperature rises instantaneously to the melting temperature of the resins, and welding is completed.

Ultrasonic welding executed in such a flow has advantages such that the time required for welding is short; automation is easy; high airtightness can be obtained; power consumption is low; reproducibility is high; control is easy; no bad smell is generated; and the like.

Note that although the horns V1 and V2 having a funnel shape are illustrated in FIG. 6, the horns may have other shapes. For example, the horns may have a rectangular parallelepiped shape or a cylindrical shape surrounding the standing portion 22 of the mouth part 20.

(Welding by Heat)

Figure 7:
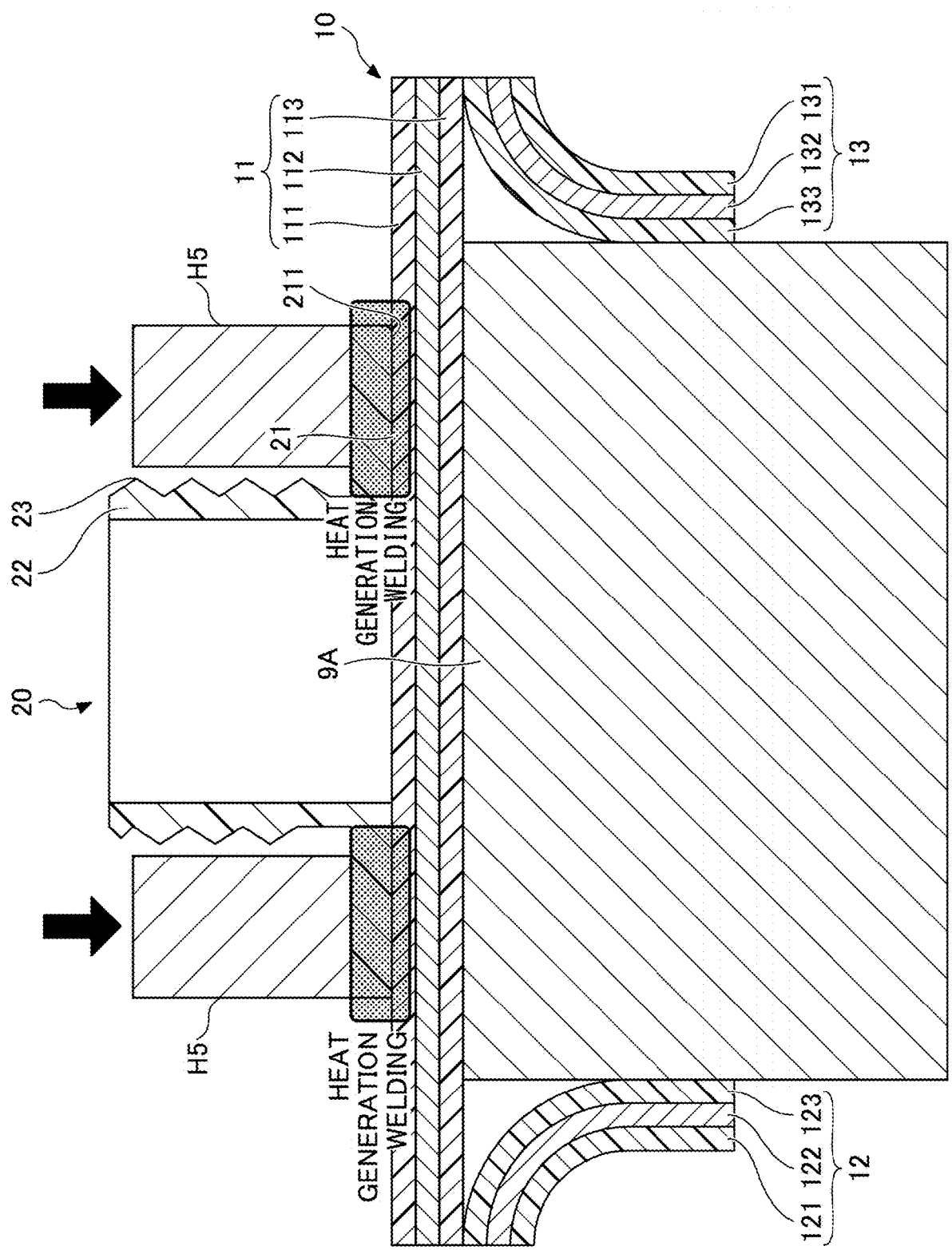
FIG. 7 is an explanatory diagram in which a mouth part is welded to an upper surface film by heat using a heating element in the first manufacturing method.

FIG. 7 is an explanatory diagram in which the mouth part is welded to the upper surface film by heat using a heating element in the first manufacturing method.

The pouch bag 10 is supported by a cylindrical pedestal (jig) 9A, and a cylindrical heating part H5 is provided above the brim portion 21 of the mouth part 20.

When the cylindrical heating part H5 heats the brim portion 21 from above, the resins of the upper surface layer 111 of the upper surface film 11 and the lower surface 211 of the brim portion 21 of the mouth part 20 are melted and welded.

As other welding methods using heat, the mouth part 20 may be attached to the upper surface film 11, by using a thermal welding method including, for example, a hot air method, a hot plate method, an impulse method, a trowel method, a laser method, and the like.

(Welding by High Frequency)

Figure 8:
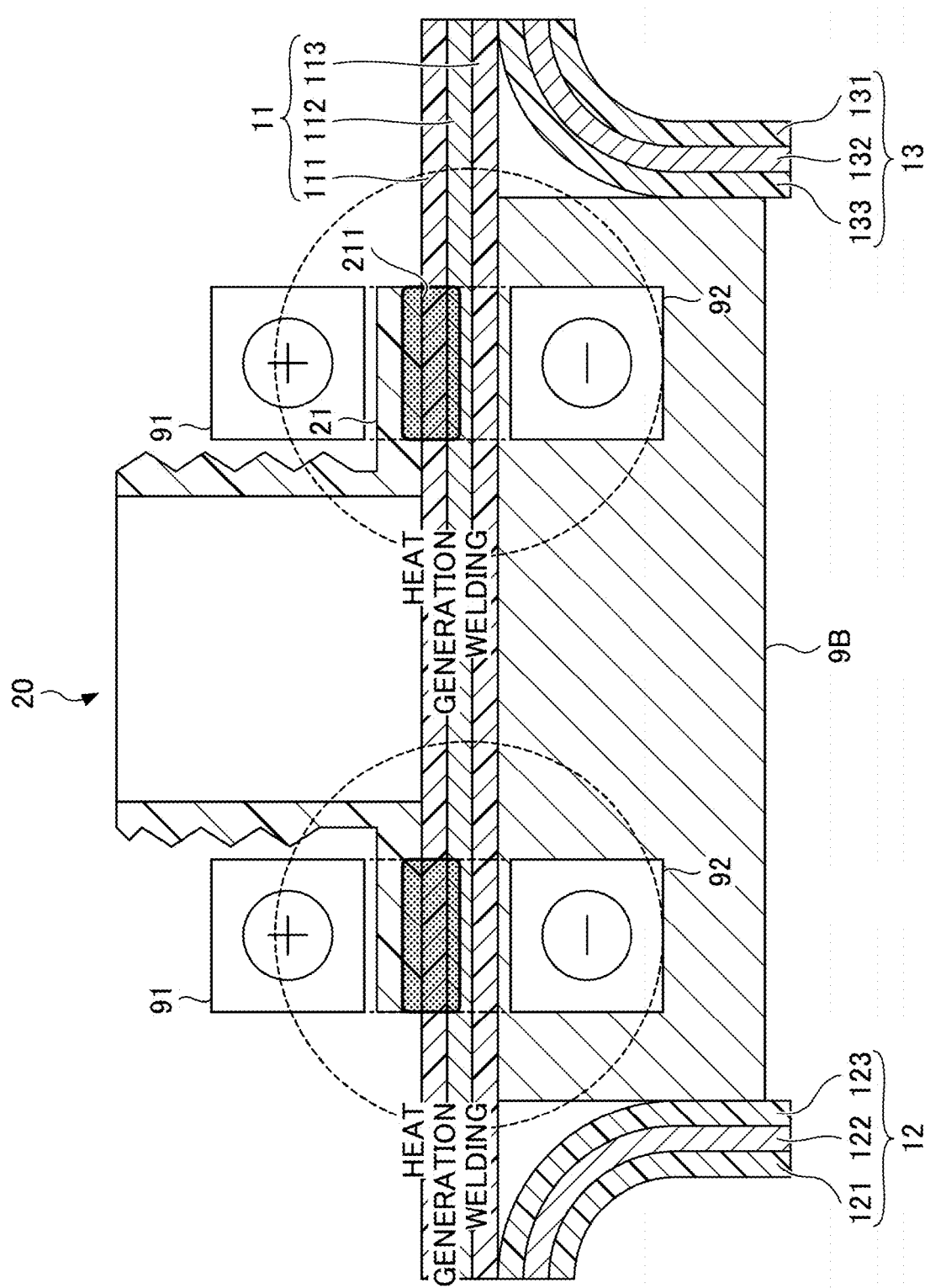
FIG. 8 is an explanatory diagram in which a mouth part is welded to an upper surface film by high frequency in the first manufacturing method.

FIG. 8 is an explanatory diagram in which the mouth part 20 is welded to the upper surface film 11 by high frequency in the first manufacturing method.

High-frequency welding is a technique in which a strong electric field generated by high frequency as a category of radio waves is applied to thermoplastic resin, to generate collision, vibration, and friction at a molecular level inside a substance, so as to generate self-heating, and thereby, the resins (in particular, in a form of films) are fusion-bonded and welded.

More specifically, as a device for high-frequency welding, a positive electrode and a negative electrode, as high-frequency metal molds, are provided so as to sandwich resins to be welded. For example, a positive electrode 91 is provided above the brim portion 21 of the mouth part 20, and a negative electrode 92 is provided in the upper surface of an electrode base 9B. The electrodes 91 and 92 have cylindrical shapes to cover the brim portion 21 from above and below.

In this way, an electric field of energy of high frequency at tens of kHz generated by the electrodes acts on the resins sandwiched between the electrodes 91 and 92 from the two electrodes 91 and 92, and thereby, causes potential motion at an atomic or molecular level, to heat the brim portion 21 of the mouth part 20 and the surface resin layer 111 of the upper surface film 11 as the resins, from the inside, to selectively heat a portion to be melted, and thereby, the portion is welded.

In this high-frequency welding, only a portion to be welded is heated, and hence, welding can be executed within a short time; in addition, a portion not to be welded is not affected by the heat, and hence, a welded surface can be beautifully finished.

Also, in any of the welding methods in FIG. 6 to FIG. 8, an adhesive as a consumable material is not used; therefore, the cost is low and the finish can be made beautiful.

Also, as long as welding is executed between substantially the same materials as between the brim portion 21 of the mouth part 20 and the surface resin layer 111 of the upper surface film welding of high strength can be accomplished at a level close to the base material strength.

Therefore, the pouch container 1 with the mouth part attached by such a welding method can prevent the mouth part 20 from coming off even when used in high-temperature and high-humidity circumstances such as a bathroom and a washroom (see FIG. 1).

(Filling)

Figure 9:
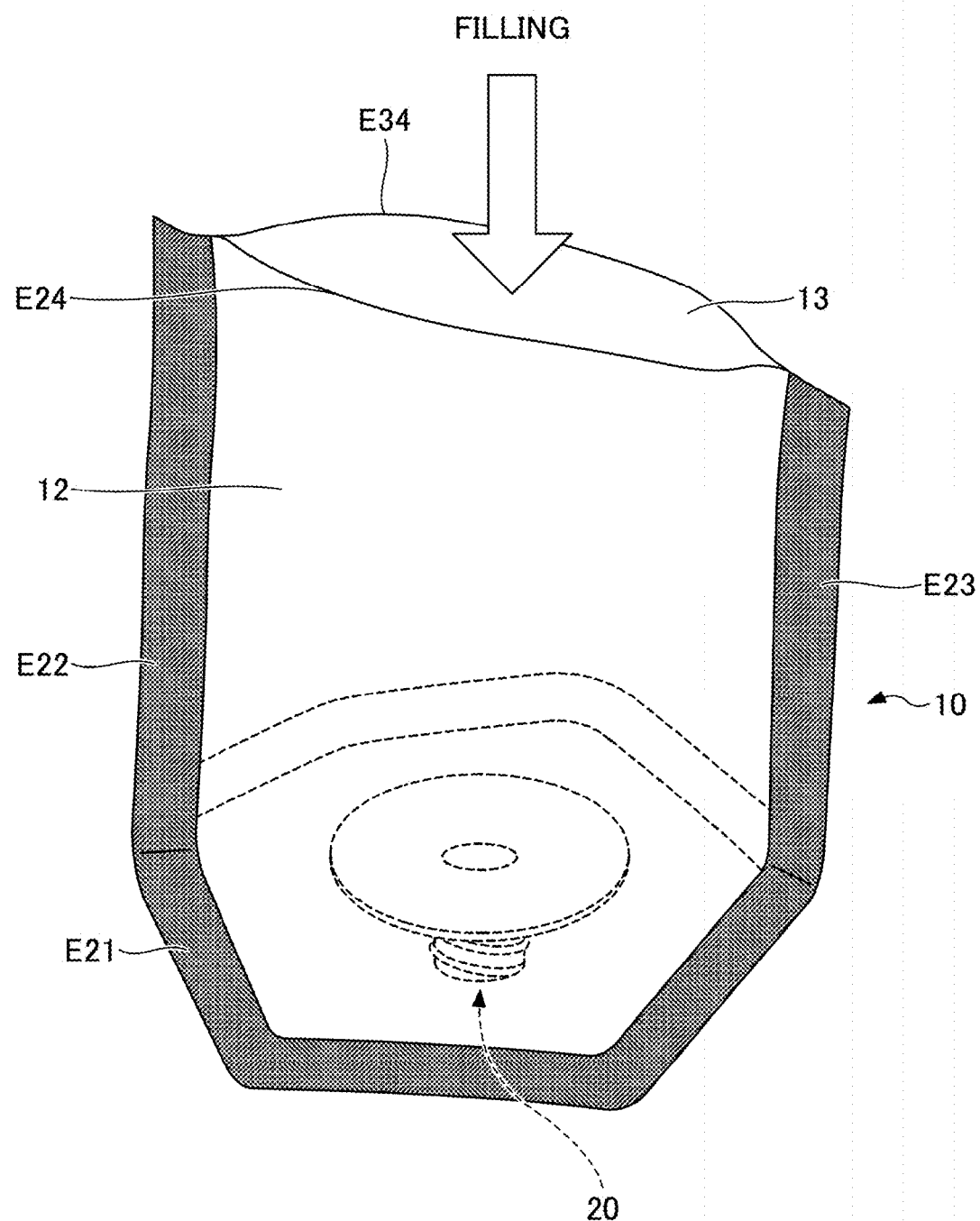
FIG. 9 is an explanatory diagram illustrating a state of a pouch bag when being filled with contents from the rear end.

FIG. 9 is an explanatory diagram illustrating a state of a pouch bag when being filled with contents from the rear end.

As illustrated in FIG. 9, filling of the contents at Step S15 is executed from the bottom part as the open end of the pouch bag 10, i.e., from the side of the lower ends E24 and E34 of the side surface films 12 and 13.

However, as another example of filling, in the stage of forming the pouch bag at Step S12, part of lateral sides of the side surface films 12 and 13 may be left open without being fusion-bonded, to fill the pouch bag with the contents from the opening formed on the lateral sides of the side surface films 12 and 13 with the lateral sides facing upward at Step S15.

(End Closing)

Figure 10:
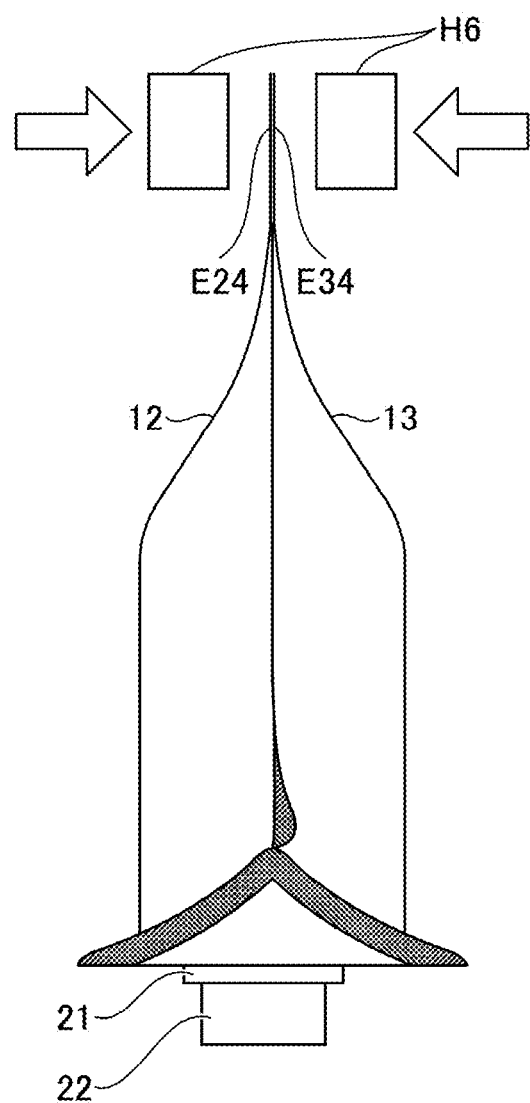
FIG. 10 is a diagram illustrating closure of the rear end of a pouch bag.

FIG. 10 is a diagram illustrating closure of the rear end of a pouch bag. With FIG. 10, closing by using heat and pressure will be described.

As described above, as the side surface film has a three-layer structure, as illustrated in FIG. 10, by having the side surface films sandwiched between a pair of heat seal plates (seal bars) H6 to be heated, the lower ends E24 and E34 of the side surface films 12 and 13 are thermally welded to close the pouch bag 10.

Note that after the filling in FIG. 9, by closing the lower ends under an environment being shielded from light and filled with inert gas such as argon or nitrogen, oxidation of the contents after the filling can be blocked.

(Lower End Folding)

In the flow in FIG. 2 described above, although the manufacturing flow is completed with closing the pouch bag at Step S16, a step of folding the lower end of the pouch bag may be further included after Step S16.

Figure 11:
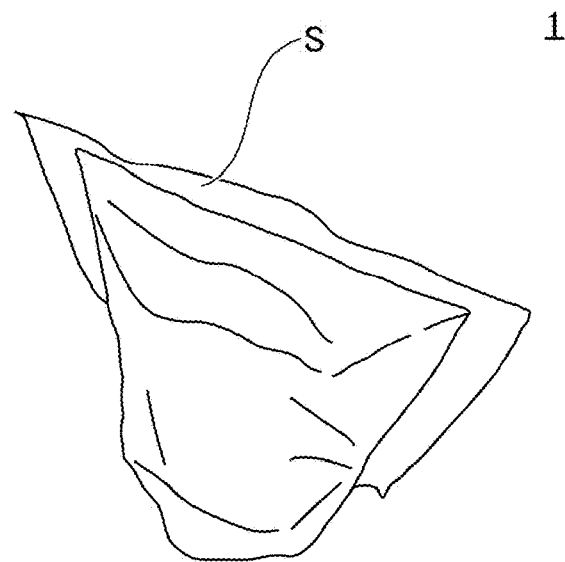
FIG. 11 is a diagram illustrating folding at the rear end (a diagram illustrating a state of the pouch bag turned upside down before the lower end is folded)
Figure 12:
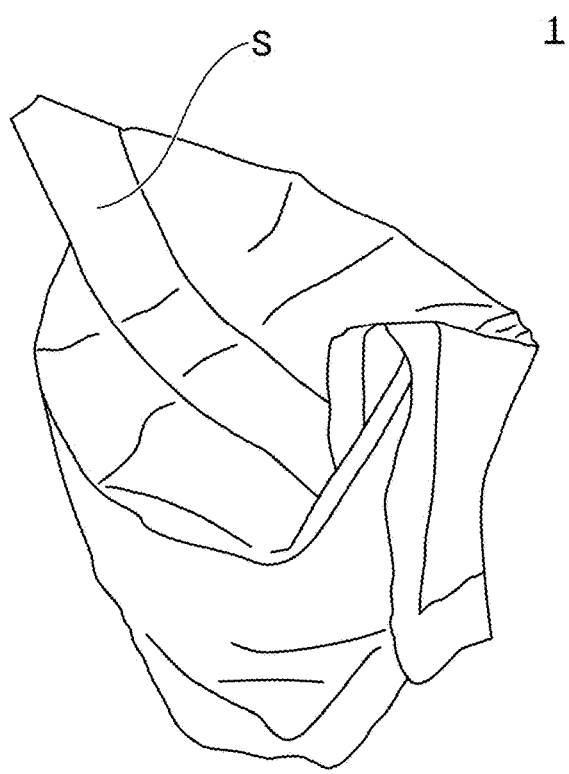
FIG. 12 is a diagram illustrating folding at the rear end (a diagram illustrating a state of the pouch being pressed at the center of the lower end)
Figure 13:
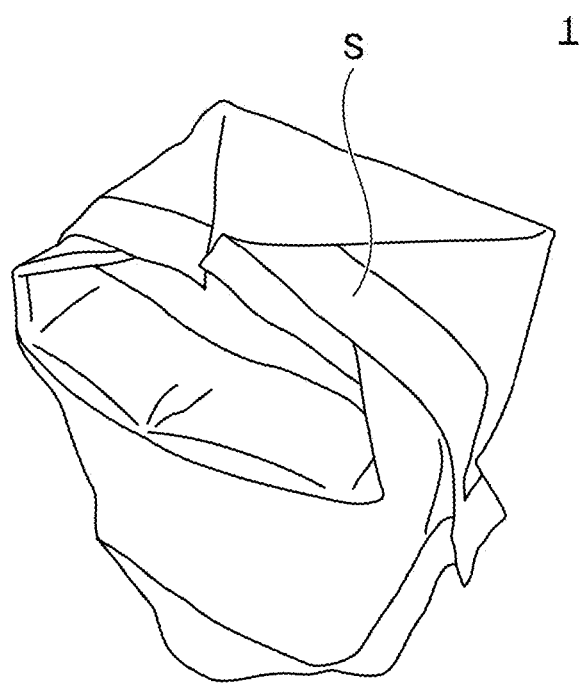
FIG. 13 is a diagram illustrating folding at the rear end (a diagram illustrating a state after folding the lower end)

FIG. 11 to FIG. 13 are diagrams illustrating folding of the rear end. Among these, FIG. 11 is a diagram illustrating a state of the pouch bag 10 being turned upside down before the lower end is folded; FIG. 12 is a diagram illustrating a state of the pouch bag 10 being pressed at the center of the lower end for folding; and FIG. 13 is a diagram illustrating a state after the lower end is folded.

By folding a lower-end welded portion S of the pouch bag 10 in this way, the pouch container 1 can be made more compact without changing the filling amount. Also, as illustrated in FIG. 1, the posture of the pouch container 1 can be stabilized in a state of the mouth part 20 facing upward. Further, as will be described later, the pouch container 1 is suitable for completely fitting into an outer container 50 in a configuration in which the pouch container 1 is accommodated in the outer container 50 as the inner container of a double container 5 (see FIG. 44 to FIG. 45).

Note that the folded end may be bonded with an adhesive, because the folded portion does not affect the contents even if it is peeled off.

<Second Manufacturing Method>

Figure 14:
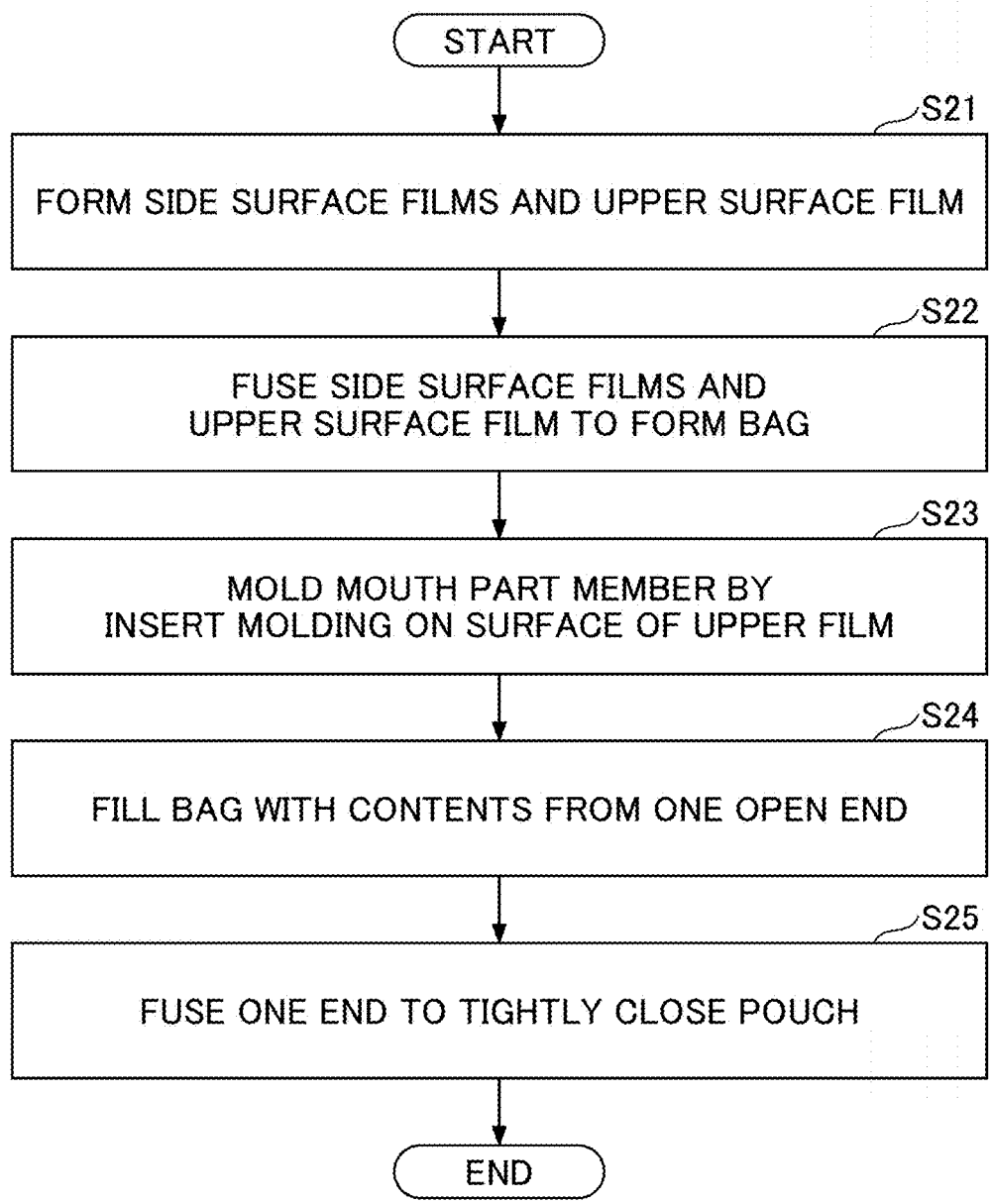
FIG. 14 is a flow chart of a second manufacturing method of a pouch container according to the first configuration example of the present invention.

FIG. 14 is a flow chart of a second manufacturing method of a pouch container 1 according to the first configuration example of the present invention.

Only differences from the first manufacturing method will be described.

In the present manufacturing method, the mouth part 20 is not molded in advance; after the upper surface film 11 and the side surface films 12 and 13 are formed into a pouch bag, the mouth part is molded by insert molding on the upper side of the upper surface film 11.

Figure 15:
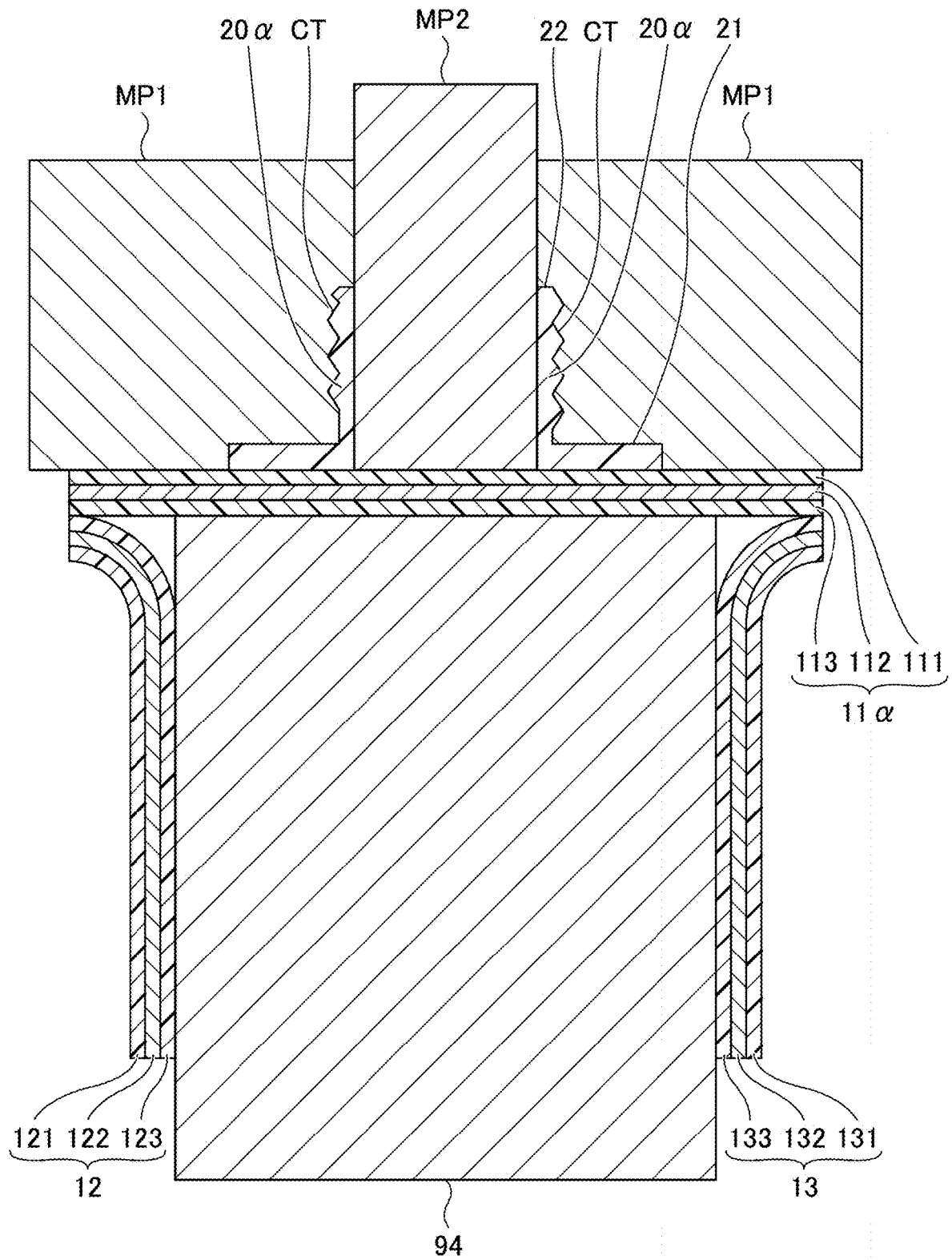
FIG. 15 is an explanatory diagram in which a mouth part is integrally formed by insert molding while the mouth part is being attached to the upper surface film in the second manufacturing method.

FIG. 15 is an explanatory diagram in which a mouth part is integrally formed by insert molding, while the mouth part 20α is being attached to the upper surface film 11 in the second manufacturing method.

Insert molding is a molding method in which a resin is injected around a metal component inserted into a metal mold, to integrate the metal and the resin. More specifically, in the insert molding method, an insert is installed in a cavity (concave part) CT while the metal mold is open, and then, the metal mold is closed to execute injection molding.

In FIG. 15, in a state of an upper surface film 11α of a pouch bag set on a jig 94 being brought into contact with a metal mold MP1, resin is injected into the cavity CT of the metal mold MP1 having a hole formed, and then, the mouth part 20α is molded in a state where a metal mold pin MP2 is inserted. Accordingly, the mouth part 20α provided with a brim portion 21 and a standing portion 22 is insert-molded by the resin so as to have the lower surface of the brim portion 21 of the mouth part 20α brought into close contact with a resin layer 111 on the surface of the upper surface film 11α of the pouch bag.

Also in this manufacturing method, an adhesive as a consumable material is not used; therefore, the cost is low and the finish can be made beautiful.

Also, as the mouth part 20α is integrally formed on the resin layer 111 on the surface of the upper surface film 11α made of the same material, the mouth part 20α and the upper surface film 11α are in close contact with each other at a level close to the strength of the base material.

Therefore, the likelihood that the mouth part comes off is very low for the pouch container with the mouth part having the mouth part 20α integrally formed by insert molding in this way, even if the pouch container with the mouth part is used in high-temperature and high-humidity circumstances such as a bathroom or a washroom.

Further, as the mouth part 20α made of resin can be formed at the same time when being attached to the upper surface film, steps of welding in the manufacturing flow can be reduced, a space for welding does not need to be provided. Instead, metal molds for simultaneous forming and attaching are required; therefore, it is favorable to appropriately select a manufacturing method according to a space and the like in a manufacturing device.

<Third Manufacturing Method>

Figure 16:
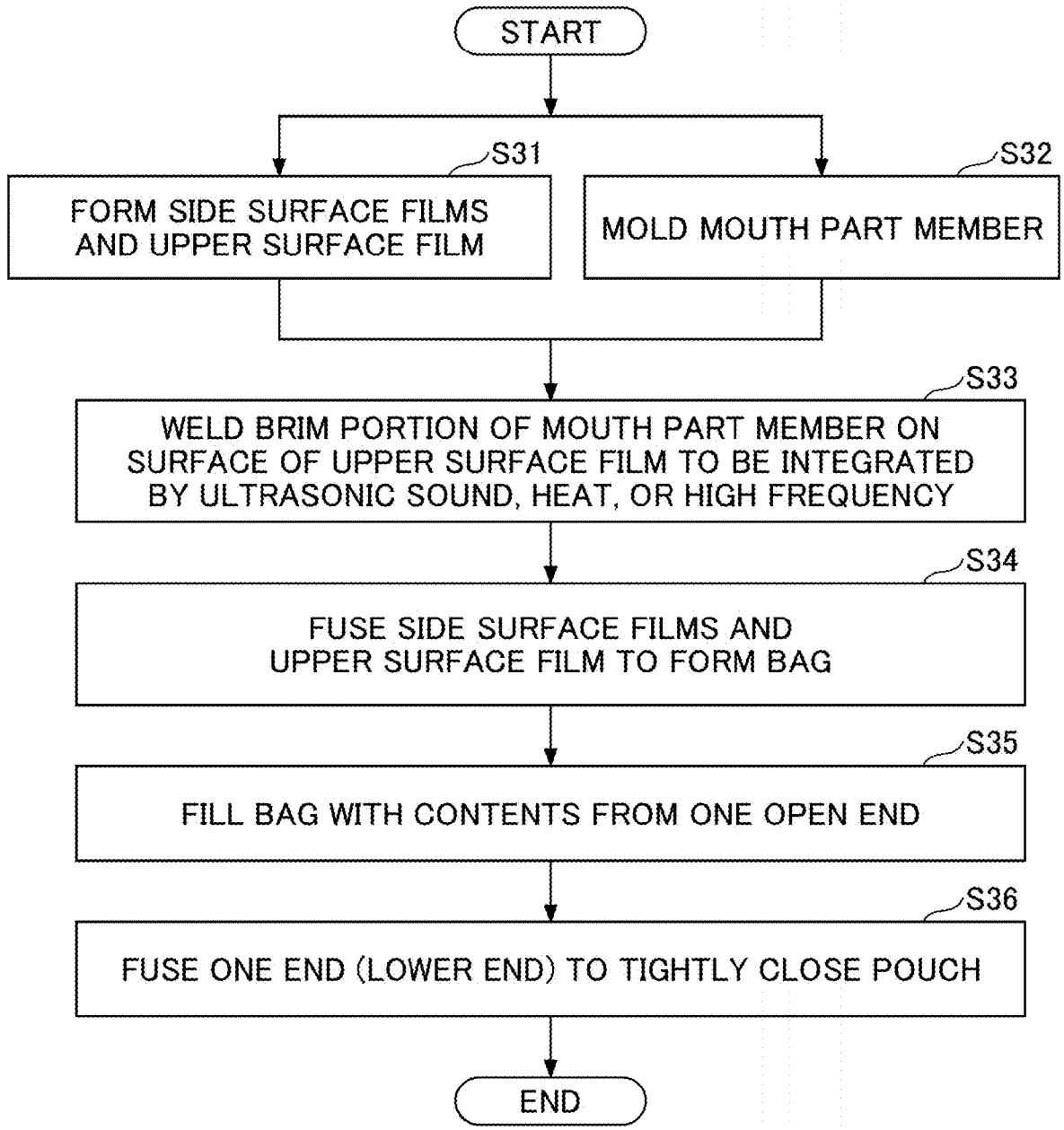
FIG. 16 is a flow chart of a third manufacturing method of a pouch container according to the first configuration example of the present invention.

FIG. 16 is a flow chart of a third manufacturing method of a pouch container 1 according to the first configuration example of the present invention. In the present manufacturing method, Step S33 is executed for welding a mouth part 20 to an upper surface film 11 before forming into a bag shape (Step S34), which is different as compared with the first manufacturing method.

Figure 17:
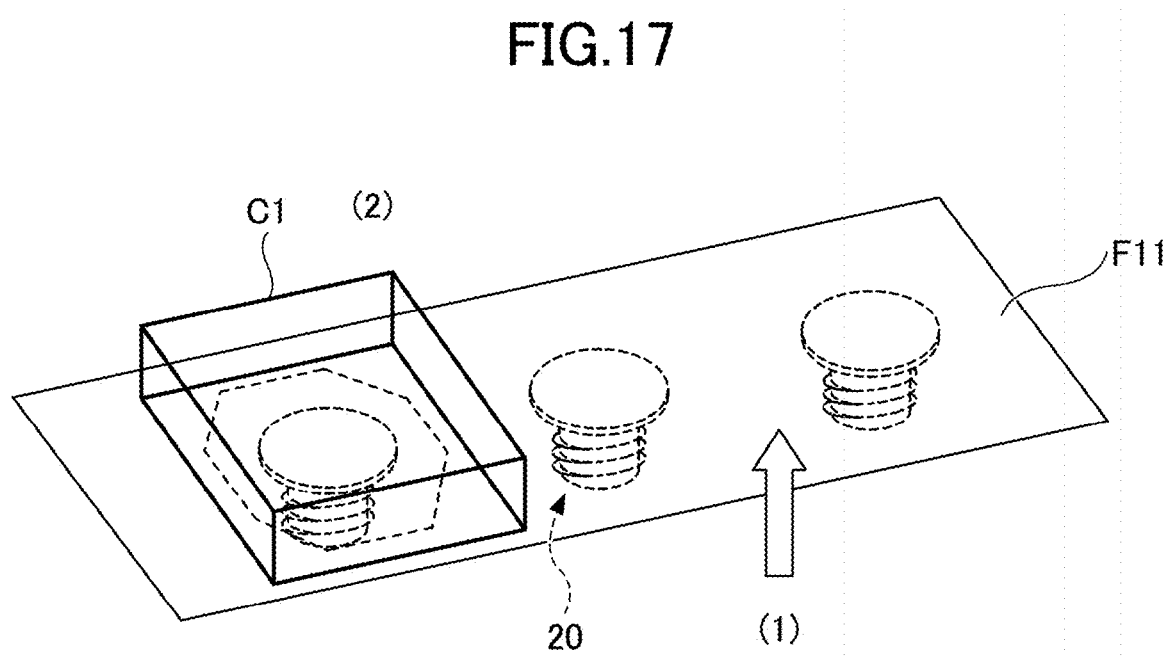
FIG. 17 is an explanatory diagram illustrating adhesion of a mouth part and an upper surface film in the third manufacturing method (a diagram illustrating a state of the mouth part being welded to the upper surface film material)
Figure 18:
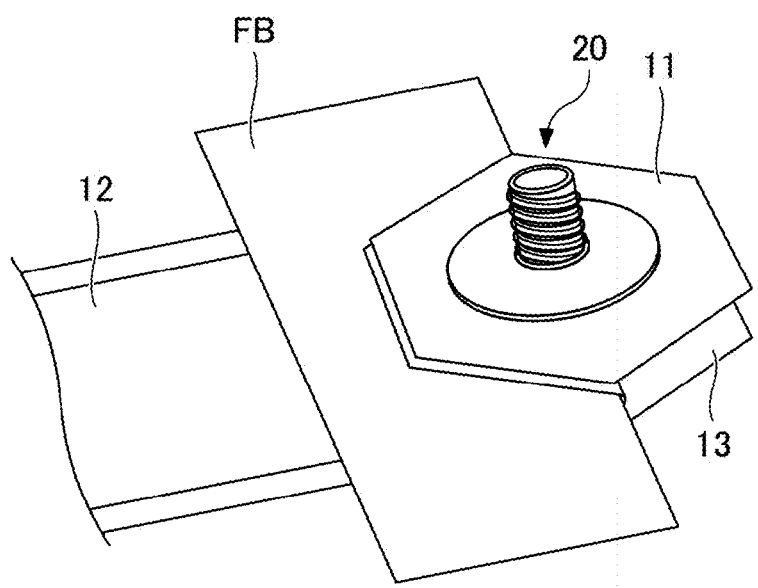
FIG. 18 is an explanatory diagram illustrating adhesion of a mouth part and an upper surface film in the third manufacturing method (a diagram illustrating a state in which an end of the upper surface film to which the mouth part is attached is fusion-bonded with ends of side surface films)
Figure 19:
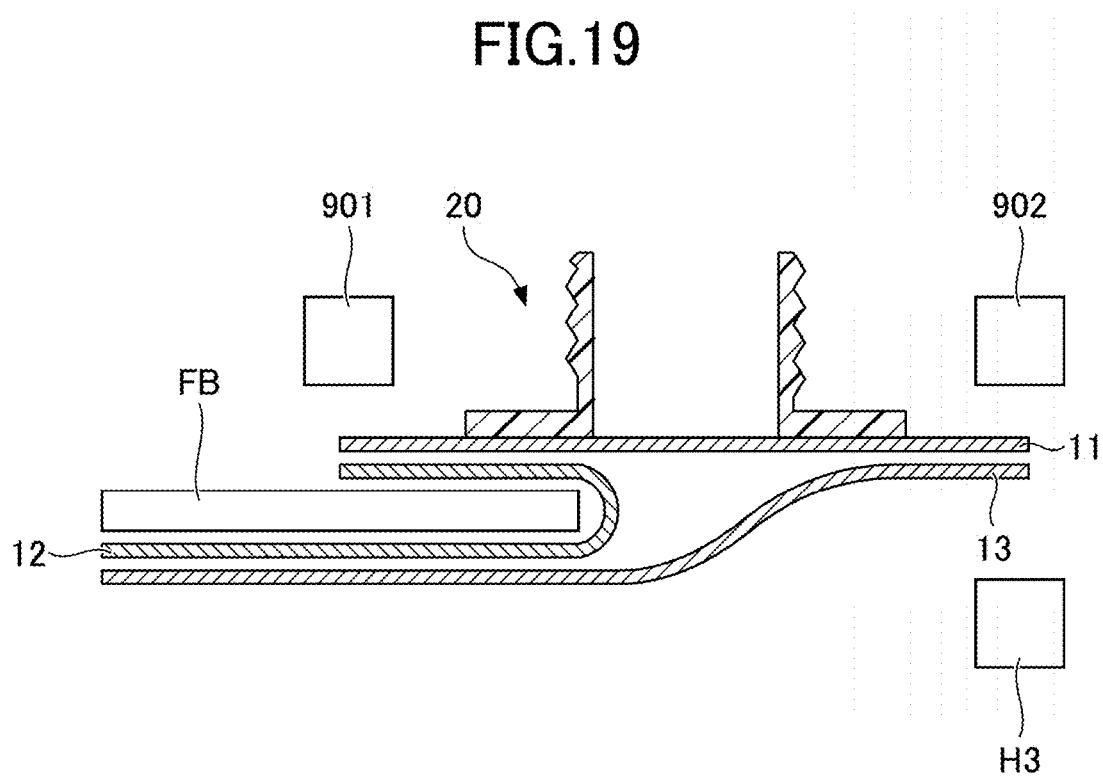
FIG. 19 is an explanatory diagram illustrating welding of a mouth part and an upper surface film in the third manufacturing method (a diagram illustrating a state in which heat sealing is applied to an end of a lower side surface film and an end of an upper surface film)

FIG. 17 to FIG. 19 are explanatory diagrams illustrating welding of the mouth part 20 to the upper surface film in the third manufacturing method. Among these, FIG. 17 is a diagram illustrating a state of the mouth part being welded to the upper surface film material; FIG. 18 is a diagram illustrating a state of the end of the upper surface film, to which the mouth part is attached, being welded to the end of a side surface film; and FIG. 19 is a diagram illustrating a state in which the end of a lower side surface film and the end of the upper surface film are heat-sealed.

Figure 20:
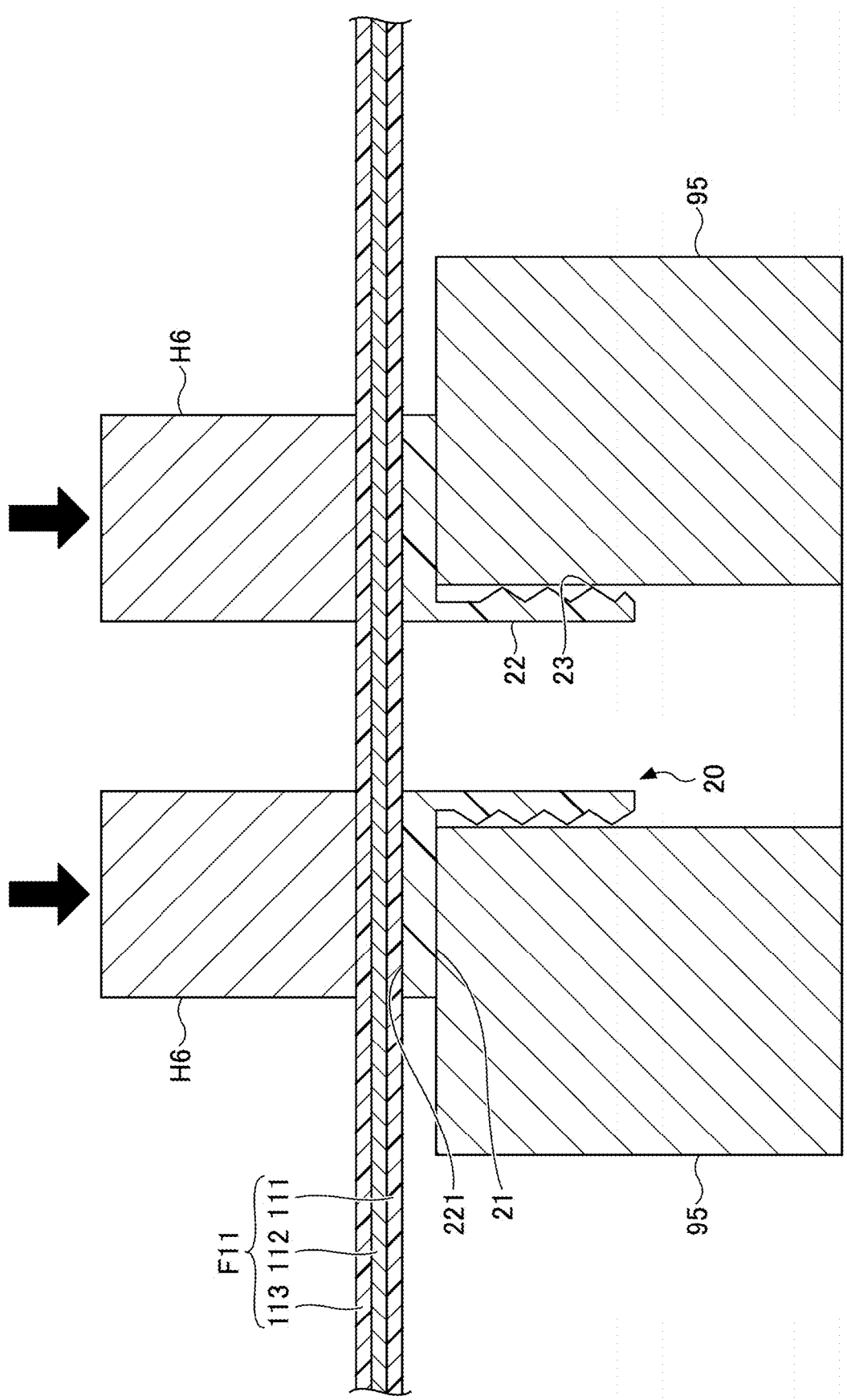
FIG. 20 is an explanatory diagram in which a mouth part is attached to an upper surface film by a heating element in the third manufacturing method.

As illustrated in FIG. 17, first, the mouth part 20 is welded to the upper surface film material F11 from the lower side. Details during welding are illustrated in FIG. 20. Thereafter, the film material F11 to which the mouth part 20 is attached is cut into a hexagonal shape by a cutting means C1. For example, a Thompson blade corresponding to the shape of the upper surface film 11 is provided on the lower surface of the cutting means C1, and by having the film material F11 cut by the hexagonal Thompson blade, the upper surface film 11 to which the mouth part 20 is attached is formed.

Then, the upper surface film 11 to which the mouth part 20 is attached is fusion-bonded with ends of side surface films 12 and 13. More specifically, as illustrated in FIG. 18, the upper surfaces of the side surface films 12 and 13 to which the ends are fusion-bonded are opened, and the upper side surface film 12 is folded back by inserting a fitting strip FB.

Thereafter, as illustrated in FIG. 19, while the upper surface film 11 is pressed from above by cradles (jigs) 901 and 902 arranged at edges of the hexagon and shaped to exclude the mouth part 20, a heating member H3 having a shape excluding the lower side of the trapezoid is placed on the lower side of the jig 902, and an end of the lower side surface film 13 and an end of the upper surface film 11 are heat-sealed. Thereafter, it is turned upside down so as to have the side surface film 12 come on the lower side, and the lower side surface film 12 and the upper surface film 11 are heat-sealed in substantially the same way.

FIG. 20 is an explanatory diagram of welding the mouth part to the upper surface film by heat welding in the third manufacturing method.

In the welding according to the third manufacturing method, as illustrated in FIG. 20, the mouth part 20 is fixed.

More specifically, the mouth part 20 is fixed by the upper end of a cylindrical receiving jig 95 formed so as to surround the outer circumferential surface of the standing portion 22 of the mouth part 20 and the upper surface of the brim portion 21.

Further, plate-shaped, rod-shaped, or roller-shaped heating parts H6 are provided on the inner resin layer 113 side (upper side) of the film material F11.

In a state where the film material F11 is stopped on the brim portion 21 of the mouth part 20 fixed by the lower receiving jig 95, the heating parts H6 press the film material F11 from above or move while pressing the upper surface of the film material F11, to heat the film material F11, and thereby, the resin of the surface resin layer 111 of the film material F11 and the resin of the lower surface 211 of the brim portion 21 of the mouth part 20 are melted and bonded.

Alternatively, the heating part H6 on the upper side may also have a cylindrical shape corresponding to the portion where the brim portion 21 of the mouth part 20 is formed. In this case, the heating part on the upper side is formed as a single component, and the upper surface layer 111 on the film material F11 and the lower surface 211 of the brim portion 21 of the mouth part 20 are welded by heating from above.

Also, in the third manufacturing method, as illustrated in FIG. 17 to FIG. 20, the upper surface film is not formed into a bag shape at a point of time when welding the mouth part 20. Therefore, the mouth part 20 can be welded to the upper surface film, not on the cylindrical jig 9 along the shape of the bag as illustrated in FIG. 4 and FIG. 5, but on a pedestal on a flat plate or in a film state of being unwound from a roll and applied with tension.

Note that although FIG. 17 to FIG. 20 illustrate an example in which the upper surface film is formed by cutting the upper surface film material F11 to have a predetermined shape and size after welding the mouth part 20 to a continuous film, the mouth part 20 may be attached after cutting the upper surface film material F11 into a hexagonal shape.

Note that although not illustrated, in the case of executing welding by heat or welding by high frequency, as illustrated in FIG. 20, the mouth part 20 may be welded by sandwiching the upper surface film to which tension is applied from above and below. Alternatively, the mouth part may be welded from above on a pedestal on a flat plate.

In the present embodiment, as the mouth part is attached before the film is formed into a bag shape, the degree of freedom in heating from the film side is improved. However, in the present embodiment, in the subsequent step of forming into a pouch bag shape, the simultaneous welding of the three ends by a general welding method as illustrated in FIG. 4 cannot be executed, and welding of the upper surface film and the two side surface films is executed in two or more steps. Therefore, it is favorable to appropriately select a manufacturing method in consideration of manufacturing facilities and the like.

Also, in the present manufacturing method or in any of the welding methods, an adhesive as a consumable material is not used; therefore, the cost is low and the finish can be made beautiful.

Also, as long as welding is executed between substantially the same materials as between the brim portion 21 of the mouth part 20 and the upper surface film material F11, welding of high strength can be accomplished at a level close to the base material strength. Therefore, the likelihood that the mouth part comes off is very low for the pouch container with the mouth part attached by such a welding method, even if used in high-temperature and high-humidity circumstances such as a bathroom or a washroom.

<Fourth Manufacturing Method>

Figure 21:
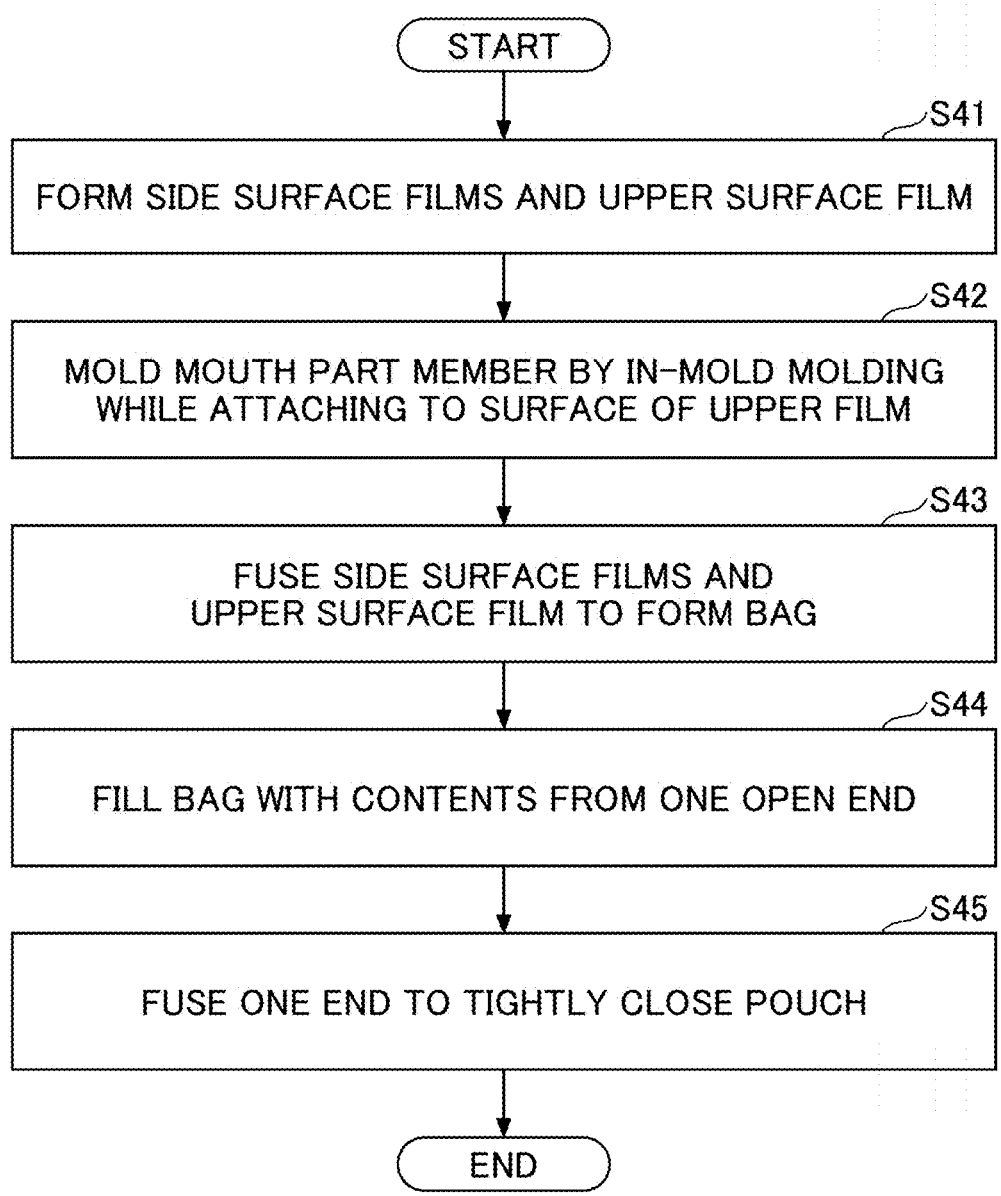
FIG. 21 is a flow chart of a fourth manufacturing method of a pouch container according to the first configuration example of the present invention.

FIG. 21 is a flow chart of a fourth manufacturing method of a pouch container 1 according to the first configuration example of the present invention. In the present manufacturing method, Step S42 in which a mouth part 20 is formed on an upper surface film 11 by in-mold molding, is executed before forming into a bag shape (Step S43), which is different as compared with the second manufacturing method.

Figure 22:
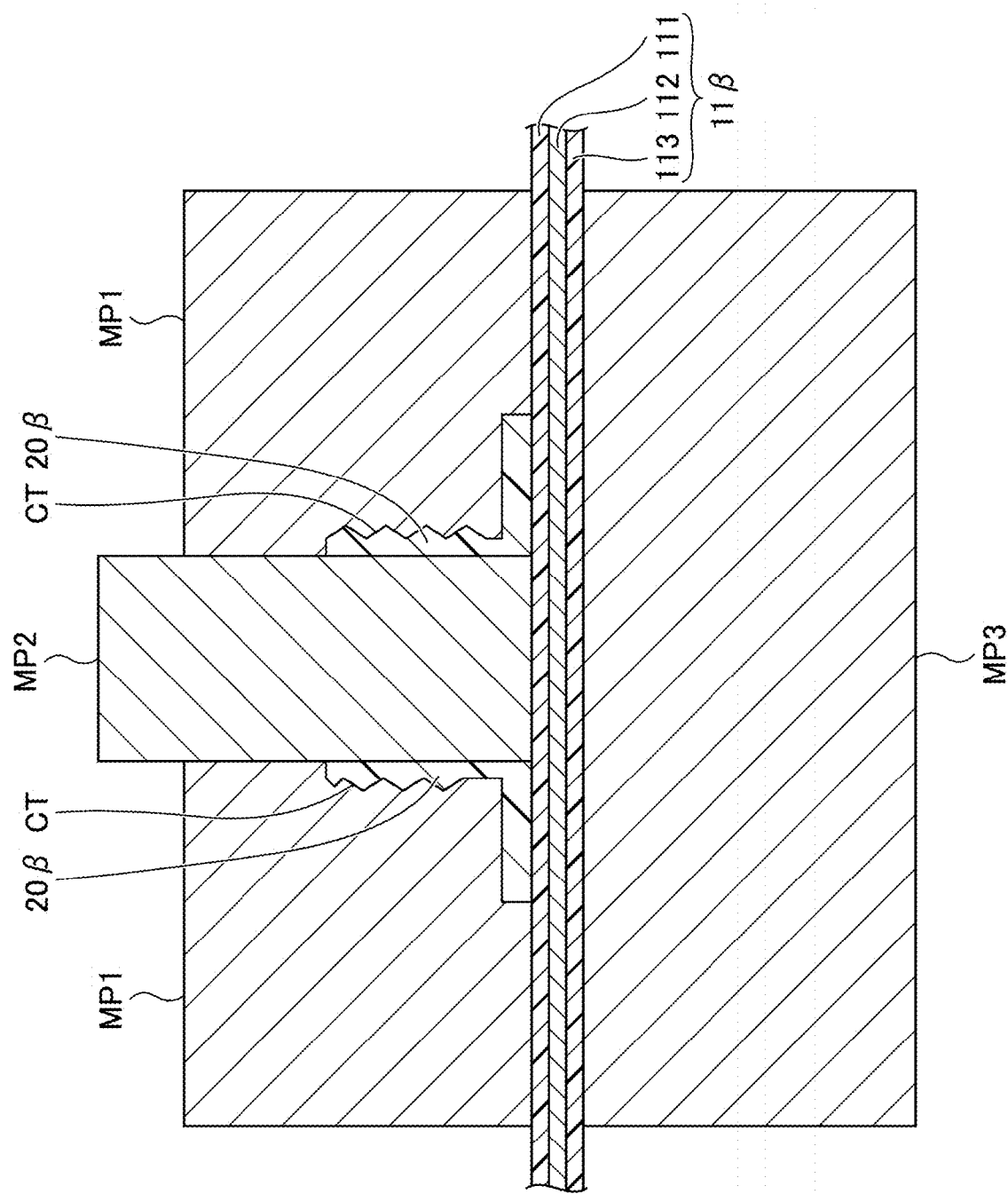
FIG. 22 is an explanatory diagram in which a mouth part is integrally formed by in-mold molding while the mouth part is being attached to the upper surface film in the fourth manufacturing method.

FIG. 22 is an explanatory diagram in which the mouth part is integrally formed by in-mold molding while the mouth part is being attached to the upper surface film in the fourth manufacturing method.

In-mold molding is a technique in which a film printed in advance is molded by being sandwiched in a metal mold for injection molding.

In in-mold molding, molding is executed by (1) supplying a film, (2) clamping the film by sucking, (3) executing injection molding, and (4) removing the film. Accordingly, a mouth part member is integrally formed on the upper surface film.

More specifically, in FIG. 22, in a state of an upper surface film 11β being sandwiched between metal molds MP1 and MP3, resin is injected into a cavity CT of the metal mold MP1 having a hole formed, to mold a mouth part 20β in a state of having a metal mold pin MP2 inserted. Accordingly, the mouth part 20β provided with a brim portion 21 and a standing portion 22 is in-mold molded with the resin so as to have the lower surface of the brim portion 21 of the mouth part 20 brought into close contact with a resin layer 111 on the surface of the upper surface film 11β of the pouch bag.

Therefore, the mouth part (spout, mouth part member) 20 can be integrally molded with the upper surface film 11β in parallel with the film formation, without separately molding the mouth part as a single component.

Note that the position of the resin inlet (gate) illustrated in FIG. 22 that passes through the metal mold MP1 from the outside and reaches the cavity CT, is merely an example, and may be provided at another position.

Also in this manufacturing method, an adhesive as a consumable material is not used; therefore, the cost is low and the finish can be made beautiful.

Also, as the mouth part 20 is integrally formed on the resin layer 111 on the surface of the upper surface film 11β made of the same material, the mouth part 20 and the upper surface film 11β are in close contact with each other at a level close to the strength of the base material. Therefore, the likelihood that the mouth part comes off is very low for the pouch container with the mouth part having the mouth part integrally formed by in-mold molding in this way, even if used in high-temperature and high-humidity circumstances such as a bathroom or a washroom.

Further, as the mouth part 20 made of resin can be formed at the same time when being attached to the upper surface film 11β, steps of welding in the manufacturing flow can be reduced, a space for welding does not need to be provided. Instead, metal molds for simultaneous forming and attaching required; therefore, it is favorable to appropriately select a manufacturing method according to a space and the like in a manufacturing device.

Second Configuration Example

Figure 23:
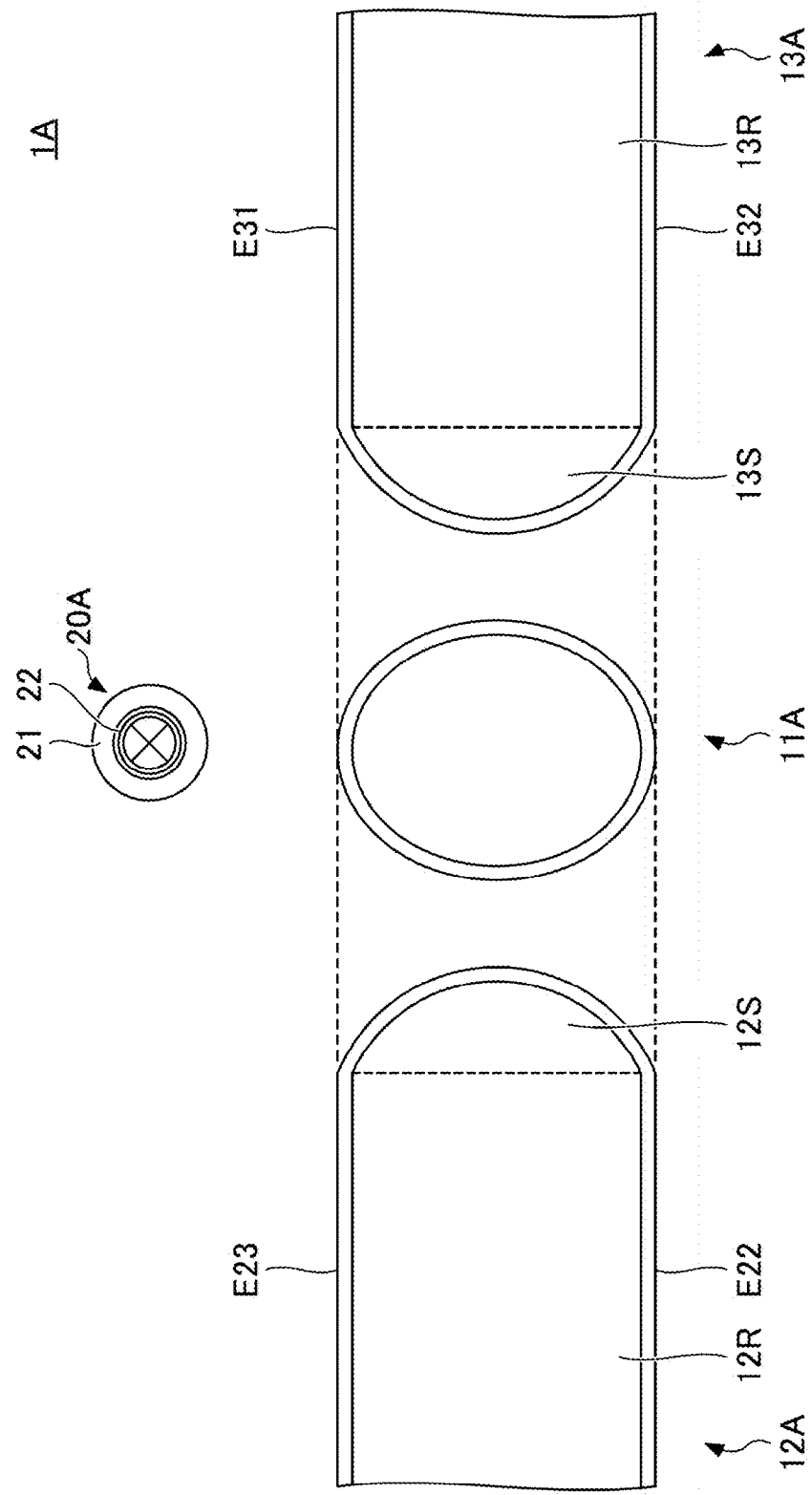
FIG. 23 is an exploded view of a pouch container according to a second configuration example of the present invention, exploded into side surfaces, an upper surface, and a mouth part.

FIG. 23 is an exploded view of a pouch container 1A according to a second configuration example of the present invention, exploded into two side surfaces, an upper surface, and a mouth part.

In the first configuration example described above, although an example of the upper surface (and the lower surface) being hexagonal is described, the upper surface may be circular or elliptic as illustrated in FIG. 23.

In this case, upper ends 12S and 13S of side surface films 12A and 13A as the second films to be fusion-bonded with the edge of an upper surface film 11A as the first film, have a shape of a semicircle or a half of an ellipse.

Third Configuration Example

Figure 24:
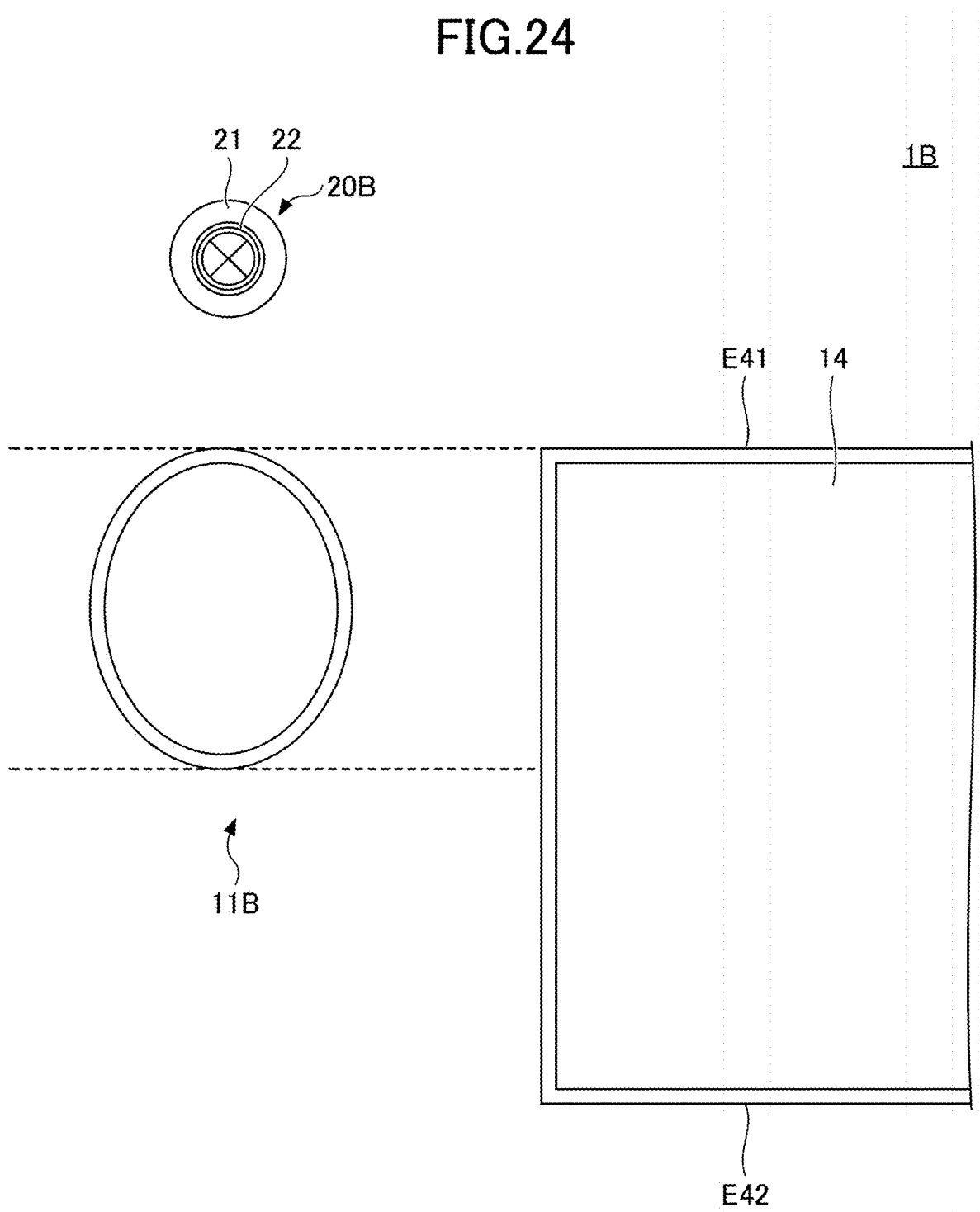
FIG. 24 is an exploded view of a pouch container according to a third configuration example of the present invention, exploded into side surfaces, an upper surface, and a mouth part.

FIG. 24 is an exploded view of a pouch container 1B according to a third configuration example of the present invention, exploded into a side surface, an upper surface, and a mouth part.

In the first and second configuration examples described above, although the side surfaces of the pouch bag are configured with the two side surface films 12 and 13, the side surface film may be configured by using a single belt-shaped film. Also, in the present configuration example, an upper surface film 11B as the first film is substantially circular.

In the present configuration, in the step of forming a pouch, first, one end of a belt-shaped side surface film 14 as the second film is rounded and fusion-bonded around the outer circumferential edge of the substantially circular upper surface film 11B having a resin layer on the upper surface.

Thereafter, for the rolled belt-shaped side surface film 14, side ends E41 and E42 orthogonal to the end where the upper surface film is arranged are fusion-bonded with each other to form a bag-shaped pouch.

Fourth Configuration Example

Figure 25:
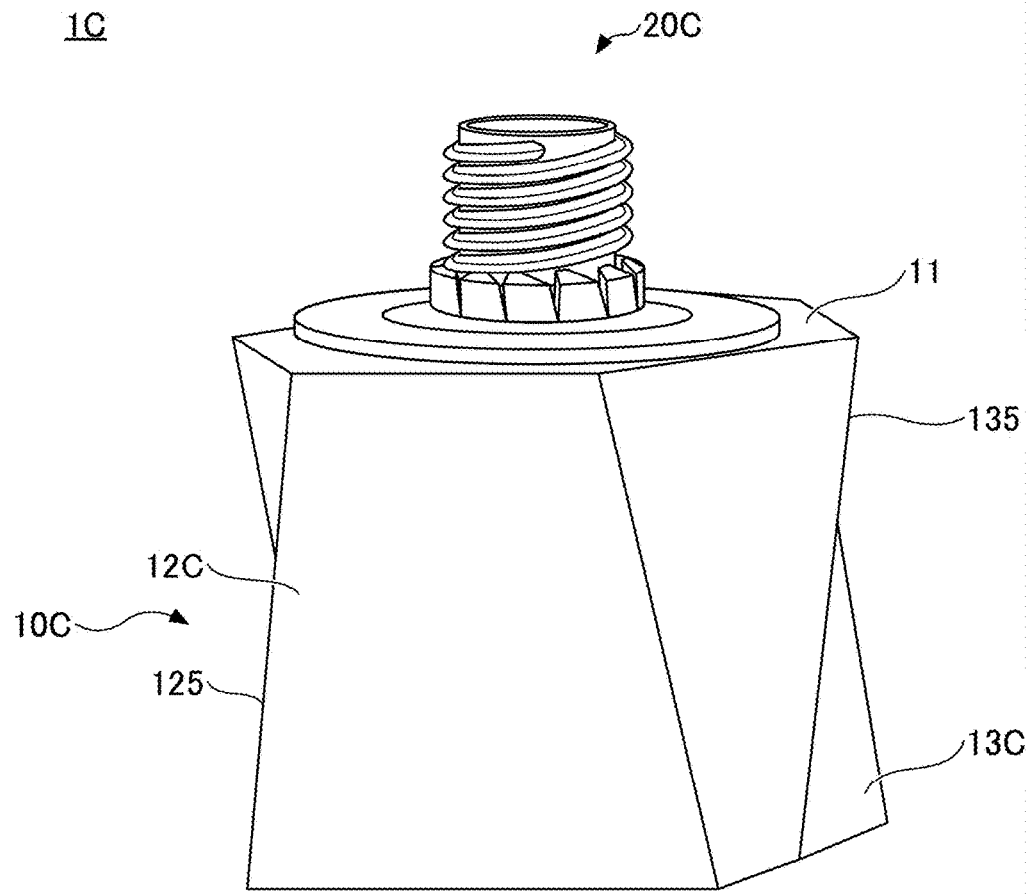
FIG. 25 is an external view illustrating a pouch container according to a fourth configuration example of the present invention.

FIG. 25 is an external view illustrating a pouch container 1C according to a fourth configuration example of the present invention. As illustrated in FIG. 25, the pouch container 1C may have fold lines (folds) 125 and 135 on side surface films 12C and 13C.

Therefore, in the pouch container 1C, portions other than the fold lines 125 and 135 of the side surface films 12C and 13C may be configured to contain a greater amount of resin, for example, polyethylene (PE), polypropylene (PP), polyethyleneterephthalate (PET), or the like than the portions of the fold lines 125 and 135, for reinforcement.

In the present configuration, when a bag 10C shrinks, it shrinks along the fold lines 125 and 135.

Fifth Configuration Example

Figure 26:
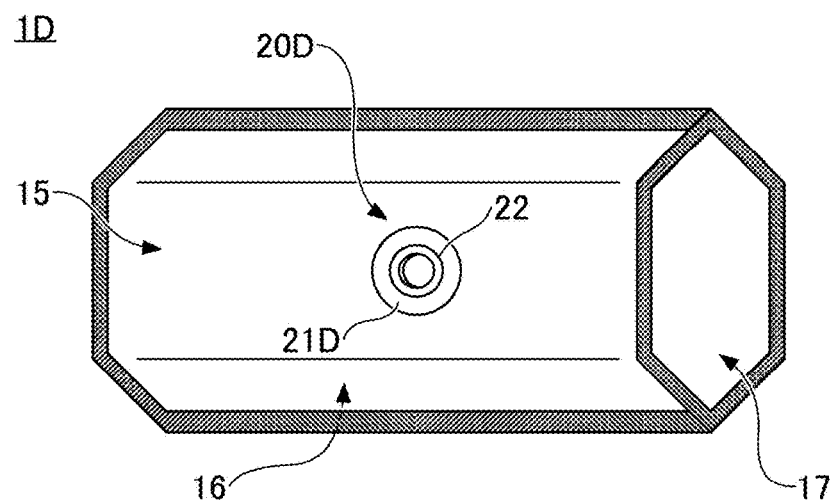
FIG. 26 is an external view illustrating a pouch container according to a fifth configuration example of the present invention.

FIG. 26 is an external view illustrating a pouch container 1D according to a fifth configuration example of the present invention.

In the examples described above, although the examples have been described in which the mouth part is attached to the upper surface film forming the hexagonal upper surface of the pouch bag, the shape of the pouch bag is not limited to the configurations described above. For example, the pouch bag may have a laid-down square column shape or a cylindrical shape.

In the present configuration example, a mouth part 20D is attached to an upper surface film 15 having substantially the same shape as that of the side surface film 12 in the first configuration example described above. The present configuration example has substantially the same configuration as the first configuration example except for the position at which the mouth part 20D is attached.

In the present configuration example, the upper surface film 15 having a shape in which the upper side of a rectangle and the lower base of a trapezoid are formed continuously, functions as the first film; and the lower surface film 16 having a shape in which the upper side of a rectangle and the lower base of a trapezoid are formed continuously, and the hexagonal side surface film 17, function as the second films.

In the present configuration example, the step of forming the pouch bag at Step S11 in FIG. 2 includes a step of fusion-bonding three continuous outer edges of the hexagonal side surface film 17 to three trapezoidal ends of the upper surface film 15; a step of fusion-bonding rectangular sides of the upper surface film 15 to rectangular sides of the lower surface film 16; and a step of fusion-bonding the other three outer edges of the side surface film 17 to three trapezoidal ends of the lower surface film 16.

Then, as illustrated in FIG. 26, the mouth part 20D is welded to a central portion of the pouch, i.e., substantially the center in the longitudinal direction of the upper surface film 15. In this configuration, in the case of applying the first manufacturing method, the step of welding the mouth part 20D at Step S14 is different, in that the shape of the jig for fixing the bag-shaped film is not an upright cylinder, but a laid-down cylinder or rectangular column so as to have the upper surface film 15 as the attachment surface come into contact with the lower surface of the brim portion 21D. The other manufacturing steps are substantially the same.

Examples of Other Manufacturing Steps

In the examples described above, although the examples have been described in which the rear end of the pouch container is left open for injection, another portion may be used for injection.

For example, at Step S11 of the flow in FIG. 2, one end (side end) of the side surface film may not be bonded, and the side end may be used as an inlet for injecting contents. In this case, the lower end as well as the side end that is not used for injection is thermally welded in advance at Step S11, to form a bag shape formed with the upper surface and the side surface.

Modified Examples

Further, in the first to fifth configuration examples described above, in the pouch bag 10, although the lower ends of the side surface films have a shape such that the lower ends of the side surface films are welded to each other as the lower end welded portion S (non-gusset shape) as illustrated in FIG. 11 to FIG. 13, the pouch container according to the present invention may be a gusset pouch (not illustrated) having a lower surface (lower gusset portion). In the case of providing the lower surface, the shape of the lower surface film is substantially the same as that of the upper surface film.

Also, by providing the gusset portion, even if the lower end is not folded as illustrated in FIG. 11 to FIG. 13, the pouch bag can maintain an upright state with the mouth part facing upward.

Alternatively, for example, in the first configuration example or the second configuration example, a side surface film may be further provided between the two side surface films, and an additional side gusset for increasing the depth of the side surface may be provided.

Sixth Configuration Example: Four-Side Sealing

In the configuration examples described above, although the examples are illustrated in which the first film and the second film are stretched in different directions, in the pouch bag of the present invention, the first film and the second film may be provided so as to face each other.

Figure 27:
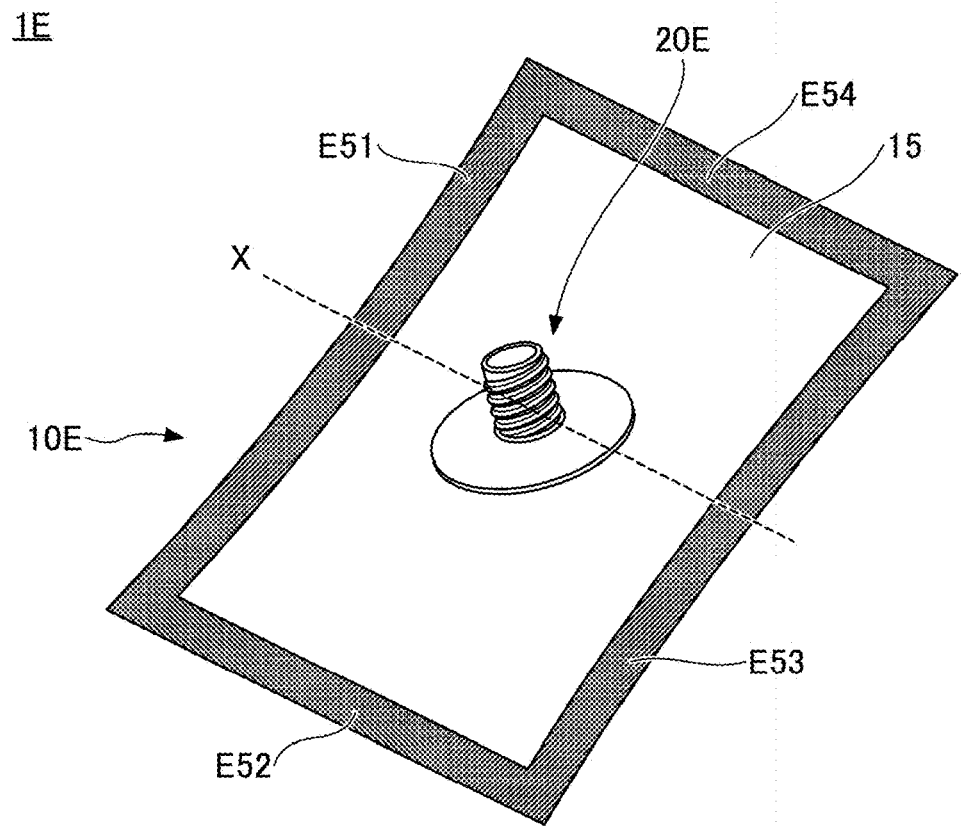
FIG. 27 is a top external view illustrating a pouch container according to a sixth configuration example of the present invention.
Figure 28:
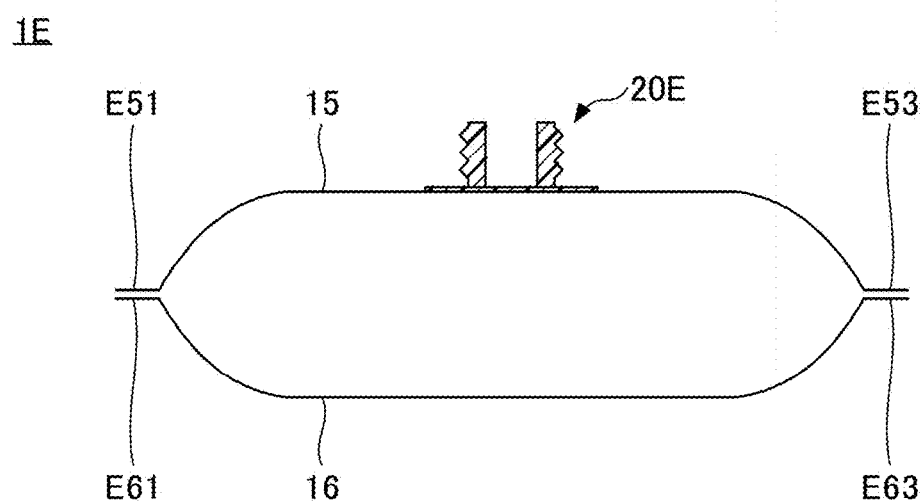
FIG. 28 is a cross-sectional view illustrating the pouch container according to the sixth configuration example of the present invention in FIG. 27.

FIG. 27 is an explanatory diagram (external perspective view) of a pouch container 1E according to the sixth configuration example. FIG. 28 is a cross-sectional view taken along a line X in FIG. 27.

In the present configuration example, the first film is the upper surface film 15, and the second film is the lower surface film 16. Four sides (E51 to E54) of the upper surface film 15 and four sides (not illustrated) of the lower surface film 16 are welded by heat sealing.

Note that in the present configuration example, the upper surface film 15 and the lower surface film 16 are welded so as to face each other; therefore, before the upper surface film 15 and the lower surface film 16 are welded to form a bag as illustrated in the flow in FIG. 14, it is favorable to weld the mouth part 20E, in a film state. Alternatively, as illustrated in FIG. 21 and FIG. 22, it is favorable to mold the mouth part by insert molding or in-mold molding, in a film state.

In FIG. 27 and FIG. 28, as an example of the pouch container formed of two upper and lower films, although an example formed to be a rectangle has been described, the shapes of the two upper and lower films may be other quadrangular shapes (e.g., a trapezoidal shape, a rhombic shape, etc.), a circular shape, an elliptic shape, or any other polygonal shape.

In any case, before filling, one side (or part of an arc) is left unsealed, and the other sides (e.g., three sides (E51, E52, and E54) in FIG. 27) are heat-sealed, and after filling, the remaining one side (E53) is heat-sealed.

In the present example, as the upper surface film and the lower surface film are arranged to face each other in the vertical direction, the pouch container can maintain an upright state without folding or another support member.

In FIG. 28, although illustrated in a simplified way, also in the present configuration, as illustrated in FIG. 20, the upper surface film and the lower surface film include at least an air blocking layer including a metal or an inorganic substance, and an outer resin layer and an inner resin layer sandwiching the air blocking layer. Accordingly, oxidation of contents (not illustrated) after filling can be blocked.

Seventh Configuration Example: Single Pouch Bag Three-Side Sealing

In the first to sixth configuration examples described above, although the examples have been described in which a pouch bag is formed using multiple films, a pouch bag may be formed by folding a single film.

Figure 29:
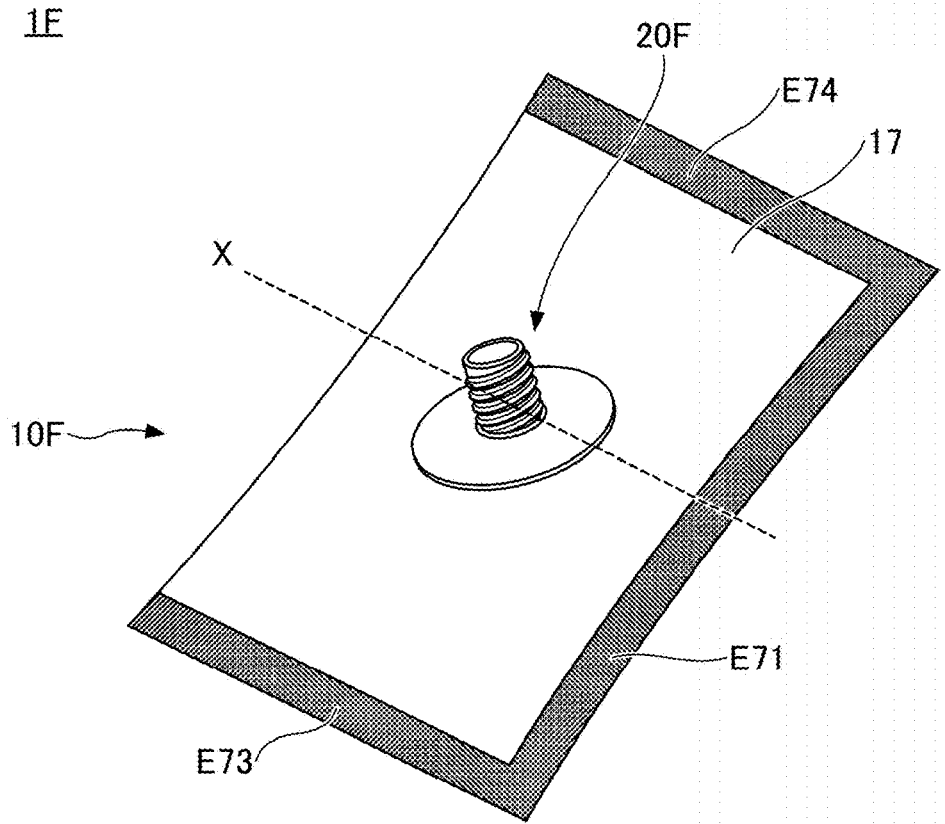
FIG. 29 is an external view illustrating a pouch container according to a seventh configuration example of the present invention.
Figure 30:
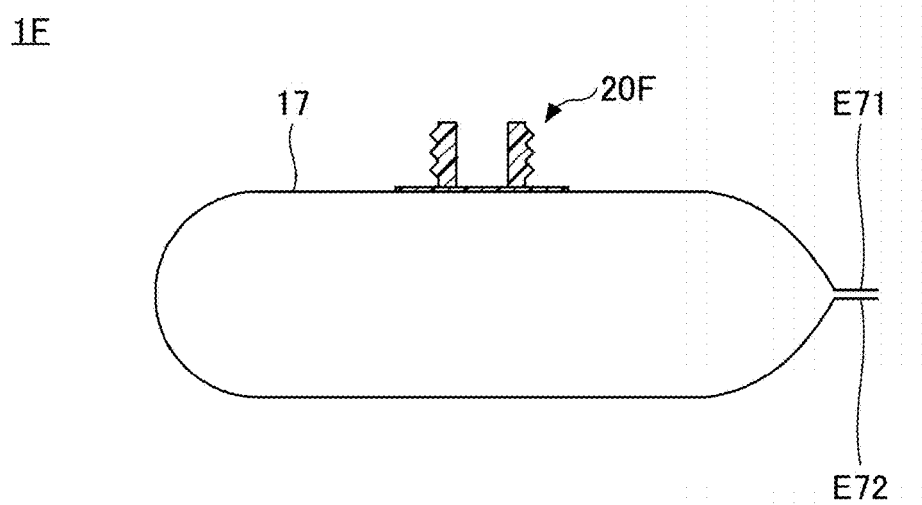
FIG. 30 is a cross-sectional view illustrating the pouch container according to the seventh configuration example of the present invention.
Figure 31:
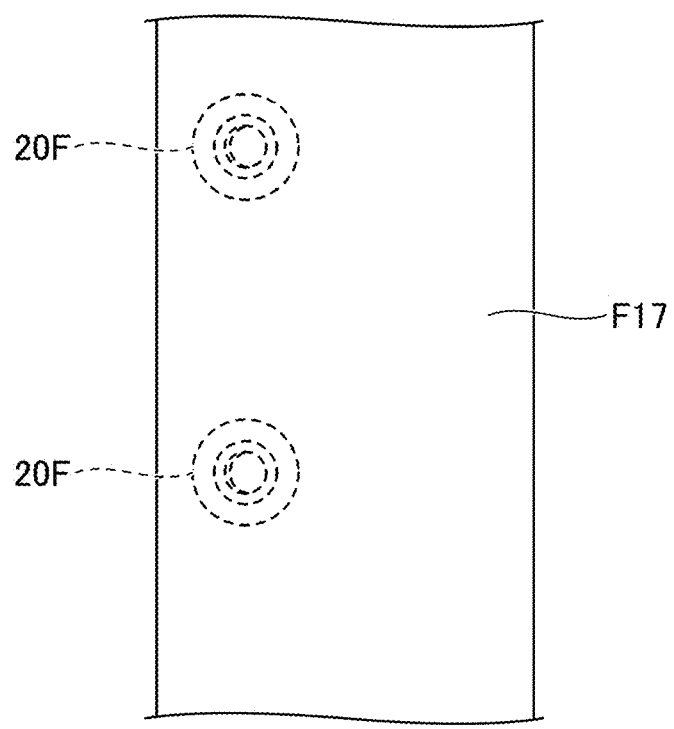
FIG. 31 is an explanatory diagram in which films are welded together to form a pouch bag according to the seventh configuration example of the present invention.

FIG. 29 is an external view illustrating a pouch container 1F according to a seventh configuration example of the present invention; and FIG. 30 is a cross-sectional view taken along a line X in FIG. 29. FIG. 31 is an explanatory diagram of manufacturing of the pouch container 1F according to the seventh configuration example of the present invention; and FIG. 32 is a diagram illustrating a state in which mouth parts are welded at regular intervals to a sheet before cut in FIG. 31.

In the present configuration example, a side surface film 17 to which a mouth part 20F is welded is folded to be formed as a rectangular bag-shaped film composed of an upper surface and a lower surface.

Note that although FIG. 29 illustrates an example in which the upper surface of the side surface film 17 is rectangular, the shape may be a trapezoid, a hexagon, an octagon, or any other polygon with an even number of sides, as long as the sides are positioned at the folding lines, and the shape is vertically symmetrical.

Figure 32:
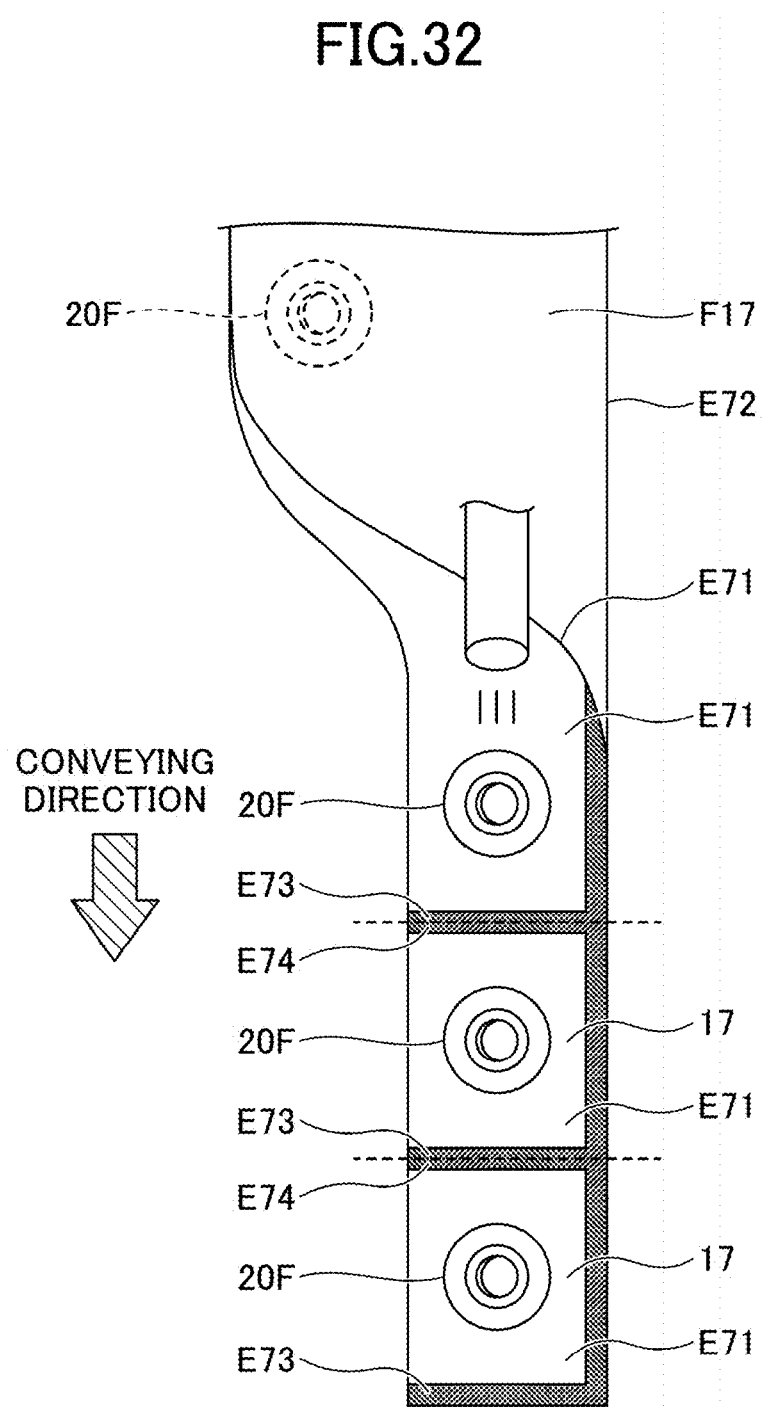
FIG. 32 is a diagram illustrating a state in which mouth parts are welded at regular intervals on a sheet before cutting in FIG. 31.

Here, FIG. 31 and FIG. 32 illustrate an example of manufacturing steps of the pouch container 1F of the seventh configuration example. First, as illustrated in FIG. 31, the mouth parts 20F are welded to the sheet before cut at regular intervals. The method of welding is as illustrated in FIG. 20 described above.

Then, as illustrated in FIG. 32, while folding the film material F17 so as to have a side E71 and a side E72 overlapped, the overlapped side E71 and the side E72, and a side E73 continuous to the overlapped sides E71 and E72, are heat-sealed, and then, filled with contents. When filling with the contents, an inert gas is injected while filling with the contents, or an inert gas is injected immediately after filling with the contents. Accordingly, contents can be prevented from being caught in a sealed portion upon heat sealing for tight closing, and air can be prevented from flowing into the pouch container when filling with the contents.

Thereafter, a side 574 as the remaining side serving as the filling inlet is heat-sealed. At this time, heat-sealing is applied simultaneously to the side E74 at the downstream end of the pouch container bag on the upstream side, and to the side E73 at the upstream end of the pouch container bag on the downstream side. Then, after the three sides are heat-sealed, pouch bags are cut one by one along the side E74 indicated by dotted lines in FIG. 32 at the center of the heat-sealed areas.

Accordingly, the manufacturing process of pouch bags can be made efficient thanks to a series of steps in the flow that includes folding, pouching by heat-sealing, filling, closing, and cutting.

Although illustrated in a simplified way in FIG. 30, also in the present configuration, as illustrated in FIG. 20, one sheet of film includes at least an air blocking layer including a metal or an inorganic substance, and an outer resin layer and an inner resin layer sandwiching the air blocking layer. Accordingly, oxidation of contents (not illustrated) after filling can be blocked.

Eighth Configuration Example: Pillow Shape

Figure 33:
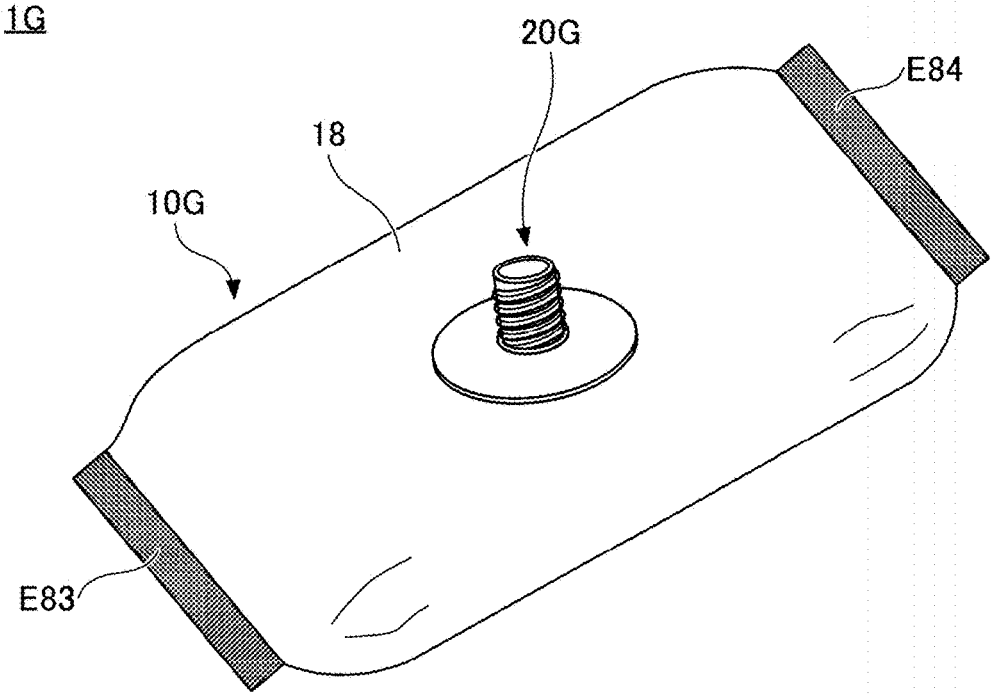
FIG. 33 is a top external view illustrating a pouch container according to an eighth configuration example of the present invention.

In FIG. 29, although an example has been described in which one sheet is heat-sealed at the side end, a pillow shape in which one sheet is heat-sealed on the back side may be adopted. FIG. 33 is a top external view illustrating a pouch container 1G according to an eighth configuration example of the present invention; and FIG. 34 is a bottom external view illustrating the pouch container according to the eighth configuration example.

In this case, after the back side is heat-sealed, the sheet is rotated and folded, sealed at one end, and then, filled.

Figure 34:
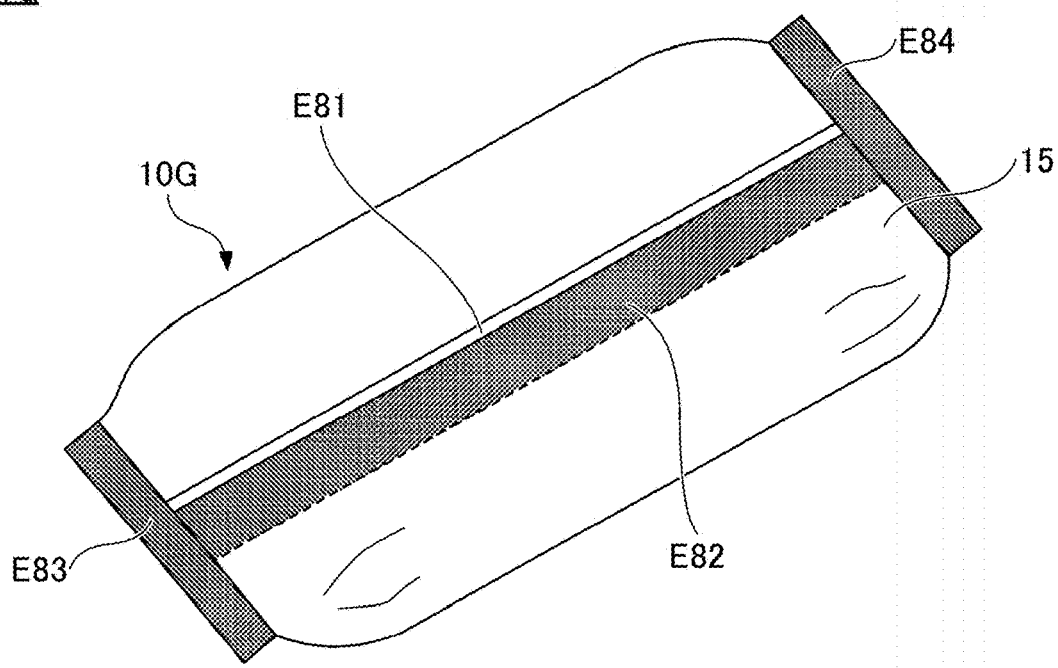
FIG. 34 is a bottom external view illustrating the pouch container according to the eighth configuration example of the present invention.

Note that in the present configuration, as illustrated in FIG. 33 and FIG. 34, by executing heat sealing in a state in which an inert gas such as argon or nitrogen is injected immediately after filled with contents, oxidation of the contents can be prevented even when being filled and when being sealed at the lower end.

Application Example 1: Combination with Cap

Figure 35:
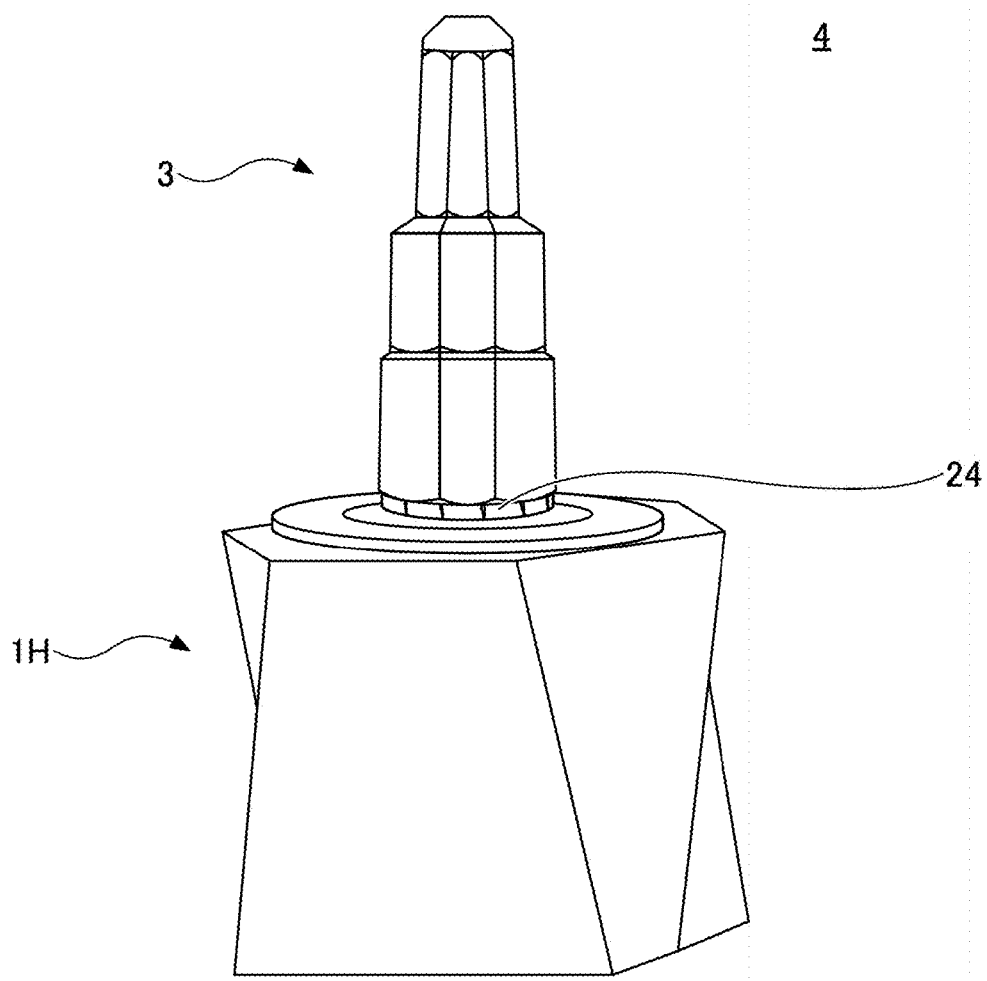
FIG. 35 illustrates a diagram in which a pouch container of the present invention is combined with a cap that is opened by rotation.

FIG. 35 illustrates a diagram in which a pouch container 1H having substantially the same configuration as the pouch container 1C in the fourth configuration example of the present invention, is combined with a cap 3 that is opened by rotation. As described above, as the mouth part is provided with a spiral projection, a cap that screws onto the mouth part may be provided.

Figure 36:
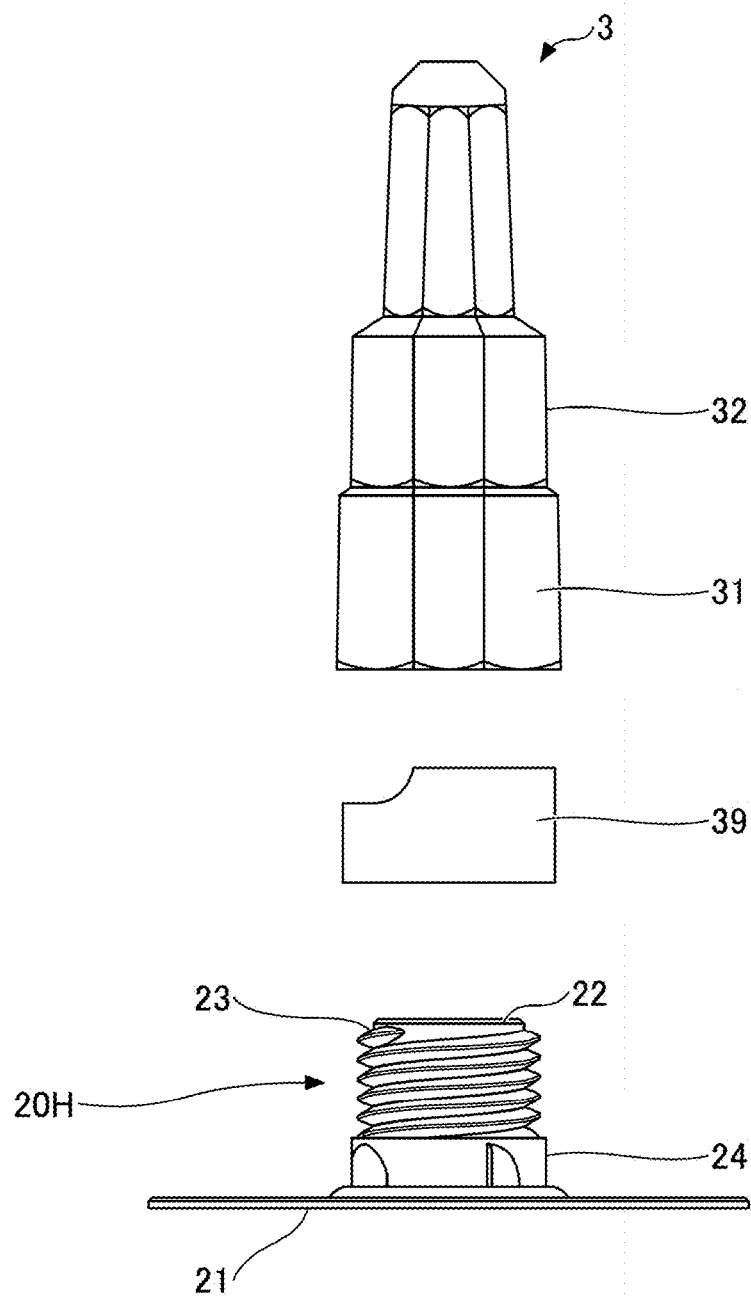
FIG. 36 is an exploded view of the vicinity of a cap.
Figure 37:
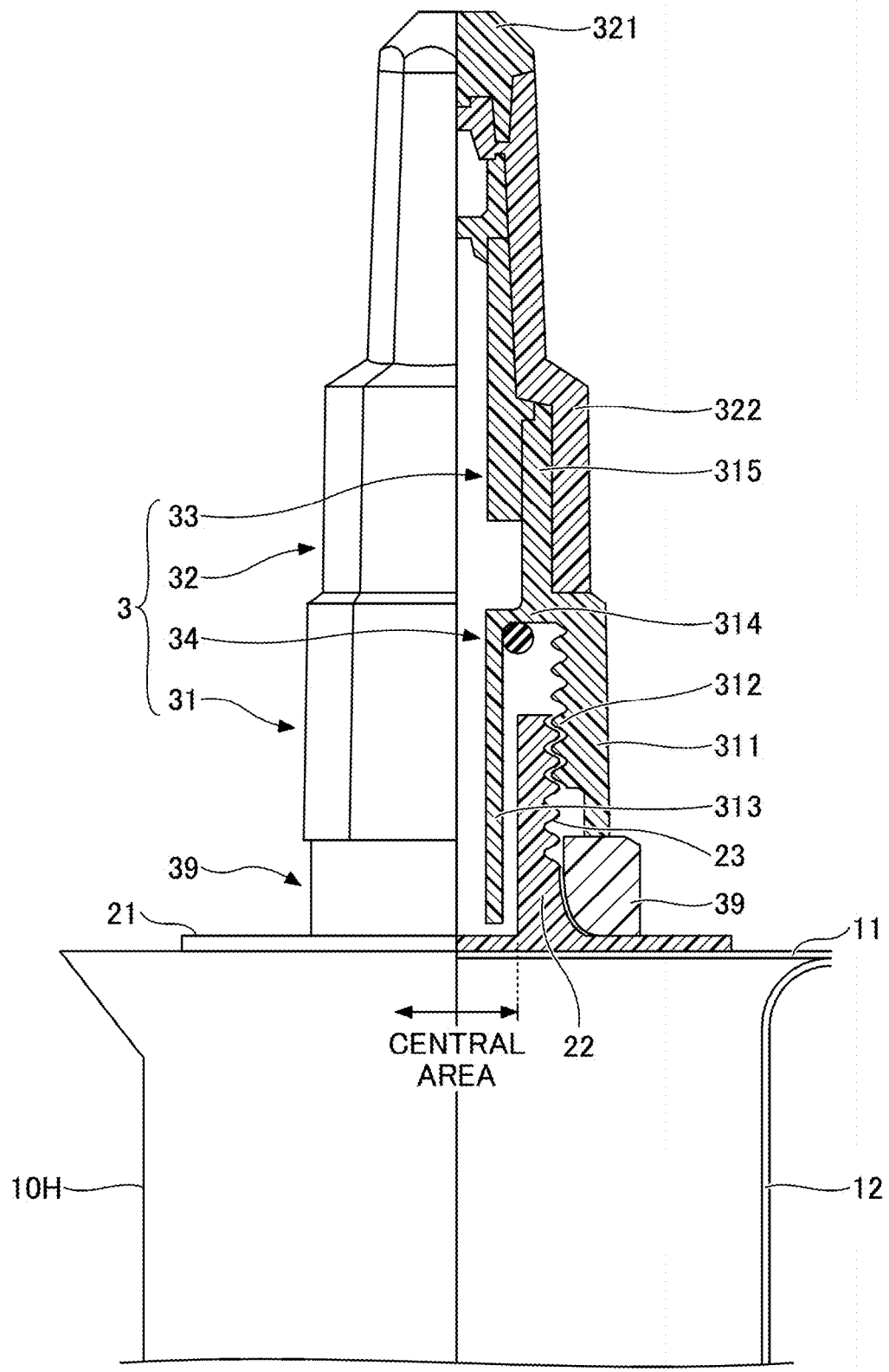
FIG. 37 is a half-sectional explanatory view of the vicinity of the cap.

The structure of the cap will be described using FIG. 36 and FIG. 37. FIG. 36 is an exploded view of the vicinity of the cap in FIG. 35. FIG. 37 is a semi-sectional explanatory view of the cap and the mouth part of the pouch container. A state in which the pouch container 1H of the present invention and the cap 3 are combined will be referred to as the container 4 with the cap.

In the pouch container 1H according to the application example of the present invention, a spiral projection 23 is formed on the outer circumference of the standing portion 22 of the mouth part 20H. Also, a rotation stopper 24 is provided under the spiral projection 23 of the standing portion 22.

More specifically, the cap 3 includes a lower cap 31, an upper cap 32, a middle plug 33, and an O-ring 34. Before being put into use, a stopper ring 39 is provided under the cap 3.

The lower cap 31 is configured to include a side wall 311, a breakthrough plug 313, an annular coupling portion 314, and an upper end projection 315. The side wall 311 forms an outer cylinder of the breakthrough plug 313 having a spiral groove 312 formed on the inner circumferential surface. The breakthrough plug 313 is a cylindrical plug portion whose outer circumference is thinner than the inner circumference of the standing portion 22 of the pouch container 1H. The annular coupling portion 314 is an example of a coupling portion, and couples the upper end of the breakthrough plug 313 with the upper end of the side wall 311. The lower cap 31 further includes the upper end projection 315 standing from the upper surface of the annular coupling portion 314.

The upper cap 32 includes a top plate 321 and a two-stage side wall 322. The lower cap 31 and the upper cap 32 are engaged with each other in a state where the upper end projection 315 of the lower cap 31 is sandwiched between the inner side surface of the two-stage side wall 322 and the middle plug 33.

As illustrated in FIG. 37, in a state of the stopper ring 39 being installed under the cap, the breakthrough plug 313 does not reach the upper surface film 11, and the upper surface film 11 is not punctured.

Then, immediately before being put into use, by removing the stopper ring 39, and rotating the cap 3 with respect to the standing portion 22, the breakthrough plug 313 descends to pierce a central area of the upper surface film 11. In the upper surface film 11, the central area is a central portion inside the standing portion 22 after the mouth part 20H is attached to the pouch bag 10H, and indicates an area where the upper surface film 11 is exposed with respect to the cap 3.

Figure 38:
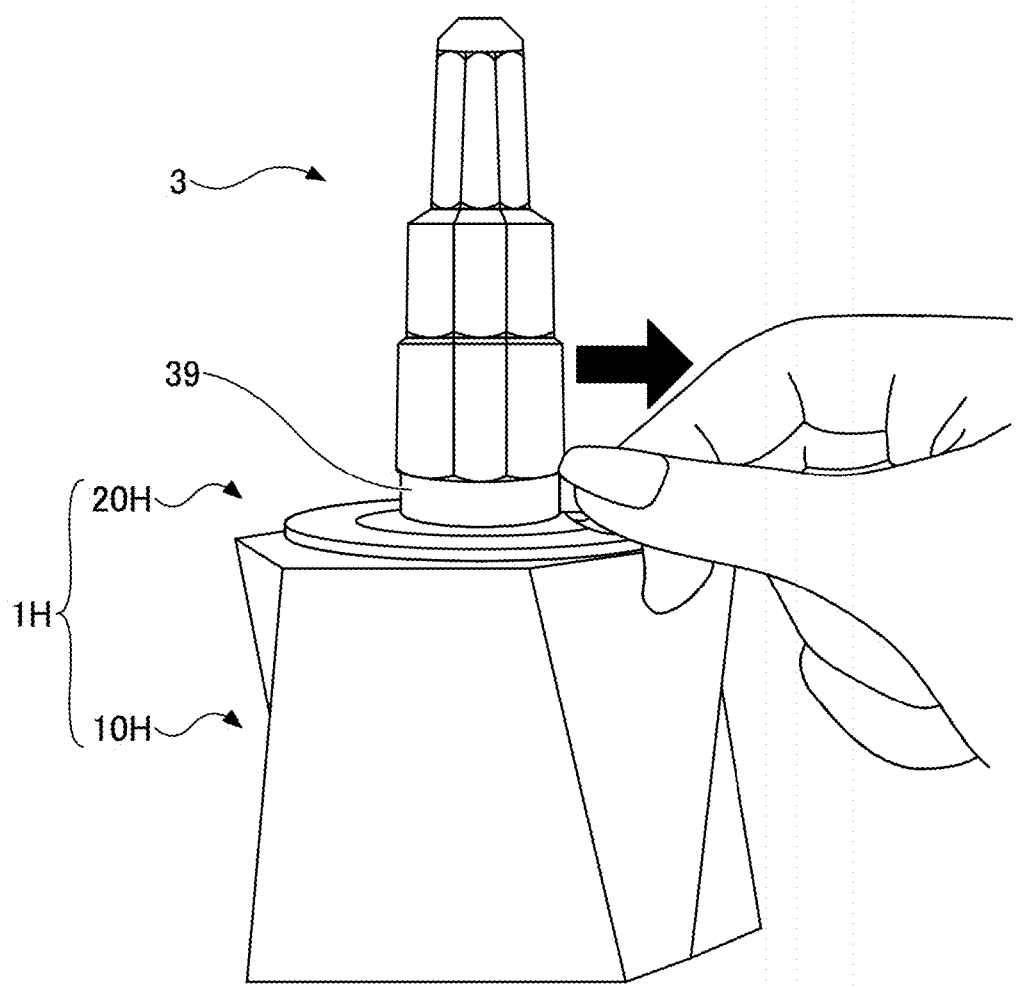
FIG. 38 is a diagram illustrating a step of opening the cap in FIG. 35.
Figure 39:
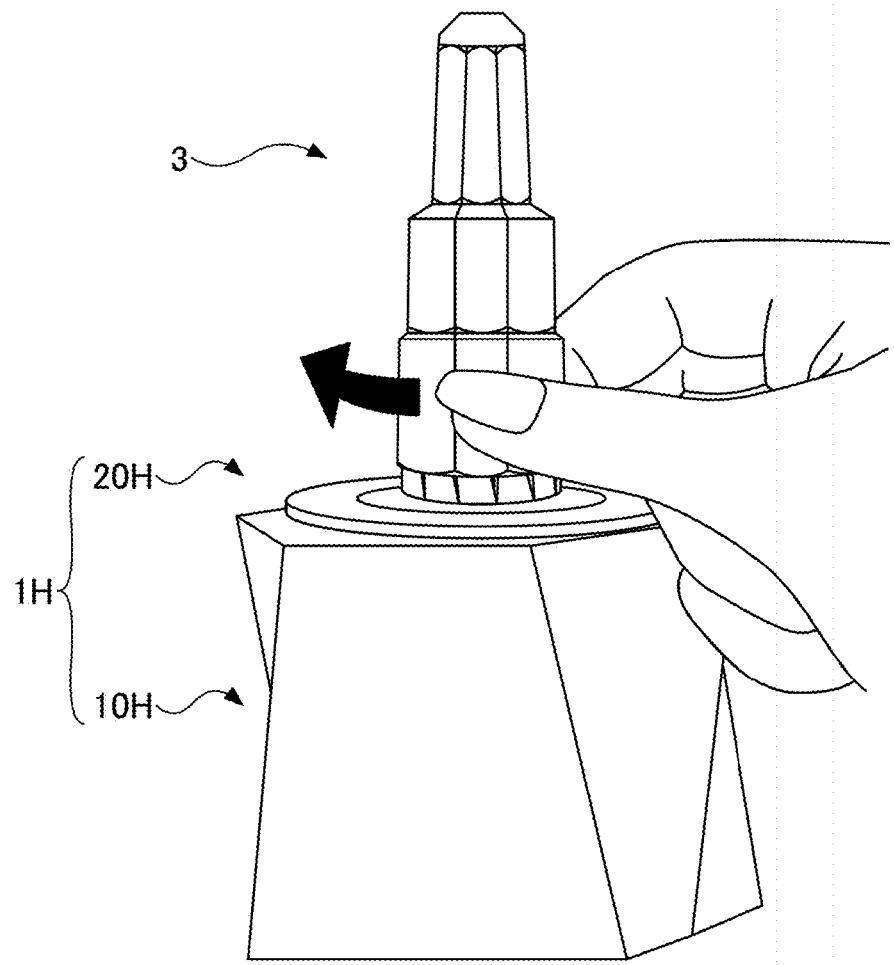
FIG. 39 illustrates a state of a plug being closed, in contrast to FIG. 38.

The internal behavior when the cap in use is rotated will be described with reference to FIG. 38 to FIG. 42. FIG. 38 and FIG. 39 are diagrams illustrating steps for opening the cap in FIG. 35.

First, a user holds a knob of the stopper ring 39, and tears it off in a direction indicated by a bold arrow in FIG. 38. Note that the removed stopper ring 39 may be discarded.

The user rotates the plug in a direction indicated by a bold arrow in FIG. 39 to be sealed. By sealing until the whirl-stop portion at the end of the screw is not seen, the upper surface film 11 is pierced, to be in a state where the contents can be released.

Figure 40:
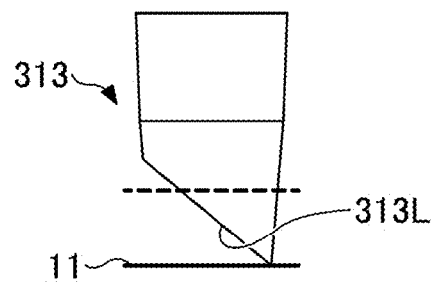
FIG. 40 is a diagram illustrating breaking of an upper surface film by a lower end of a breakthrough plug, by rotating a cap.
Figure 41:
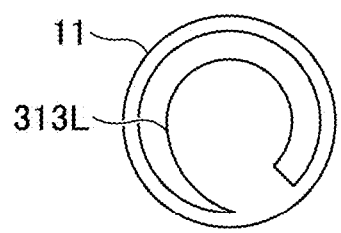
FIG. 41 illustrates a central area of the circular upper surface film in FIG. 40.
Figure 42:
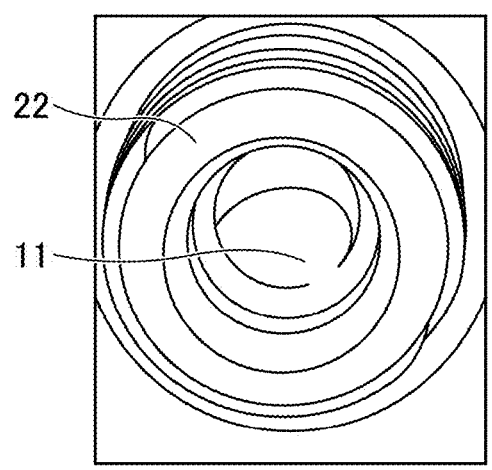
FIG. 42 is a diagram in which the cap in FIG. 40 is removed and the upper surface film is viewed from the mouth part side.

FIG. 40 to FIG. 42 are explanatory diagrams of rotation executed in FIG. 39. Among these, FIG. 40 is an enlarged view of the lower end of the breakthrough plug 313; FIG. 41 is a top view of a state of the upper surface film 11 being cut when the breakthrough plug 313 descends to a dotted line in FIG. 40; and FIG. 42 is a view of the upper surface film 11 viewed from the mouth part 20H side after the cap is removed as in FIG. 39.

As illustrated in FIG. 40, the breakthrough plug 313 has a beveled cylindrical tube shape having a beveled lower end. An area coming into contact with the upper surface film 11 when puncturing is defined as the beveled lower end 313L.

Before rotation, the upper surface film 11 and the breakthrough plug 313 of the cap 3 are in a non-contact state (see FIG. 35 and FIG. 37).

When rotating the cap 3, the breakthrough plug 313 descends, the upper surface film 11 comes into contact with the lower end of the beveled lower end 313L as illustrated with solid lines in FIG. 40, and then, the upper surface film 11 starts penetrating vertically.

Then, as the rotation of the cap 3 proceeds, the breakthrough plug 313 descends more, and the upper surface film 11 is cut out in an arc shape. At this time, only the beveled lower end 313l of the breakthrough plug 313 can break through the upper surface film 11 little by little while being in contact with the upper surface film 11.

Further, as illustrated by the dotted line in FIG. 40 and in FIG. 42, even in a state of the cap 3 being rotated to the lowermost end, the arc-shaped cutout is not cut over the entire circumference of 360 degrees, and part of the circumference remains in a continuous state.

Also, the angle of rotation for separating the upper surface film is determined by the height of the rotation stopper 24 opposite to the stopper ring 39 engaged before being put into use. It is favorable to set the angle of rotation of the cap 3 for puncturing that is defined by the rotation stopper 24, to an angle at which the contents flow smoothly and partially remain even when the cap 3 is rotated to the maximum.

As such piercing of the upper surface film 11 of the pouch container 1H by the cap 3 takes place immediately before being put into use, the sealed state can be maintained in the distribution stage. In other words, it is possible to prevent air from flowing into the inside of the pouch bag 10H as the main body of the pouch immediately before being put into use, and thereby, the properties of the contents hardly change until use.

Application Example 2: Refill Container

Figure 43:
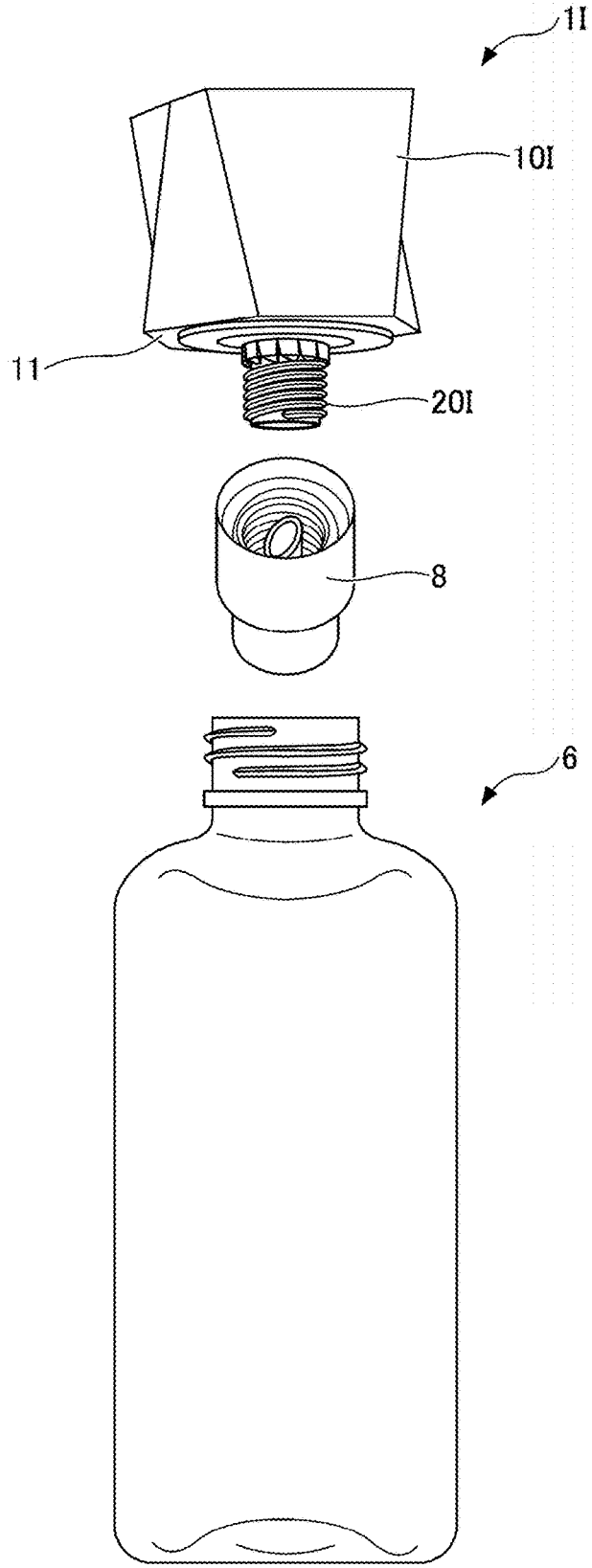
FIG. 43 is an explanatory diagram illustrating a state of a pouch container of the present invention being used as a refill container.

FIG. 43 is an explanatory diagram illustrating a state of a pouch container of the present invention being used as a refill container. A pouch container 1I of the present invention can also be used as a refill container.

As illustrated in FIG. 43, in the case of being used for refilling, a refill assisting tool 8 is provided with a piercing member such as the middle plug of the cap described above, and the piercing member is engaged with the refill assisting tool 8 to pierce the upper surface film 11 at the back of a mouth part 20I in the pouch container 1I (a portion on a pouch bag 10I side of the mouth part 20I closed by the upper surface film 11). Further, the contents contained in the pouch container 1I are transferred to a refill bottle 6 through the refill assisting tool 8.

Also, in FIG. 43, although an example has been described in which the pouch container similar to the pouch container 1C of the fourth configuration example in which the hardness of the bag part is strengthened is used as a container, as the refill container is to be discarded after refilling, the refill container does not need to maintain an upright state after refilling.

Therefore, it is also possible to use the configuration of the pouch container 1, 1A, 1B, 1D, 1E, 1F, or 1G without strengthened hardness, as the refill container.

Application Example 3: Double Container Double Container with Discharge Mechanism Next, a double container having a pouch container of the present invention will be described with reference to FIG. 44 to FIG. 46.

Figure 44:
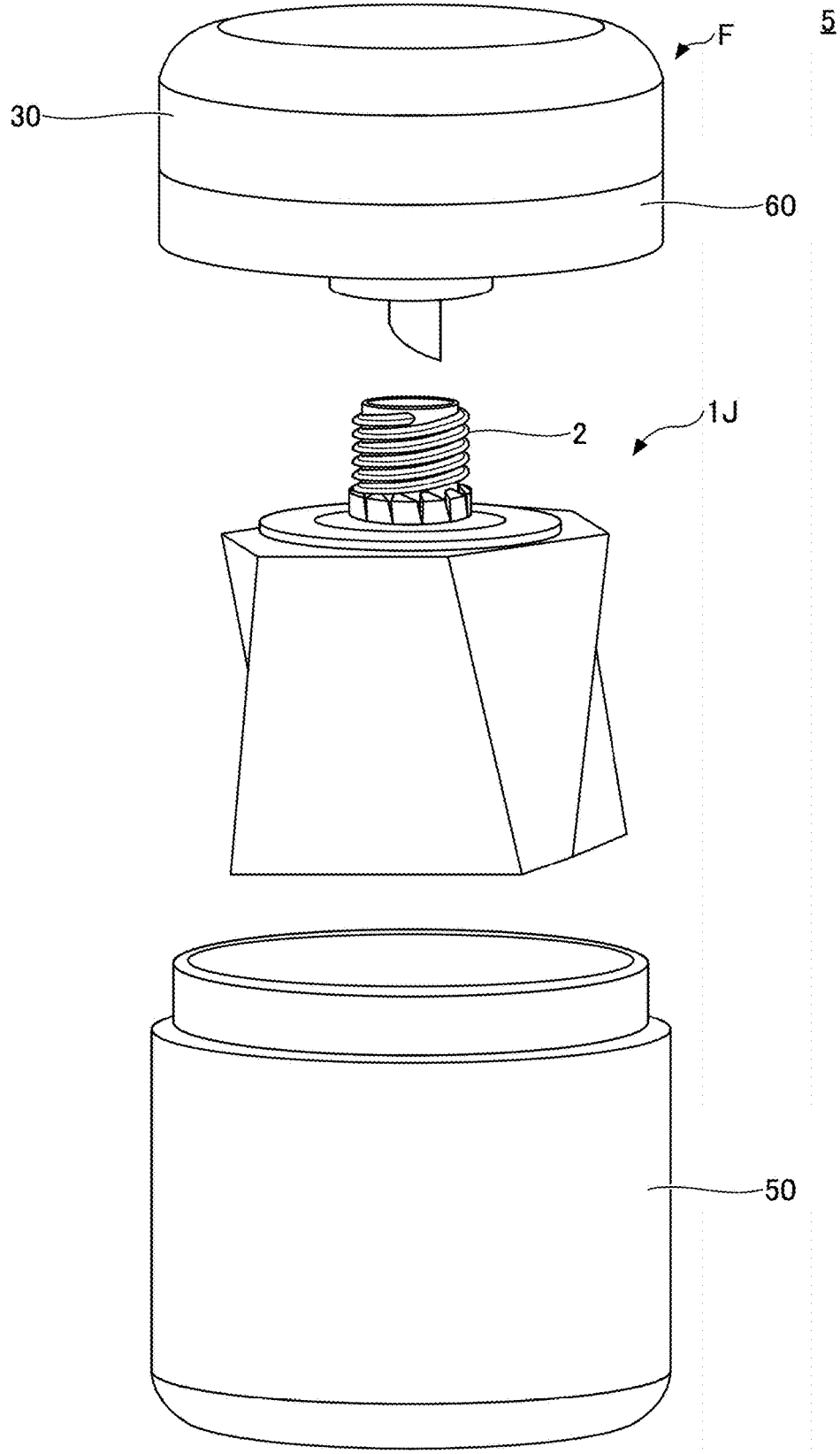
FIG. 44 is a diagram of a double container in which a pouch container according to the fifth configuration example of the present invention is installed as an inner container.

FIG. 44 is an exploded view of a double container 5 in which a pouch container 1J having substantially the same configuration as that of the pouch container 1C according to the fourth configuration example of the present invention is installed as the inner container. Note that FIG. 44 illustrates a state of a pump head F being engaged within a cap 30.

Figure 45:
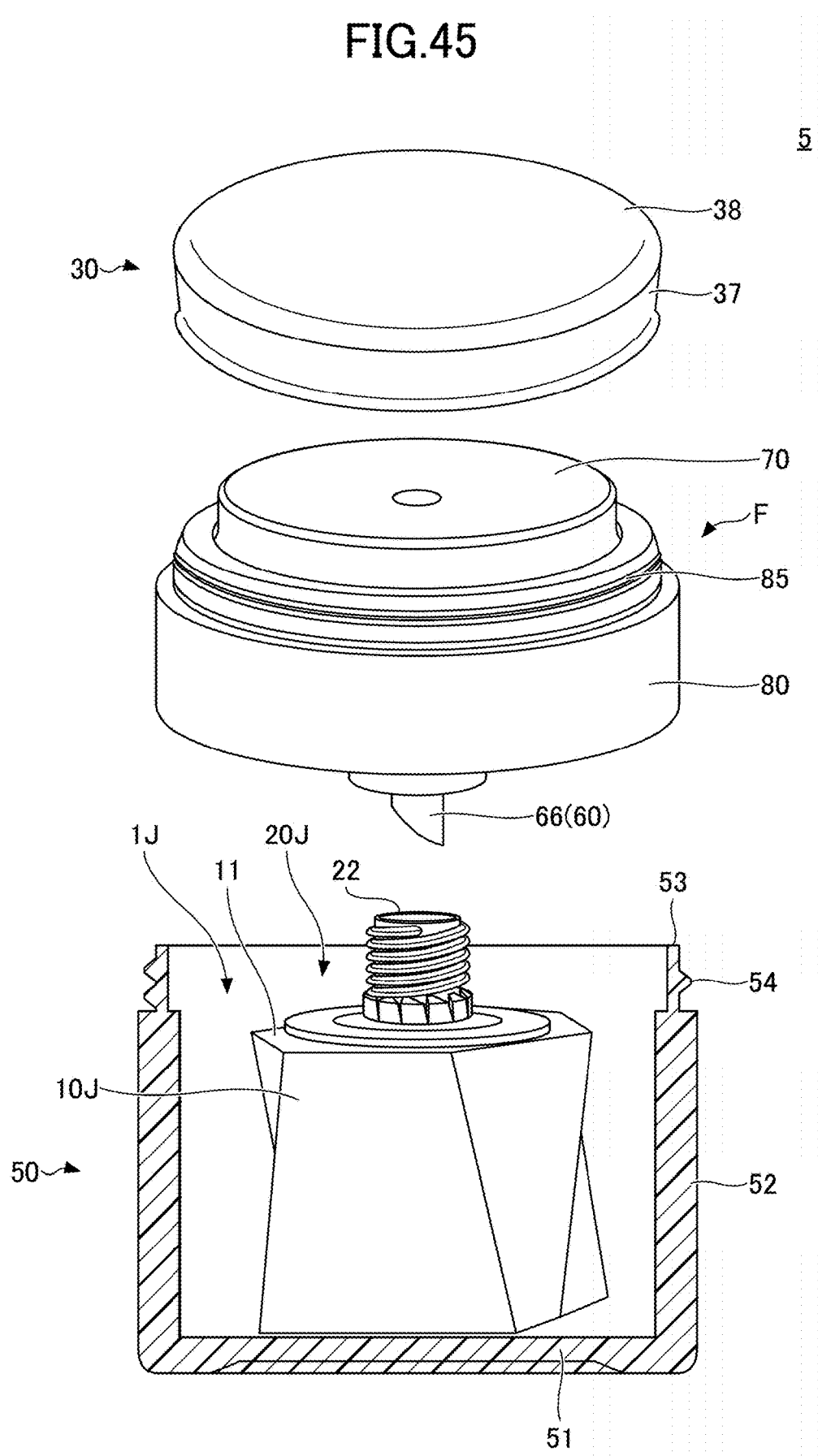
FIG. 45 is a diagram illustrating an example in which a push pump is attached as a discharge mechanism to a mouth part of a double container of the present invention.
Figure 46:
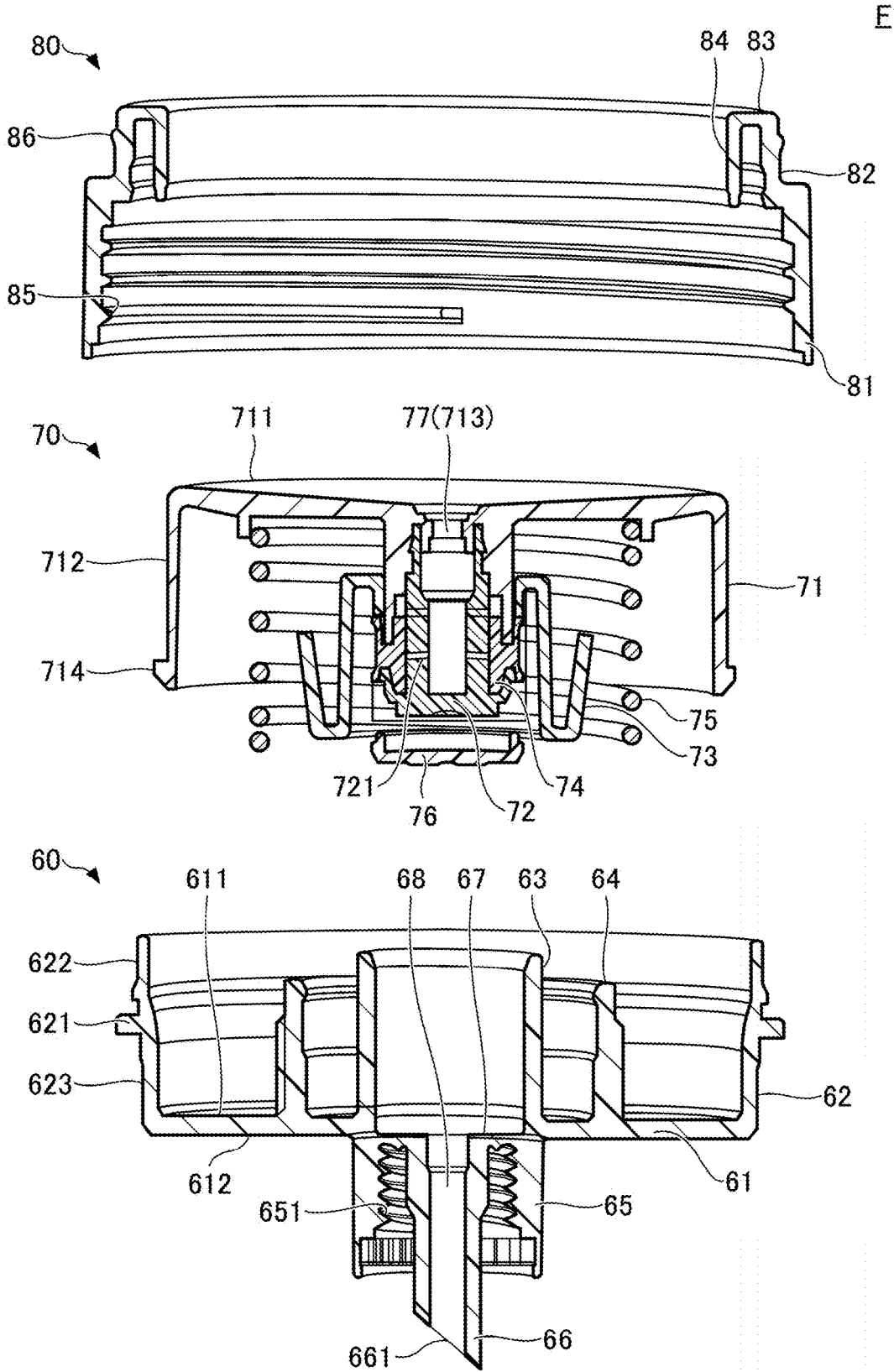
FIG. 46 is a cross-sectional view of the push pump in FIG. 45.

FIG. 45 is a diagram illustrating an example in which the pump head F is being attached to a mouth part 20J and an outer container 50 of the pouch container 1J of the present invention. FIG. 46 is an exploded cross-sectional view of the pump head F.

The pump head F has a dish shape, and is an example of a discharge mechanism having an airless characteristic of an upward discharge type. The pump head F can discharge the contents upward by using a pump while maintaining an airtight state.

More specifically, the pump head F includes a cylinder part 60, a pump part 70, and a cylindrical cover 80. The cylindrical cover 80 is a member that covers the cylinder part 60 from above and is installed on the outer container 50, and the cap 30 is engaged with the outside. The cylinder part 60 is a member fitted into the mouth part 20J of the pouch container 1J. The pump part 70 is a member that implements part of the discharge function of the airless characteristic together with part of the cylinder part 60. The pump head F will be described in detail with reference to FIG. 46.

The outer container 50 is a bottomed cylindrical container in which the pouch container 1J is accommodated. The outer container 50 includes a bottom surface 51 and a side wall 52. The upper end of the side wall 52 is recessed on both the outside and the inside, and an upper end thin-walled portion 53 is provided with an outer circumferential screw projection 54 on the outer circumference surface (see FIG. 45).

The recess inside the upper end thin-wailed portion 53 is a portion into which a lower circumferential wall 623 of the cylinder part 60 is fitted (see FIG. 45 and FIG. 46).

Further, the cap 30 that covers the pump part 70 of the pump head F may be detachably provided. In the case of attaching the cap 30, an outer circumferential screw projection 86 provided on the cylindrical cover 80 is screwed to be engaged with the inner surface of a side wall 37 of the cap 30 (see FIGS. 45 and 46).

In the present configuration, immediately before being put into use, a standing portion 22 of the mouth part 20J is positioned and fitted into a spiral cylinder 65 suspended from the cylinder part 60 on the lower side of the pump head F as a discharge mechanism, and by having the cylinder part 60 rotated with respect to the mouth part 20J, a breakthrough cylinder 66 pierces the upper surface film 11.

In the present configuration, in the case where the pump head F is a discharge mechanism having an airless characteristic, an airtight state is maintained with respect to the mouth part 20J; therefore, when the contents contained in a pouch bag 10J of the pouch container 1J decreases, the pouch bag 10J shrinks, whereas the shape of the outer container 50 remains unchanged.

Also, in this configuration, by making part or the entirety of the outer container 50 transparent, the state of the pouch bag 10 having been shrunk according to the remaining amount of the contents while maintaining the sealed state, can be checked from the outside, and the remaining amount of the contents can be confirmed at a glance.

Note that although FIG. 44 illustrates an example in which the outer shape of the outer container 50 is cylindrical, the shape of the side wall 52 other than the upper end may be any shape such as a rectangular column shape, a cone shape, a gourd shape, an egg shape, or the like, as long as the outer container 50 can accommodate the pouch container 1J, and can be fitted into the cylinder part 60.

In the double container 5 illustrated in FIG. 44 and FIG. 45, the pouch container having the pouch bag and the mouth part is detachably attached to the outer container 50. Accordingly, in the case where the pouch bag 10J of the pouch container 1J becomes empty or the contents in the pouch bag 10J decreases, the pouch container 1J can be replaced with a new pouch container filled with contents. Further, the outer container 50, the pump head F, and the cap 30 can be used continuously.

Note that in FIG. 44, although an example has been described in which the pouch container 1J similar to the pouch container 1C of the fourth configuration example in which the hardness of the bag part is strengthened is used as the internal container, as the outer container 50 is present outside the inner container in the double container 5, the inner container does not need to maintain an upright state. Therefore, it is also possible to use the configuration of the pouch container 1, 1A, 1B, 1D, 1E, 1F, or 1G without strengthened hardness, as the inner container of the double container.

(Configuration of Pump Head)

Next, with reference to FIG. 46, a configuration of the pump head F will be described. As illustrated in FIG. 46, the pump head F includes the cylinder part 60, the pump part 70, and the cylindrical cover 80.

The cylinder part 60 is a case that supports the pump part 70 on the upper side, and serves as a fitting part that fits with the mouth part 20J of the pouch container 1J on the lower side (see FIG. 45). More specifically, the cylinder part 60 includes a bottom wall 61, a circumferential wall 62, a cylinder tube 63, an intermediate tube 64, a spiral cylinder 65, and a breakthrough cylinder 66.

In the cylinder part 60, the upper side of the bottom wall 61 is a case that supports the pump part 70, and the case has a triple tube structure in which, from the outer side, in descending order of the size, the circumferential wall 62, the intermediate tube 64, and the cylinder tube 63 are concentrically erected upward from an upper surface 611 of the bottom wall 61.

Also, an annular coupling portion 67 that couples the upper end of the spiral cylinder 65 with the upper end of the breakthrough cylinder 66, is provided as the bottom surface of the cylinder tube 63 on the inner side of the cylinder tube 63. Also, the annular coupling portion 67 has a suction hole 68 formed that is continuously opened from the inner circumferential surface of the breakthrough cylinder 66.

A flange 621 projected outward is provided on the outer surface of the circumferential wall 62, and an upper circumferential wall 622 and a lower circumferential wall 623 are provided on the upper side and on the lower side, respectively, of the flange 621. When the pump head F is assembled, the upper circumferential wall 622 of the cylinder part 60 is fitted into an annular groove portion between an upper circumferential wall 82 and a suspended wall 84 of the cylindrical cover 80. Then, when the pump head F in the assembled state is attached to the outer container 50, the lower circumferential wall 623 is positioned inside the upper end thin-walled portion 53.

On the lower side of the cylinder part 60, a double cylinder structure is formed in which, in descending order of the size, the spiral cylinder 65 and the breakthrough cylinder 66 are concentrically suspended downward from the lower surface 612 of the bottom wall 61. The spiral cylinder 65 has a female screw structure in which a spiral groove 651 is formed on the inner surface. The breakthrough cylinder 66 is an example of a breakthrough plug having a beveled end 661 at its lower end.

When the pouch container 1J is attached to the cylinder part 60, the standing portion 22 of the mouth part 20J enters an annular recess between the spiral cylinder 65 and the breakthrough cylinder 66, and the spiral projection 23 on the outer surface of the standing portion 22 and the spiral groove 651 of the spiral cylinder 65 are screwed together.

Further, when rotation of the pouch container 1J progresses with respect to the cylinder part 60 while the spiral cylinder 65 and the standing portion 22 are being screwed together, the beveled end 661 of the breakthrough cylinder 66 reaches the upper surface film 11 on the pouch container 1J, and pierces the upper surface film 11.

Also, after the pouch container 1J is attached to the cylinder part 60, and assembly of the double container is completed, when put into use, the breakthrough cylinder 66 becomes a suction cylinder in which the inner hollow portion serves as a flow path for sucking up the contents inside the pouch bag 10J.

The pump part 70 includes an elevating head 71, a piston guide 72, a piston presser 73, a piston 74, a spring 75, a lower surface valve body 76, and a mouth part valve body 77.

In a state of not being pressed, the lower surface valve body 76 is separated from the other members, and is attached to the upper side of the annular coupling portion 67 and the suction hole 68 inside the cylinder tube 63 of the cylinder part 60.

The pump part 70 is a member that, when being pressed by the user, sucks up and discharges the contents while maintaining an airtight state. In the pump part 70, when the pressing top surface 711 of the elevating head 71 is pressed, the elevating head 71, the piston guide 72, and the mouth part valve body 77 descend together; the piston 74 descends less than the elevating head 71; the positions of the piston presser 73 and the lower surface valve body 76 remains unchanged; and the spring 75 contracts.

More specifically, the elevating head 71 includes a pressing top surface 711 and an outer wall 712. An opening 713 is formed at the center of the pressing top surface 711 as a button, and the mouth part valve body 77 is fitted therein. Also, at the lower end of the outer wall 712, a lower end annular projection 714 is provided. In the assembled state of the pump head F, in a state of no pressure being applied from above, the lower end annular projection 714 is in contact with the lower end of the side wall (lower circumferential wall) 81 of the cylindrical cover 80, and thereby, the upper end position of the elevating head 71 is defined.

The piston presser 73 is a member that presses the piston 74 to prevent it from coming off.

The piston guide 72 is a cylindrical member that guides the piston 74, provided so as to be in contact with the lower end of the mouth part valve body 77, and has a lateral hole 721 serving as an inflow hole formed on part of the cylindrical surface.

The piston 74 is an example of a valve body, and can slide separately along the inner surface of the cylinder tube 63 of the cylinder part 60.

The lower surface valve body 76 is a three-point valve or the like that is arranged on the lower surface inside the cylinder tube 63 of the cylinder part 60, and becomes open only when the contents are sucked.

The mouth part valve body 77 is a valve body (check valve) that opens the hole only when the elevating head 71 is pushed.

The piston 74, the lower surface valve body 76, and the mouth part valve body 77 are formed of an elastic member such as rubber or a soft material such as elastomer.

During a period while the elevating head 71 is pushed (when the contents are discharged), the piston 74 maintains its position for a while due to resistance with the inner surface of the cylinder tube 63, and then, slides downward when the lower end of the hanging tube around the opening 713 comes into contact with the rear end (upper end) of the piston 74. While maintaining its position with respect to the cylinder tube 63 due to the resistance of the piston 74, the piston guide 72 descends together with the elevating head 71.

Accordingly, when the position of the lateral hole 721 of the piston guide 72 becomes lower than the lower end of the inner surface of the piston 74, the lateral hole 721 closed by the piston 74 becomes open, and the contents enter the hollow portion of the piston guide 72. Then, the contents are discharged by the amount that has entered the piston guide 72.

Meanwhile, when the elevating head 71 is restored to the initial state (when the contents are sucked), the piston 74 slides upward along the cylinder tube 63 together with the piston guide 72.

In this way, in the pump head F of the present configuration, the three valve bodies are opened with time differences only when being used; therefore, the pump head F serves as a discharge mechanism having an airless characteristic capable of maintaining an airtight state. Also, only an amount corresponding to the inner capacity of the piston guide 72 is discharged at the maximum per one push, excessive discharge can be prevented.

The material of the pump head F other than the valve bodies and the spring may be a material that can withstand discharge operations and operations of check valves, because the contents pass through the inside of the pump part 70 only when being used.

As illustrated in FIG. 45 and FIG. 46, the cylindrical cover 80 is a cylindrical cover provided on the outermost side of the pump head F. The cylindrical cover 80 includes a lower circumferential wall 81 having a larger diameter, an upper circumferential wall 82 having a diameter smaller than that of the lower circumferential wall 81, an upper end ring 83 extending inward from the upper end of the upper circumferential wall 82 in an annular shape, and the suspended wall 84 suspended downward from the inner circumferential edge of the upper end ring 83.

An upper portion of the cylindrical cover 80 has a double cylinder structure composed of the upper circumferential wall 82 and the suspended wall 84, and when the pump head F is assembled, the upper end of the upper circumferential wall 622 of the cylinder part 60 is inserted into an annular groove between the upper circumferential wall 82 and the suspended wall 84.

Further, the inner circumferential surface of the lower circumferential wall 81 of the cylindrical cover 80 is provided with an inner circumferential screw projection 85 for engaging with the outer container 50. The outer circumferential surface of the upper circumferential wall 82 is provided with an outer circumferential screw projection 86 for engaging with the cap 30.

Note that in order to prevent air from entering the inside of the pouch bag 10 through the pump head F, it is more favorable that the material of the pump head F is a plastic or the like that includes a metal layer or an inorganic layer having excellent air blocking properties. Accordingly, even after the upper surface film 11 is punctured, change in the state of the contents can be suppressed.

Further, in the present configuration, before shipment, in the manufacturing stage, the pump head F as a discharge mechanism having an airless characteristic, is attached to the mouth part 20J. Therefore, the contents inside the pouch bag 10 is exposed to oxygen as little as possible, and a state with little denaturation due to oxidation can be maintained until the time of discharge.

Note that in the case of this configuration, it is assumed that the contents stay on the pressing top surface 71I as a flat plate-shaped discharge surface; therefore, it is favorable that a liquid (fluid) having a high viscosity, for example, a cosmetic material (basic cosmetic material, base makeup cosmetic material, point makeup cosmetic material), a solid perfume, a seasoning, or the like having a predetermined viscosity is contained as the contents.

Figure 47:
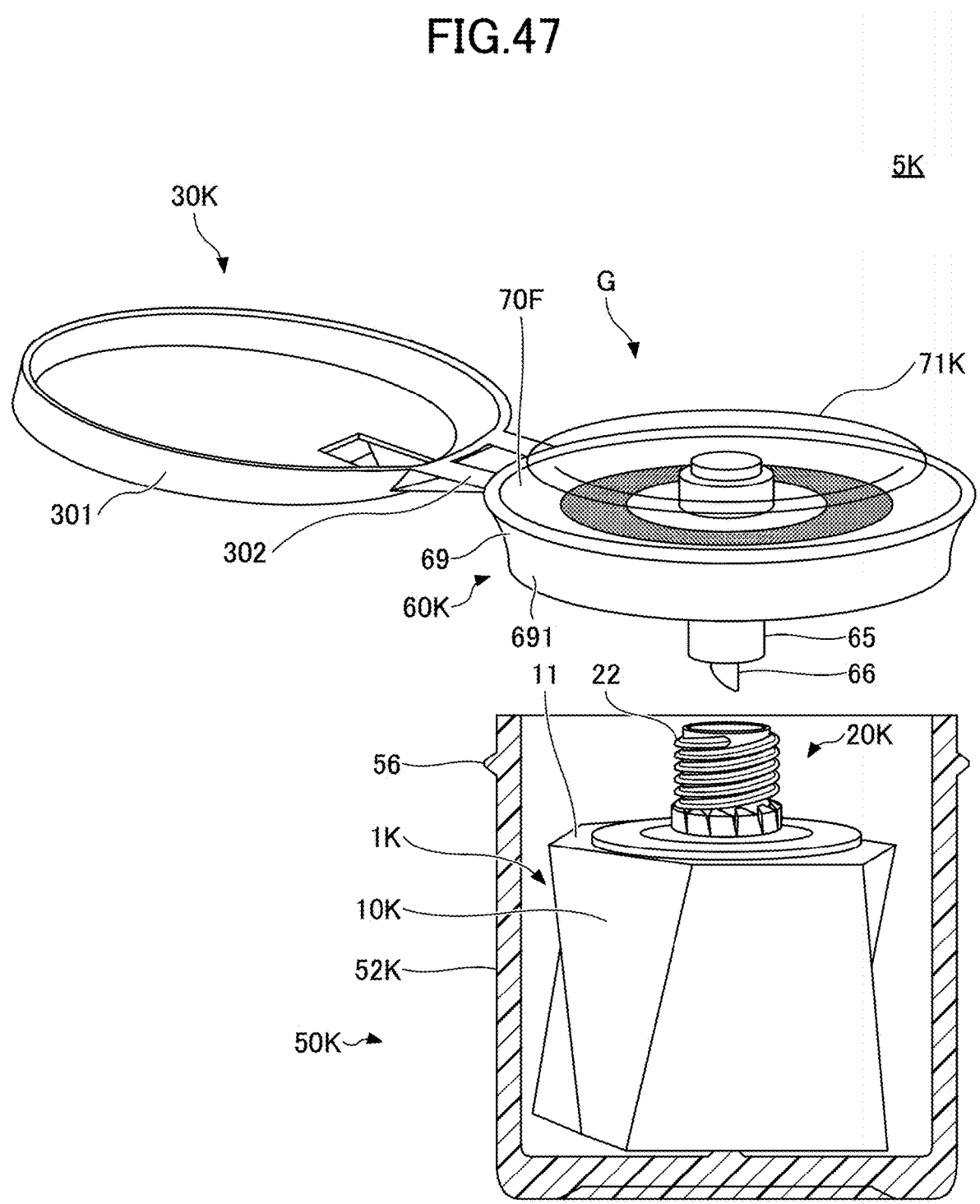
FIG. 47 is a diagram illustrating an example in which a push pump with a saucer is attached as a discharge mechanism to a mouth part of a double container of the present invention.

Application Example 4: Attachment of Discharge Mechanism Pump Head with Saucer FIG. 47 is a perspective view of a double container 5K equipped with a pouch container 1K having substantially the same shape as the pouch container 1C according to the fourth configuration example of the present invention, as an inner container, and provided with a pump head with a saucer. FIG. 47 is an external view in which only a lower part of the 60K of the cylinder mechanism is illustrated perspectively. The cylinder mechanism 60K in the present configuration example is a member that implements the functions of the cylinder part 60 and the cylindrical cover 80 in FIG. 46 by a single member.

A pump head G with a saucer illustrated in FIG. 47 is a modified example of the pump head illustrated in FIG. 45, and as a discharge mechanism of an airless characteristic having a pump suction configuration, in the present configuration, the pump head G with a saucer in which elevation of the saucer part on the upper surface can be visually recognized from the outside is attached. In other words, in the configuration in FIG. 47, the lower portion of the pressing top surface 71K extends in a stem shape, as compared with FIG. 45.

Also, in the present configuration, a cover body 301 with a hinge 302 that can be opened and closed, is attached to part of the cylinder mechanism 60K of the pump G, and the cover body 301 can cover an upper space of the pressing top surface 71K as the saucer.

In the present example, the cylinder mechanism 60K is integrated with the cover body 301; therefore, a structure in which the cylinder mechanism 60K covers an outer container 50K from the outside of the outer container 50K can also be adopted. In the example illustrated in FIG. 47, the outer container 50K is not provided with an upper end thin-walled portion, and the cylinder mechanism 60K and the outer container 50K can be engaged with each other by fitting an annular protrusion 56 formed on the outer circumference around the upper end of a sidewall 52K, onto an inner circumferential protrusion 691 provided on the lower end of a sidewall 69 of the cylinder mechanism 60K.

Also, in the present configuration, the pressing top surface 71K serving as the saucer is recessed in a concave shape, contents having a low viscosity can be retained on the pressing top surface 71K. For example, the present configuration is suitable when using discharged contents by soaking the contents into a sponge, puff, cotton, tissue, kitchen paper, or the like.

In the present configuration, before shipment, in the manufacturing stage, the pump head G with the saucer as a discharge mechanism having an airless characteristic, is attached to the mouth part 20K of the pouch container 1K. Therefore, the contents inside the pouch bag 10K is exposed to oxygen as little as possible, and a state with little denaturation due to oxidation can be maintained until the time of discharge.

The pump head G with the saucer illustrated in FIG. 47 is also provided with a check valve function as in FIG. 46. Therefore, even if the container is left for a while after the container was opened and has been used halfway, air does not flow into the container; therefore, the properties of the contents (contained materials) hardly change. Further, in FIG. 47, air can be prevented from flowing into the pouch bag 10K even when the pump head G with the saucer is used for a discharge operation to discharge the contents by driving the pump. Therefore, the properties of the contents during use hardly change.

As illustrated in FIG. 44 to FIG. 47, the double containers 5 and 5K of the multiple embodiments described above, the pouch containers are formed of an air-blocking and non-light-transmitting material, and hence, are suitable for containing a liquid substance for which light transmission and oxygen contact need to be avoided.

Further, when the contained liquid material is discharged and used, the pouch bag of the pouch container plastically deforms, and when the liquid material in the pouch bag is exhausted, it takes a state of being thinly crushed in the vertical direction due to shrinkage; therefore, even if the remaining amount becomes small, it is not necessary to take out the pouch container from the outer container and further compress it.

Figure 48:
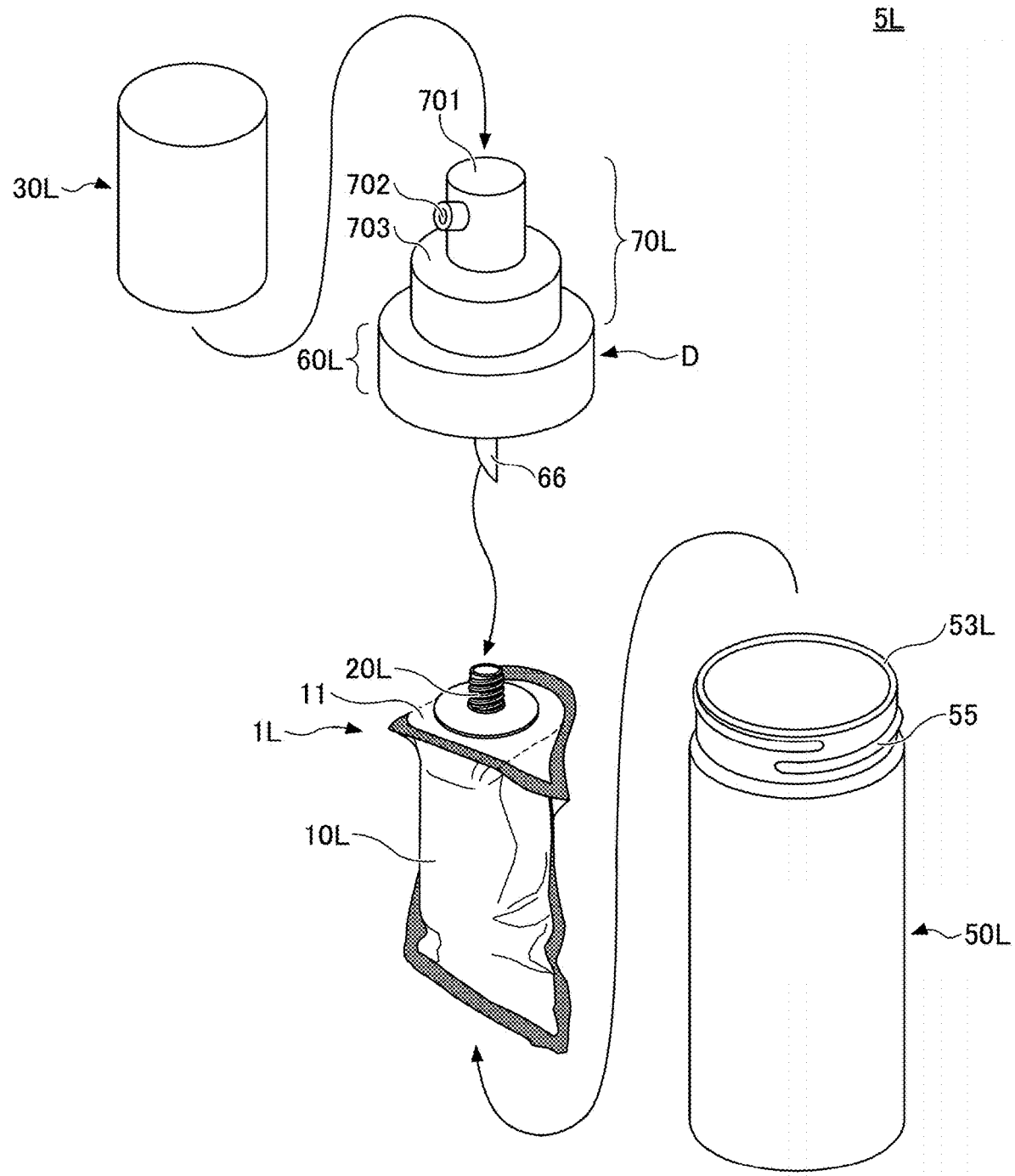
FIG. 48 is a diagram illustrating an example in which a dispenser is attached as a discharge mechanism to a mouth part of a double container of the present invention.

Application Example 5: Attachment of Discharge Mechanism Lateral Discharge Dispenser FIG. 48 is a diagram illustrating an example in which an airless pump (dispenser) is attached as a discharge mechanism to a mouth part of a double container of the present invention. FIG. 48 is an exploded perspective view of a double container 5L equipped with a pouch container 1L having substantially the same shape as the pouch container 1 according to the first configuration example of the present invention, as an inner container, and provided with a dispenser D.

The dispenser D illustrated in FIG. 48 is an example of a discharge mechanism having an airless characteristic of a lateral discharge type. The dispenser D includes an airless pump 701 and a cylinder mechanism 60L.

The airless pump 701 includes a head portion 701 having a discharge outlet 702, and a retaining cylinder 703 for movably holding the head portion 701. The retaining cylinder 703 is coupled with a cylinder mechanism 60L, and the cylinder mechanism 60L has a breakthrough cylinder 66 formed.

When the dispenser D is attached to a mouth part 20L of the pouch container 1L, an upper surface film 11 is broken by piercing of the breakthrough cylinder 66. Note that although not illustrated in FIG. 48, around the breakthrough cylinder 66, a spiral cylinder as illustrated in FIG. 46 is formed, and when engaged with the pouch container 1L, the spiral cylinder is screwed into the mouth part 20L.

Here, in the dispenser D, when the head portion 701 is pressed down, the inside of the pouch bag 10L is sucked, and thereby, the side surfaces shrink due to decompression of the pouch bag 10L, and the capacity of the pouch bag 10L decreases. Accordingly, the contents move to the dispenser D, and a predetermined amount of the contents is discharged to the outside.

Also, although not illustrated in the figure, the airless pump 701 is provided with an annular packing, and a suction valve and a discharge valve for opening and closing, in order to maintain the sealed state.

Accordingly, virtually no air flows in the dispenser D even after the breakthrough cylinder 66 breaks the upper surface film 11; therefore, the contents inside the pouch bag 10L are exposed to oxygen as little as possible, and a state of little denaturation due to oxidation can be maintained until the time of discharge.

Also, when the dispenser D is engaged with an outer container 50L, a screw projection 55 of an upper end thin-walled portion 53L of the outer container 50L and a screw projection (not illustrated) on the side surface of the cylinder mechanism 60L are screwed together to be engaged.

Further, a cap 30L may be placed to cover the dispenser D. In this case, the side surface of the cap 30L is fitted into the outside of the retaining cylinder 703, and stops at the upper end of the cylinder mechanism 60L. Note that in this example, although the cap 30L has a shape that can cover only the airless pump 70L in the dispenser D, the cap 30L may also have a shape covering part corresponding to the cylinder mechanism 60L.

Also, in this configuration, the pouch bag 10L as the main body of the container shrinks according to the remaining amount of the contents while maintaining the sealed state; therefore, the remaining amount of the contents can be confirmed at a glance by checking the shrunk state of the pouch bag 10L from the outside of the outer container 50L that is partially or entirely transparent.

For example, as examples of containers in which a liquid having a low viscosity and requiring an air blocking property is used in multiple times, it is suitable for a seasoning container, a seasoning tube, a mini bottle of cosmetics and sanitary goods for traveling, a package of a fluid such as a retort food, a beverage pouch, or the like.

Also, in the present configuration, by adjusting the size of the diameter of the discharge outlet 702 of the airless pump 70L illustrated in FIG. 48 and the type of piston provided therein, the contents can be discharged as spray.

Accordingly, also in the present configuration, the contents do not deteriorate from a portion corresponding to the mouth part in the distribution stage, and a large force is not required when the contents are used up to the end.

As above, favorable embodiments of the present invention have been described in detail; note that the present invention is not limited to the specific embodiments described above, and various variations and modifications may be made within the scope of the present invention as set forth in claims.

The present application is based upon and claims the benefit of Japanese Priority Application No. 2020-100448, filed on Jun. 9, 2020, the entire contents of which are hereby incorporated by reference.

LIST OF REFERENCE NUMERALS

1, 1A, 1B, 1C, 1D, 1E, 1F, 1G, 1H, 1J, 1K, 1L pouch container
10, 10C, 10H, 10I, 10J, 10K, 10L pouch bag
11, 11A, 11B, 11α, 11β upper surface film (first film)
F11 upper surface film material
111 resin layer (outer resin layer)
112 metal layer (air blocking layer)
113 resin layer (inner resin layer)
12, 12A, 12C, 13, 13A, 13C side surface film (second Film)
F12, F13 side surface film material
121, 131 resin layer (outer resin layer)
122, 132 metal layer (air blocking layer)
123, 133 resin layer (inner resin layer)
14 side surface film (second Film)
15 upper surface film (first Film)
16 lower surface film (second Film)
17 side surface film
17F film material
20, 20A, 20B, 20C, 20D, 20E, 20F, 20G, 20H, 20I, 20J, 20K, 20L, 20α, 20β mouth part (spout, mouth part member)
21 brim portion
22 standing portion
23 spiral projection
24 rotation stopper
3, 30, 30L cap
31 lower cap
311 side wall
312 spiral groove
313 breakthrough plug
32 upper cap
33 middle plug
34 O-ring
39 stopper ring
4 container with a cap
5, 5K, 5L double container (double container with a discharge mechanism)
50, 50K, 50L outer container
60K, 60L cylinder mechanism
65 spiral cylinder
66 breakthrough cylinder
70 pump part
80 cylindrical cover
F pump head (discharge mechanism)
G pump head with a saucer (mechanism)
D dispenser

The invention claimed is:

1. A method of manufacturing a pouch container, the method comprising:
  forming a pouch bag having one open end, by fusion-bonding a resin layer on an inner side of an end of a first film, with a resin layer on an inner side of an end of one or more second films, wherein each of the first film and the one or more second films has a structure comprising three or more layers including an outer resin layer forming an outer surface, an inner resin layer forming an inner surface, and a metal layer or an inorganic layer sandwiched between the inner and outer resin layers;
  molding a mouth part member made of a resin, the mouth part member including a brim portion and a standing portion, wherein the resin of the mouth part member is the same as a resin of the outer resin layer of the first film, the resin being an olefin-based resin or an ester-based resin;

attaching a lower surface of the brim portion of the mouth part member made of the resin to an upper surface of the outer resin layer of the first film of the pouch bag, by integrating the resin of the mouth part member with the resin of the outer resin layer, using one of ultrasonic welding, heat welding, or high-frequency welding;

filling the pouch bag with contents from the one open end of the pouch bag; and sealing an inside of the pouch bag by fusion-bonding the one open end of the pouch bag to seal the pouch bag.

2. The method of manufacturing the pouch container as claimed in claim 1, wherein the first film is a hexagonal upper surface film, wherein the one or more second films are two side surface films each having a shape in which an upper side of a rectangle and a lower base of a trapezoid are continuously formed, and wherein the step of forming the pouch bag includes, fusion-bonding outer edges of three continuous sides of the hexagonal upper surface film with three ends of one of the two side surface films which are an upper base and legs of the trapezoid of the one of the two side surface films;

fusion-bonding a side of the rectangle of the one of the two side surface films with a side of the rectangle of another of the two side surface films; and fusion-bonding outer edges of another three sides of the hexagonal upper surface film with three ends of said another of the two side surface films which are an upper base and legs of the trapezoid of said another of the two side surface films.

3. The method of manufacturing the pouch container as claimed in claim 2, wherein after sealing the inside of the pouch bag by fusion-bonding the one open end of the pouch bag, vertices of lower ends of the two side surface films are folded, and the vertices are bonded to each other.

4. The method of manufacturing the pouch container as claimed in claim 1, wherein a spiral projection is formed on an outer circumferential surface of the standing portion of the mouth part member.

5. The method of manufacturing the pouch container as claimed in claim 1, the method further comprising:

forming the first film, wherein the metal layer or the inorganic layer of the first film is an air blocking layer; and forming the one or more second films, wherein the metal layer or the inorganic layer of the one or more second films is an air blocking layer.

6. The method of manufacturing the pouch container as claimed in claim 5, wherein the lower surface of the brim portion of the mouth part member and the outer resin layer of the first film to which the mouth part member is attached are formed of a thermoplastic olefin-based resin or PET resin.

7. The method of manufacturing the pouch container as claimed in claim 5, wherein a metal included in the air blocking layer of at least one of the first film or the one or more second films is aluminum.

8. The method of manufacturing the pouch container as claimed in claim 5, wherein the air blocking layer of at least one of the first film or the one or more second films is a resin film layer on which silica is deposited.

9. The method of manufacturing the pouch container as claimed in claim 1, wherein the olefin-based resin includes at least one of: polypropylene (PP), low-density polyethylene (LDPE), ethylene-vinyl acetate copolymer (EVA), polymethylpentene (TPX), or ultra-high molecular weight polyethylene, or the ester-based resin includes polyethylene terephthalate (PET).

10. A method of manufacturing a pouch container, the method comprising:

molding a mouth part member made of a resin, the mouth part member including a brim portion and a standing portion, wherein the resin of the mouth part member is the same as a resin of an outer resin layer of a first film, the resin being an olefin-based resin or an ester-based resin;

attaching a lower surface of the brim portion of the mouth part member made of the resin to the outer resin layer of the first film, by integrating the resin of the mouth part member with the resin of the outer resin layer, using one of ultrasonic welding, heat welding, or high-frequency welding;

forming a pouch bag having one open end, by fusion-bonding a resin layer on an inner side of an end of the first film, with a resin layer on an inner side of an end of one or more second films, wherein each of the first film and the one or more second films has a structure comprising three or more layers including an outer resin layer forming an outer surface, an inner resin layer forming an inner surface, and a metal layer or an inorganic layer sandwiched between the inner and outer resin layers;

filling the pouch bag with contents from the one open end of the pouch bag; and sealing an inside of the pouch bag by fusion-bonding the one open end of the pouch bag to close the pouch bag.

11. The method of manufacturing the pouch container as claimed in claim 10, wherein the olefin-based resin includes at least one of: polypropylene (PP), low-density polyethylene (LDPE), ethylene-vinyl acetate copolymer (EVA), polymethylpentene (TPX), or ultra-high molecular weight polyethylene, or the ester-based resin includes polyethylene terephthalate (PET).

12. A method of manufacturing a pouch container, the method comprising:

folding and fusion-bonding an inner resin layer of an end of a film, to form a pouch bag having one open end, wherein the film has a structure comprising three or more layers including an outer resin layer forming an outer surface, an inner resin layer forming an inner surface, and a metal layer or an inorganic layer sandwiched between the inner and outer resin layers;

molding a mouth part member made of a resin, the mouth part member including a brim portion and a standing portion, wherein the resin of the mouth part member is the same as a resin of the outer resin layer of the film, the resin being an olefin-based resin or an ester-based resin;

attaching a lower surface of the brim portion of the mouth part member made of the resin, to the outer resin layer of the film of the pouch bag, by integrating the resin of the mouth part member with the resin of the outer resin layer, using one of ultrasonic welding, heat welding, or high-frequency welding;

filling the pouch bag with contents from the one open end of the pouch bag; and sealing an inside of the pouch bag by fusion-bonding the one open end of the pouch bag to close the pouch bag.

13. The method of manufacturing the pouch container as claimed in claim 12, wherein
- the olefin-based resin includes at least one of: polypropylene (PP), low-density polyethylene (LDPE), ethylene-vinyl acetate copolymer (EVA), polymethylpentene (TPX), or ultra-high molecular weight polyethylene, or
- the ester-based resin includes polyethylene terephthalate (PET).

\* \* \* \* \*